US011805723B2

(12) United States Patent
Takaki et al.

(10) Patent No.: US 11,805,723 B2
(45) Date of Patent: Nov. 7, 2023

(54) WORKING DEVICE AND WORKING MACHINE HAVING THE SAME

(71) Applicant: KUBOTA CORPORATION, Osaka (JP)

(72) Inventors: Go Takaki, Osaka (JP); Sumio Yagyu, Osaka (JP); Yukifumi Yamanaka, Osaka (JP)

(73) Assignee: KUBOTA CORPORATION, Osaka (JP)

(*) Notice: Subject to any disclaimer, the term of this patent is extended or adjusted under 35 U.S.C. 154(b) by 739 days.

(21) Appl. No.: 16/911,660

(22) Filed: Jun. 25, 2020

(65) Prior Publication Data

US 2020/0323127 A1   Oct. 15, 2020

Related U.S. Application Data

(63) Continuation of application No. PCT/JP2019/018089, filed on Apr. 26, 2019.

(30) Foreign Application Priority Data

Apr. 27, 2018 (JP) .................................. 2018-087244

(51) Int. Cl.
*A01C 7/08* (2006.01)
*A01C 15/00* (2006.01)
(Continued)

(52) U.S. Cl.
CPC .............. *A01C 7/08* (2013.01); *A01C 15/005* (2013.01); *A01C 19/02* (2013.01); *B60L 7/02* (2013.01)

(58) Field of Classification Search
CPC ......... A01C 7/08; A01C 15/005; A01C 19/02; A01C 7/00; A01C 15/00; A01C 19/00; B60L 7/02; B60L 7/00
See application file for complete search history.

(56) References Cited

U.S. PATENT DOCUMENTS

| 5,164,572 A | 11/1992 | Hideo et al. |
| 2016/0050842 A1* | 2/2016 | Sauder .................. A01C 7/102 111/186 |
| 2019/0000012 A1 | 1/2019 | Yagyu et al. |

FOREIGN PATENT DOCUMENTS

| JP | 2 197278 A | 8/1990 |
| JP | 2003 153623 A | 5/2003 |

(Continued)

OTHER PUBLICATIONS

International Search Report issued in International Patent Application No. PCT/JP2019/018089, dated Jul. 23, 2019 and English Translation thereof.

Primary Examiner — Christopher J. Novosad
(74) Attorney, Agent, or Firm — Greenblum & Bernstein, P.L.C.

(57) ABSTRACT

A working device to be connected to a traveling vehicle having a prime mover, the working device being configured to perform an agricultural work, includes a working portion to rotate to perform an agricultural work, an electric motor to be driven by electric power, a power transmission mechanism to which power generated by the electric motor is inputted, configured to transmit the power to the working portion; and a regeneration resistor to consume a regenerative power generated in the electric motor, the regeneration resistor being arranged at a position to be cooled by wind generated by rotation of the working portion.

12 Claims, 38 Drawing Sheets

(51) Int. Cl.
*A01C 19/02* (2006.01)
*B60L 7/02* (2006.01)

(56) References Cited

FOREIGN PATENT DOCUMENTS

| | | |
|---|---|---|
| JP | 2010 172104 A | 8/2010 |
| JP | 2012 70554 A | 4/2012 |
| JP | 6214806 B1 | 10/2017 |

\* cited by examiner

FIG.20

| B1 | 0 | 0 | 0 | 0 |
|----|---|---|---|---|
| B2 | 200 | 300 | 400 | 500 |
| M2 | ▲219 | ▲329 | ▲438 | ▲548 |
| M1 | ▲495 | ▲82 | 332 | 746 |

| B1 | 200 | 300 | 400 | 500 |
|---|---|---|---|---|
| B2 | 200 | 300 | 400 | 500 |
| M2 | ▲119 | ▲179 | ▲239 | ▲299 |
| M1 | ▲495 | ▲82 | 332 | 746 |

| B1 | 200 | 300 | 400 | 500 |
|----|-----|-----|-----|-----|
| B2 | 500 | 400 | 300 | 200 |
| M2 | ▲448 | ▲289 | ▲129 | 30 |
| M1 | 746 | 332 | ▲82 | ▲495 |

| B1 | 200 | 300 | 400 | 500 |
|---|---|---|---|---|
| B2 | 0 | 0 | 0 | 0 |
| M2 | 100 | 150 | 200 | 250 |
| M1 | ▲1323 | ▲1323 | ▲1323 | ▲1323 |

FIG.23

| BLADE TARGET SPEED (r/min) | B1 | 200 | 300 | 400 | 500 |
|---|---|---|---|---|---|
| | B2 | 500 | 400 | 300 | 200 |
| MOTOR TARGET SPEED (r/min) | M2 | ▲448 | ▲289 | ▲129 | 30 |
| | M1 | 746 | 332 | ▲82 | ▲495 |
| MOTOR POWER(W) | M2 | ▲777 | ▲1025 | ▲693 | 218 |
| | M1 | 989 | 527 | ▲151 | ▲1045 |
| | Σ | 211 | ▲497 | ▲844 | ▲828 |

FIG.24

WORKING DEVICE AND WORKING MACHINE HAVING THE SAME

CROSS-REFERENCE TO RELATED APPLICATIONS

The present application is a continuation application of International Application No. PCT/JP2019/018089, filed Apr. 26, 2019, which claims priority to Japanese Patent Application No. 2018/087244, filed Apr. 27, 2018. The contents of these applications are incorporated herein by reference in their entirety.

BACKGROUND OF THE INVENTION

Field of the Invention

The present invention relates to a working device such as a sprayer device and to a working machine having the working device.

Description of Related Art

A sprayer device disclosed in Japanese Unexamined Patent Application Publication No. 2003-153623 is previously known.

The sprayer device disclosed in Japanese Unexamined Patent Application Publication No. 2003-153623 is configured to be driven by revolving an electric motor using the electric power that is supplied from a tractor.

SUMMARY OF THE INVENTION

In one aspect of the present invention, a working device to be connected to a traveling vehicle having a prime mover, the working device being configured to perform an agricultural work, includes: a working portion to rotate to perform an agricultural work; an electric motor to be driven by electric power; a power transmission mechanism to which power generated by the electric motor is inputted, configured to transmit the power to the working portion; and a regeneration resistor to consume a regenerative power generated in the electric motor, the regeneration resistor being arranged at a position to be cooled by wind generated by rotation of the working portion.

In one aspect of the present invention, a working machine includes: a traveling vehicle having a prime mover; and the working device mentioned above and configured to be connected to the traveling vehicle and to perform the agricultural work.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 20 is a table representing an example of driving pattern (pattern 1) of the driver portion according to the embodiments;

FIG. 21 is a table representing an example of driving pattern (pattern 2) of the driver portion according to the embodiments;

FIG. 22 is a table representing an example of driving pattern (pattern 3) of the driver portion according to the embodiments;

FIG. 23 is a table representing an example of driving pattern (pattern 4) of the driver portion according to the embodiments;

FIG. 24 is a table in which items relating to the power is added to the table of pattern 3 according to the embodiments;

DESCRIPTION OF THE EMBODIMENTS

Figure 1:
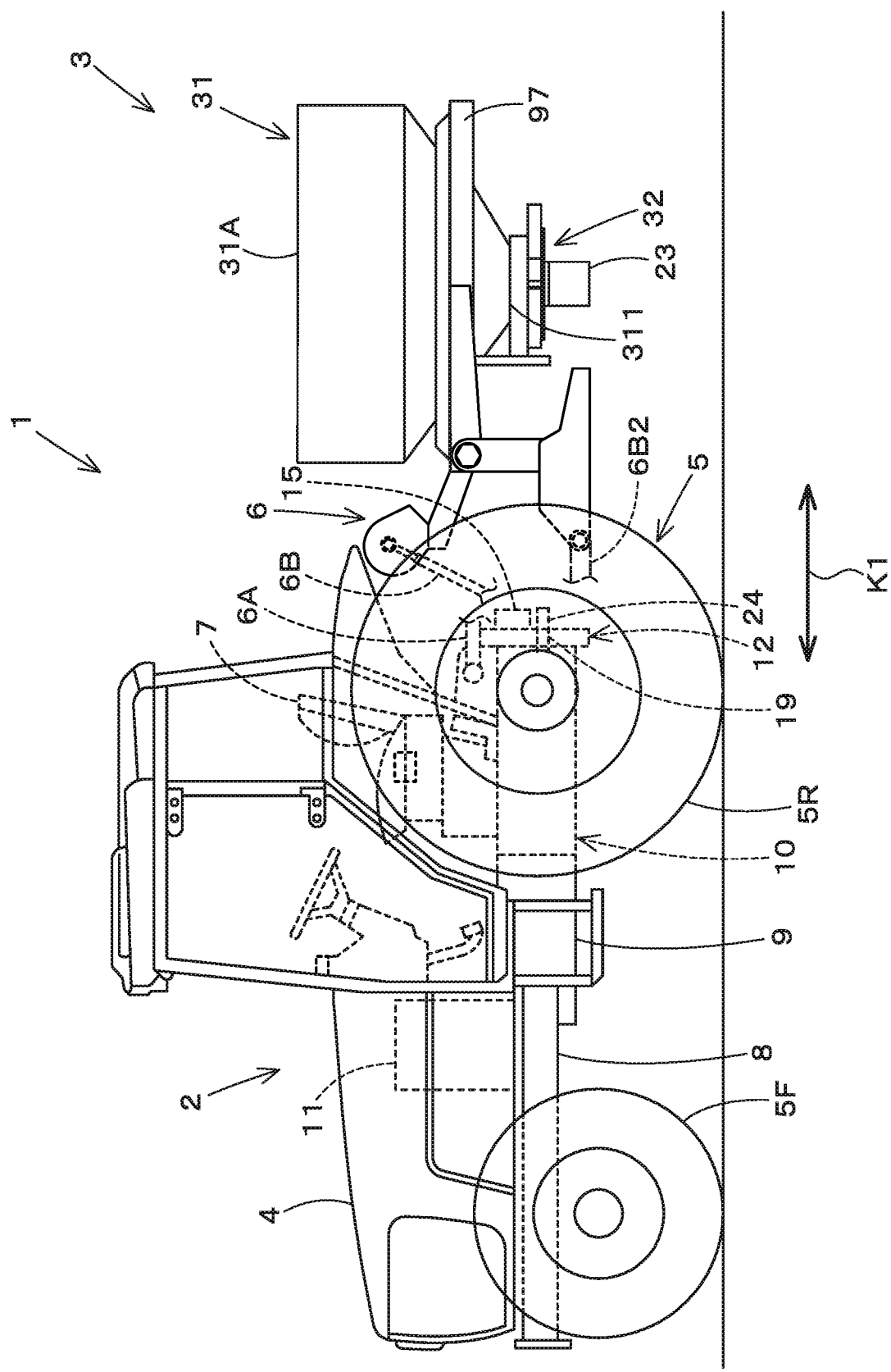
FIG. 1 is a side view illustrating a whole configuration of a working machine according to embodiments of the present invention.

The embodiments will now be described with reference to the accompanying drawings, wherein like reference numerals designate corresponding or identical elements throughout the various drawings. The drawings are to be viewed in an orientation in which the reference numerals are viewed correctly.

Hereinafter, an embodiment of the present invention will be described with reference to the drawings as appropriate.

First, the working machine 1 according to embodiments of the present invention will be described below.

Figure 2:
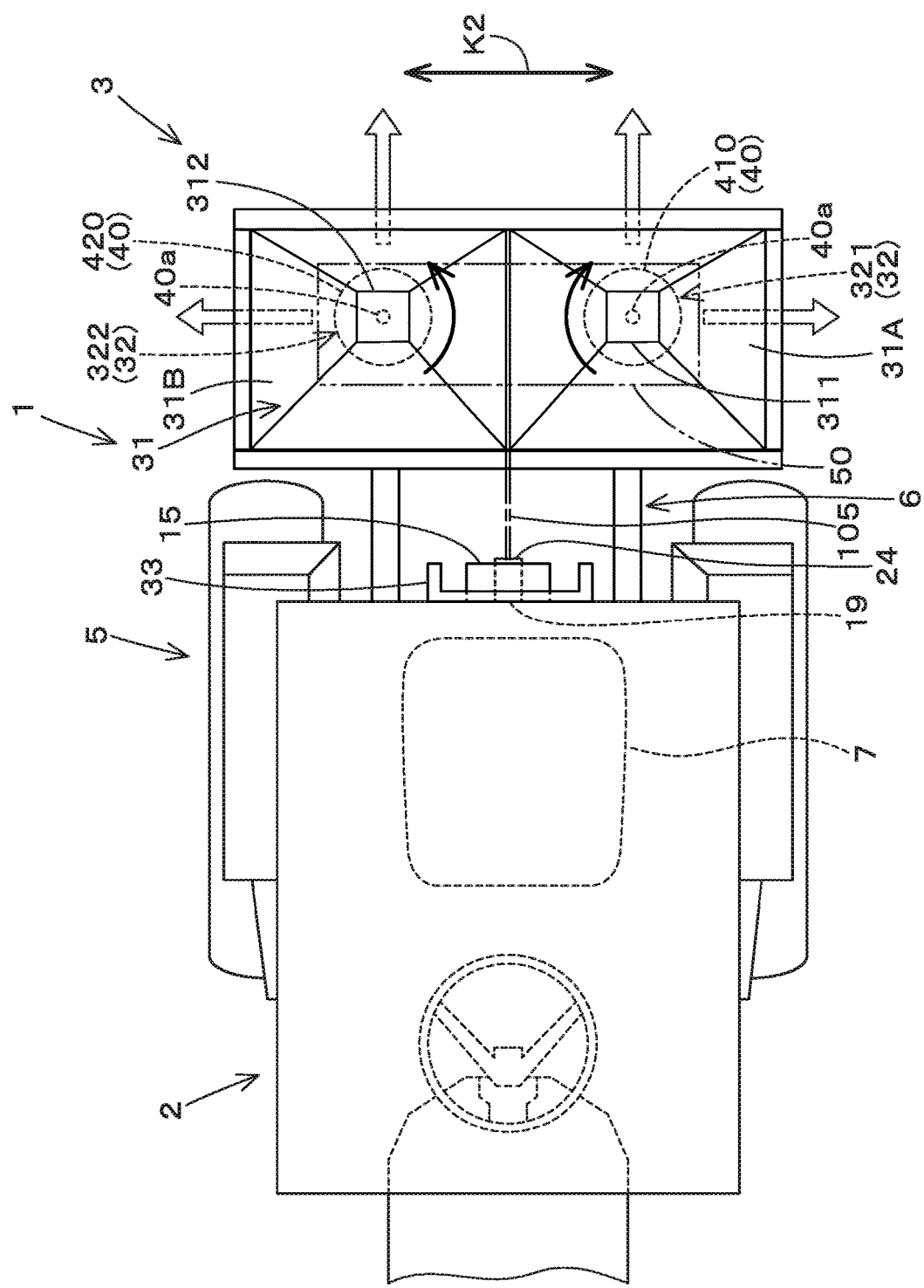
FIG. 2 is a plan view illustrating a rear portion of the working machine according to the embodiments.

FIG. 1 shows a side view of a whole of the working machine 1, and FIG. 2 shows a plan view of the rear portion of the working machine 1.

The working machine 1 includes a traveling vehicle 2 and a working device 3.

The traveling vehicle 2 is a vehicle that travels while towing the working device 3. In the embodiment, since the traveling vehicle 2 is a tractor, the traveling vehicle 2 will be described below as the tractor 2. However, the traveling vehicle 2 is not limited to a tractor, and may be an agricultural vehicle such as a combine or rice transplanter, or a construction vehicle. The traveling vehicle 2 may be a pickup truck.

The working device 3 is a device for performing a work (an agricultural work) on an agricultural field or the like. The working device 3 is an implement or an attachment towed by the traveling vehicle 2. However, the working device 3 may be an independent device that can travel independently without being pulled by the traveling vehicle 2.

First, the overall configuration of the tractor (traveling vehicle) 2 will be described below.

The tractor 2 includes a vehicle body 4, a traveling device 5, and a connector device 6. In the embodiment of the present invention, the front side of a driver sitting on a driver seat 7 mounted on the vehicle body 4 (the left side in FIG. 1) is referred to as the front, the rear side of the driver (the right side in FIG. 1) is referred to as the rear, the left side of the driver (the front surface side of FIG. 1) is referred to as the left, and the right side of the driver (the back surface side of FIG. 1) is referred to as the right. In addition, a horizontal direction K2 (see FIG. 2) that is a direction orthogonal to the front-rear direction K1 (see FIG. 1) will be described as a vehicle width direction.

The vehicle body 4 has a vehicle body frame 8, a clutch housing 9, and a transmission case 10. The vehicle body frame 8 extends in the front-rear direction of the vehicle body 4. A prime mover 11 is mounted on the vehicle body frame 8. In the embodiment, the prime mover 11 is an internal combustion engine. In particular, the prime mover 11 is an engine, and is, more in particular, a diesel engine. Hereinafter, the prime mover 11 will be described as the engine 11.

The engine 11 is mounted on the vehicle body frame 8 and arranged in the front portion of the vehicle body 4. The clutch housing 9 is connected to the rear portion of the engine 11 and houses the clutch. The transmission case 10 is connected to the rear portion of the clutch housing 9 and stretches rearward. The transmission case 10 houses a transmission 13 and a rear wheel differential device 14 which will be described later.

The traveling device 5 has a front wheel 5F provided at the front portion of the vehicle body 4 and a rear wheel 5R provided at the rear portion of the vehicle body 4. The front wheels 5F are supported by the vehicle body frame 8. The rear wheel 5R is supported by the output shaft of the rear wheel differential device 14. The traveling device 5 is a tire type in the present embodiment, but may be a crawler type.

The connector device 6 is a device to connect the working device 3 to the rear portion of the tractor 2. In the embodiment, the connector device 6 includes a three-point link mechanism. The specific configuration of the connector device 6 in this embodiment will be described later. However, the configuration of the connector device 6 is not particularly limited thereto as long as the working device 3 can be connected to the rear portion of the traveling vehicle 2. For example, when the traveling vehicle 2 is a pickup truck, the connector device 6 connects the working device 3 by a mechanism other than the three-point link mechanism.

The working device 3 is, for example, a sprayer device for spraying substances (powder particles, or the like) such as fertilizers or chemicals, a tiller device for cultivating, a harvester device for harvesting, a mower device for mowing grass and the like, a tedder device of tedding grass and the like, a rake device for collecting grass and the like, and a baler device for baling grass and the like. In FIG. 1 and FIG. 2 show an example of the sprayer device attached as the working device 3.

The traveling vehicle 2 includes an ECU (Electric Controller portion) that is a controller portion to control electric components and the like mounted on the traveling vehicle 2. The ECU (hereinafter, referred to as "in-vehicle ECU") is constituted of a microprocessor including a CPU, an EEPROM, and the like. The in-vehicle ECU and electrical components are communicably connected through a line such as the CAN (Controller Area Network).

The tractor 2 includes a PTO shaft 19 to transmit power from the engine 11 to drive the tractor 2 to a working device or the like. The PTO shaft 19 protrudes rearward from the transmission case 10.

Figure 3:
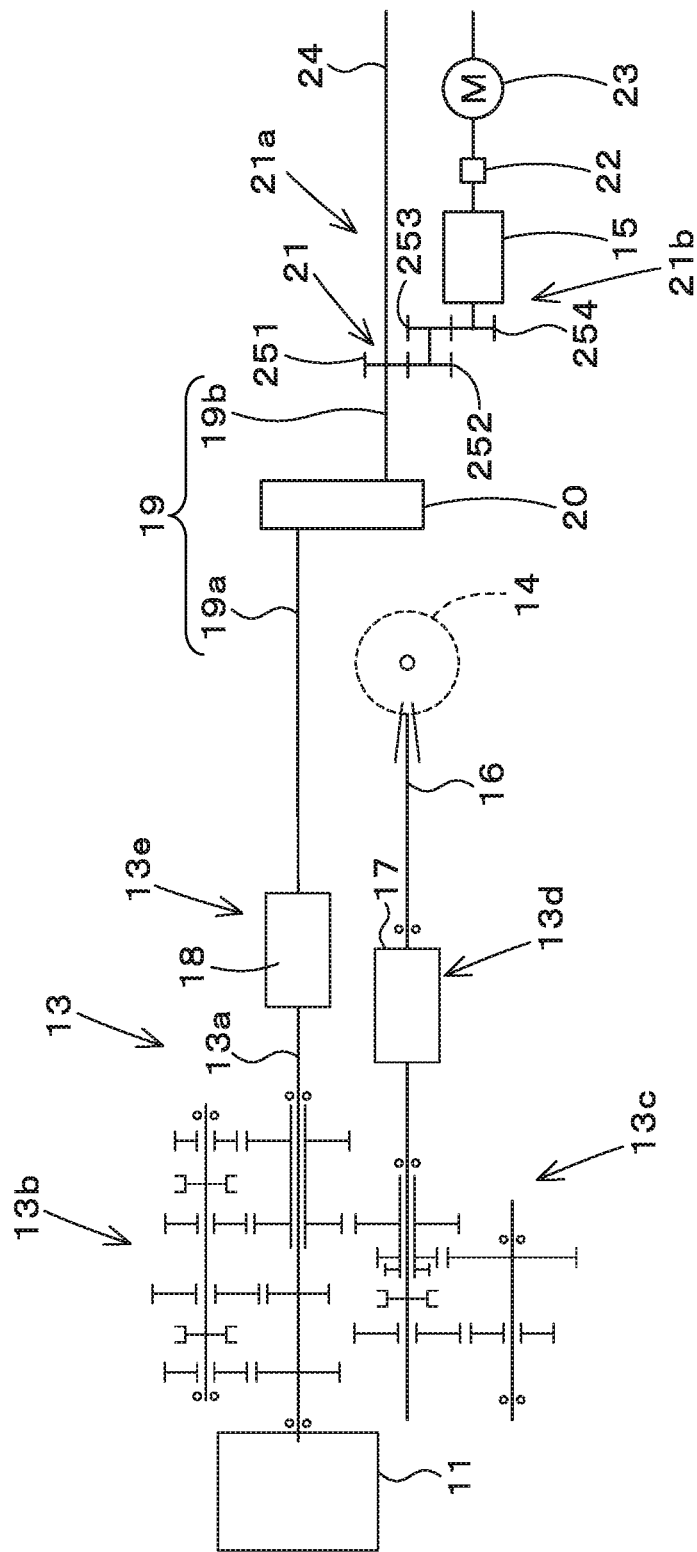
FIG. 3 is a view illustrating a power transmission system of the working machine according to the embodiments.

FIG. 3 shows the power transmission system of the working machine 1.

As shown in FIG. 3, the transmission 13 includes a main shaft (a propulsion shaft) 13a, a main transmission portion 13b, an auxiliary transmission portion 13c, a shuttle portion 13d, and a PTO power transmission portion 13e. The propulsion shaft 13a is rotatably supported by the housing case of the transmission 13. Power from the crankshaft of the engine 11 is transmitted to the propulsion shaft 13a. The main transmission portion 13b has a plurality of gears and a shifter that changes the engagement of the gears. The main transmission portion 13b changes the revolving speed inputted from the propulsion shaft 13a and outputs (shifts) by appropriately changing the connection (engagement) of a plurality of gears with a shifter.

The sub-transmission portion 13c has a plurality of gears and a shifter for changing the engagement of the gears, similar to the main transmission portion 13b. The sub-transmission portion 13c changes the revolving speed inputted from the main transmission portion 13b and outputs (shifts) by appropriately changing the connection (engagement) of a plurality of gears with a shifter.

The shuttle portion 13d has a shuttle shaft 16 and a forward/backward switch portion 17. The power outputted from the auxiliary transmission portion 13c is transmitted to the shuttle shaft 16 through gears and the like. The rear axle differential device 14 is provided on the shuttle shaft 16. The rear wheel differential device 14 rotatably supports a rear axle that supports the rear wheel 5R. The forward/reverse switch portion 17 is constituted of, for example, a clutch such as a hydraulic clutch or an electric clutch, and switches the revolving direction of the shuttle shaft 16, that is, the forward and backward movements of the tractor 2 by engaging and disengaging the clutch.

The PTO power transmission portion 13e has a PTO clutch 18 and a PTO shaft 19. The PTO shaft 19 is rotatably supported and is capable of transmitting power from the propulsion shaft 13a. The PTO shaft 19 has a PTO propulsion shaft 19a and a PTO output shaft 19b. The PTO propulsion shaft 19a is connected to the PTO output shaft 19b with the PTO transmission portion 20. However, the PTO propulsion shaft 19a may be connected to the PTO output shaft 19b without the PTO transmission portion 20.

The PTO transmission portion 20 is capable of changing the revolving speed of the PTO propulsion shaft 19a and transmitting the revolving speed to the PTO output shaft 19b by using an operation portion such as a PTO speed change lever. The PTO transmission portion 20 includes a gear shift actuator such as an electromagnetic solenoid or an electric motor configured to operate the operation portion based on a control signal from the controller portion (in-vehicle ECU), for example.

The PTO clutch 18 is a clutch configured to be switched between a connecting state in which the power of the propulsion shaft 13a is transmitted to the PTO shaft 19 and a shut-off state in which the power of the propulsion shaft 13a is not transmitted to the PTO shaft 19. In particular, the PTO clutch 18 is provided between the propulsion shaft 13a and the PTO propulsion shaft 19a. The PTO clutch 18 is constituted of a hydraulic clutch, an electric clutch, or the like, and when the clutch is engaged or disengaged, a state where the power of the propulsion shaft 13a (the power of the engine 11) is transmitted to the PTO shaft 19 and a state where the power of the propulsion shaft 13a is not transmitted to the PTO shaft 19 are respectively switched.

A power divider portion 21 is provided in the middle of the PTO output shaft 19b. The power divider portion 21 divides a revolving power transmitted to the PTO output shaft 19b into a first path 21a for outputting the revolving power from the input shaft 24 connected to the PTO output shaft 19b and a second path 21b for transmitting the revolving power to the generator 15. The power divider portion 21 includes a transmission mechanism 25 (see FIG. 15) described later. In the embodiment, the transmission mechanism 25 is a transmission mechanism including gears. However, the transmission mechanism 25 that constitutes the power branch portion 21 is not limited to the transmission mechanism including the gears, and may be another type of transmission mechanism (for example, a mechanism including a pulley and a belt, a mechanism including a sprocket and a chain, and the like).

The generator 15 provided on the second path 21b is connected to the motor 23 with the inverter 22. The motor 23 is an electric motor, and is driven (revolved) by the power (electric power) from the generator 15. The inverter 22 serves as a transmission that changes the revolving speed (speed) of the motor 23. The number of the motors 23 to be driven by the power from the generator 15 may be one or two or more. In the embodiment, the number of the motors 23 to be driven by the power from the generator 15 is two. Hereinafter, two of the motors 23 are respectively referred to as a first motor 231 and a second motor 232. The first motor 231 and the second motor 232 will be described in detail later.

<Generator Unit>

Next, the generator unit 12 including the generator 15 will be described below.

Figure 5:
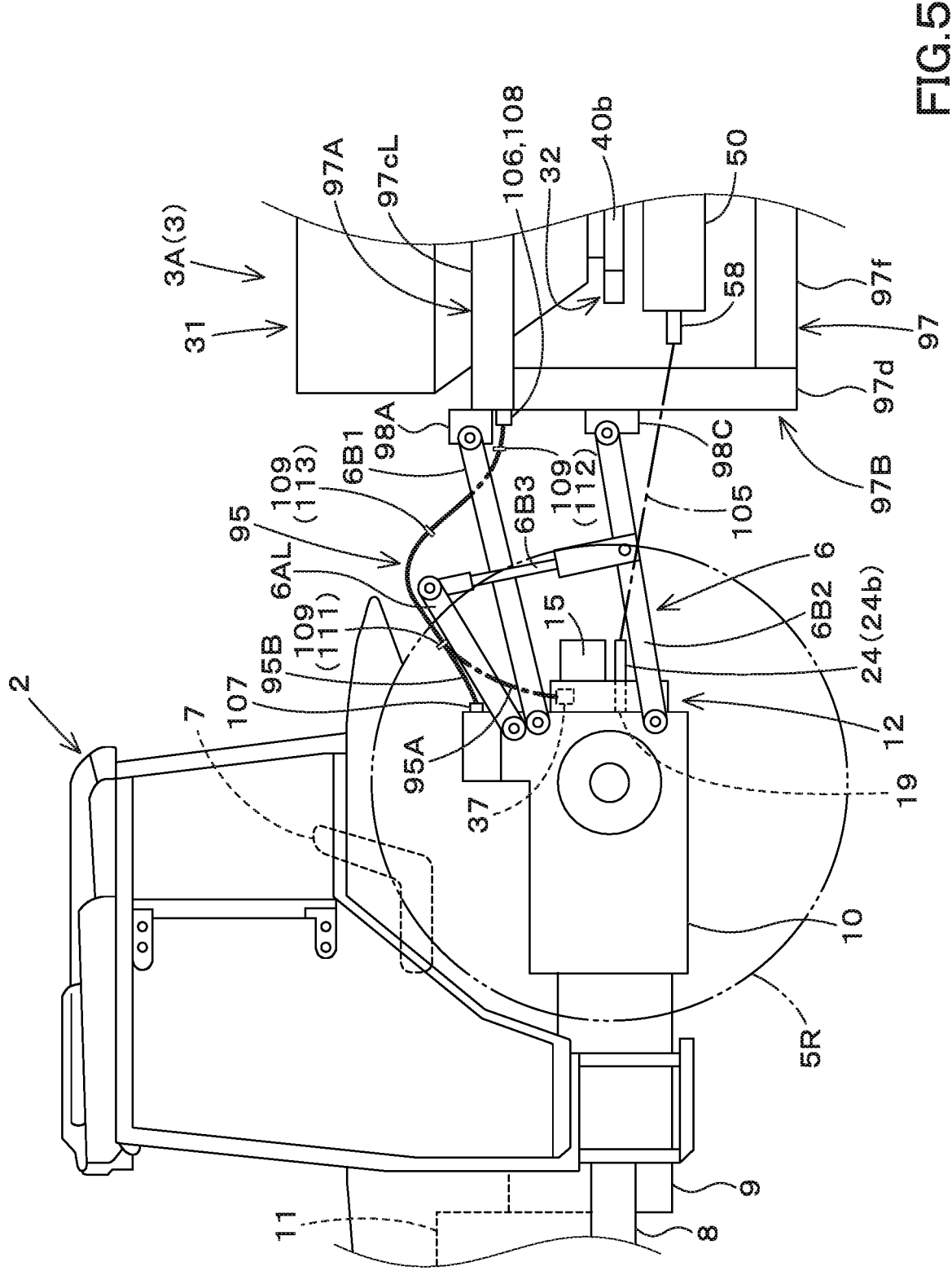
FIG. 5 is a side view illustrating a rear portion of a tractor to which the sprayer device is connected according to the embodiments.
Figure 6:
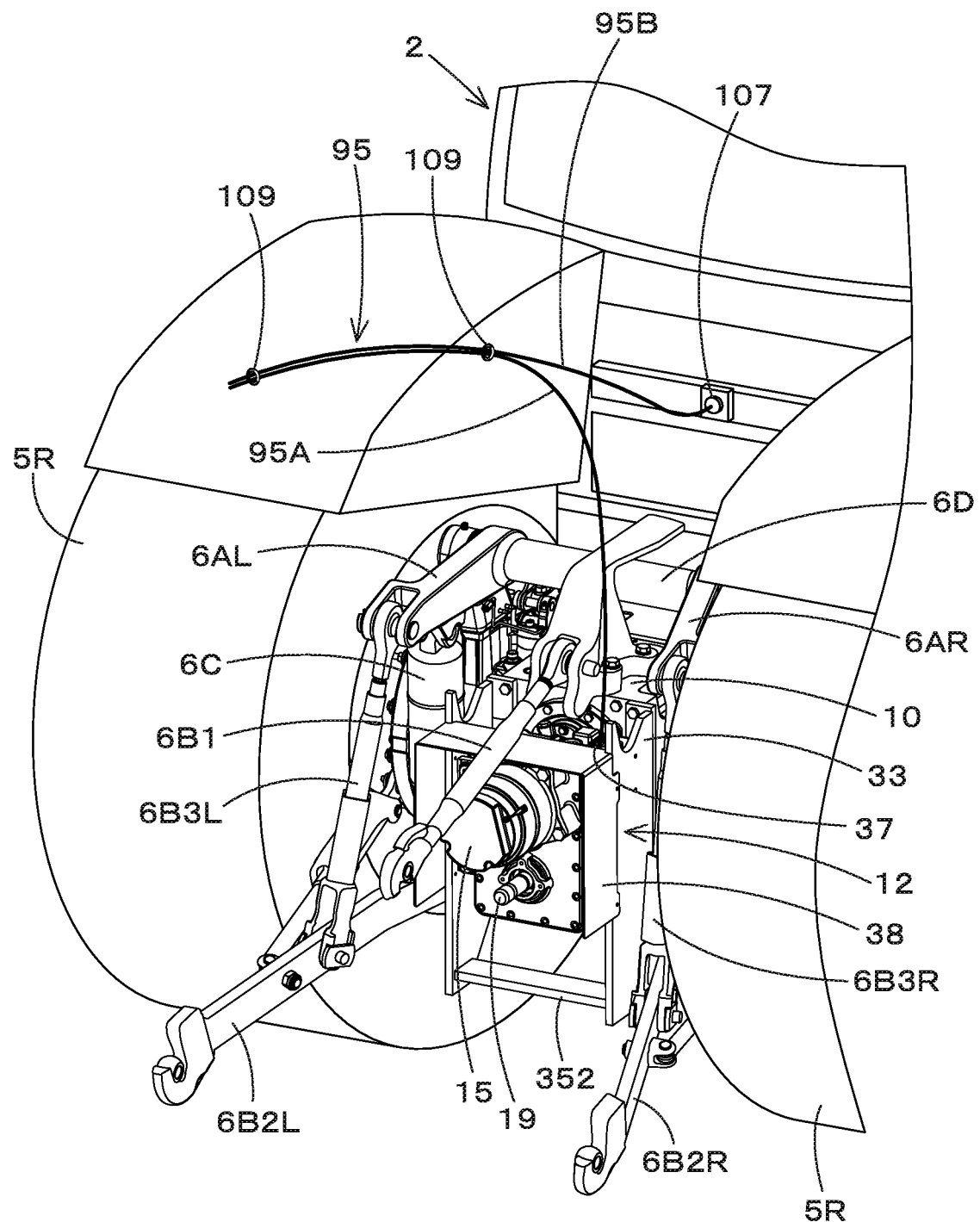
FIG. 6 is a perspective view illustrating a state where a power generator unit is attached to a rear portion of the tractor according to the embodiments.
Figure 7:
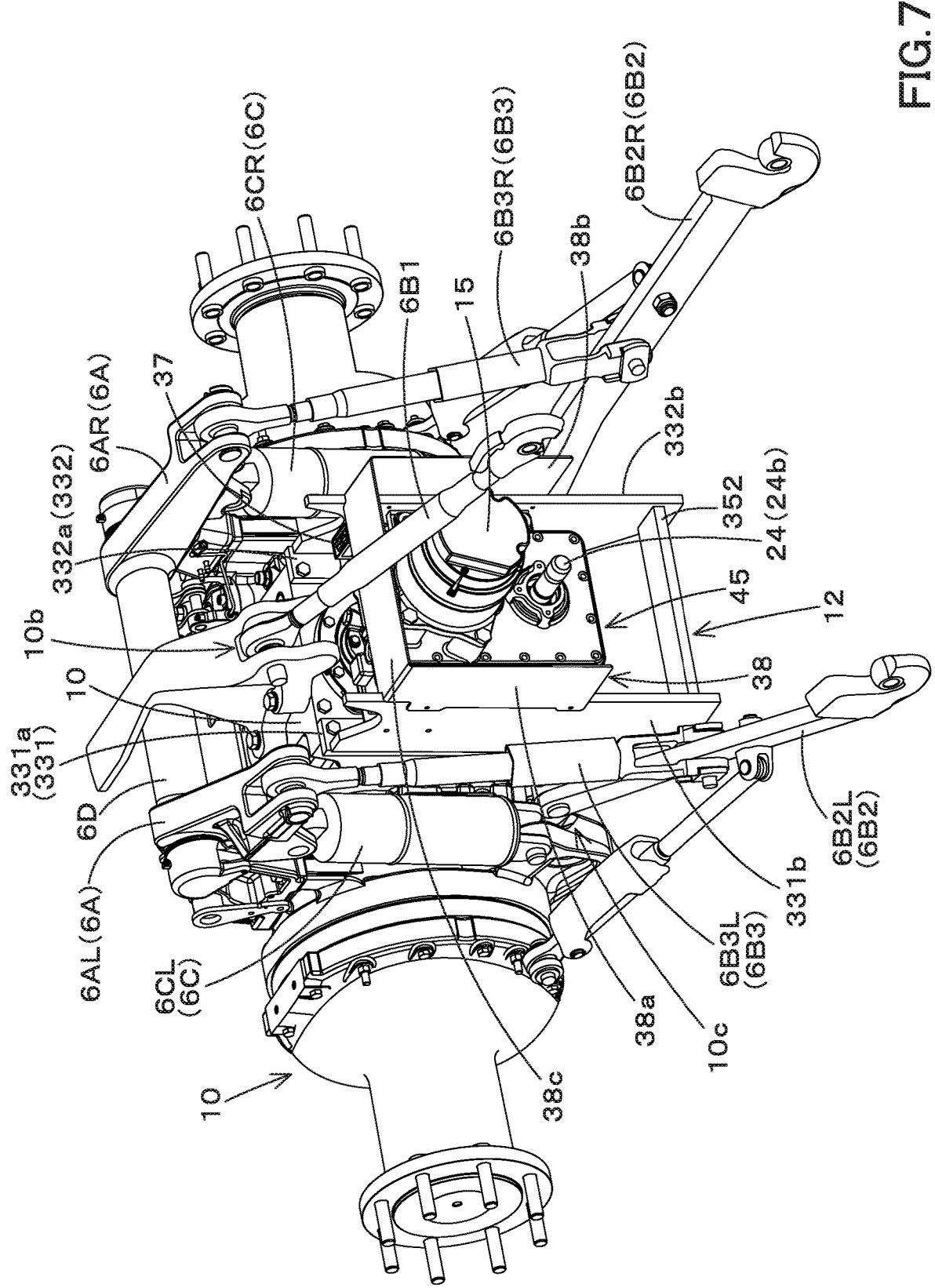
FIG. 7 is a perspective view illustrating a state where the power generator unit is attached to a rear portion of a transmission case according to the embodiments.
Figure 8:
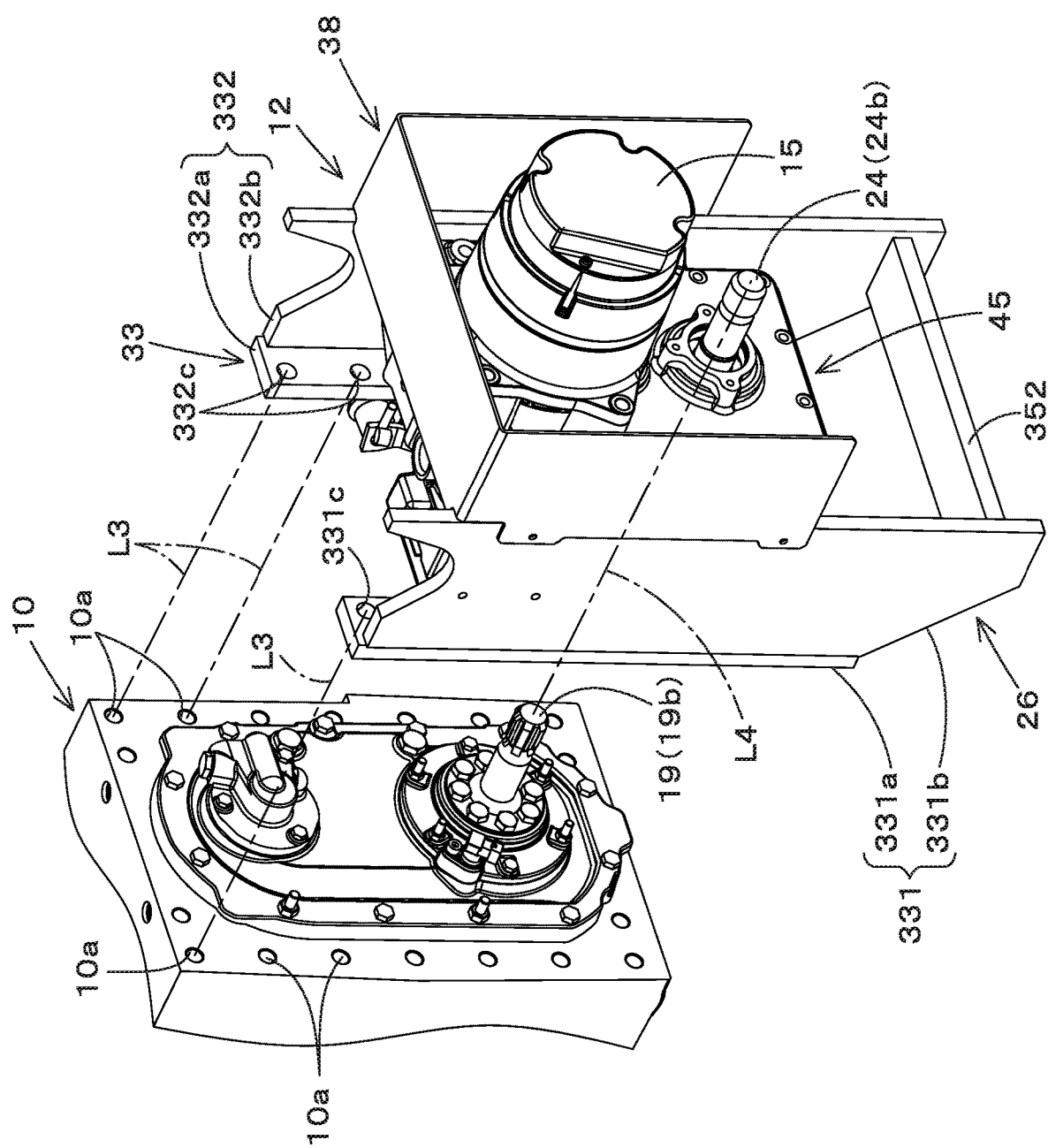
FIG. 8 is an exploded perspective view illustrating a way of attaching the power generator unit to the transmission case according to the embodiments.

As shown in FIG. 5 and FIG. 6, the generator unit 12 is mounted on the tractor (a traveling vehicle) 2. More in particular, as shown in FIG. 7 and FIG. 8, the generator unit 12 is mounted on the rear portion of the transmission case 10.

Figure 9:
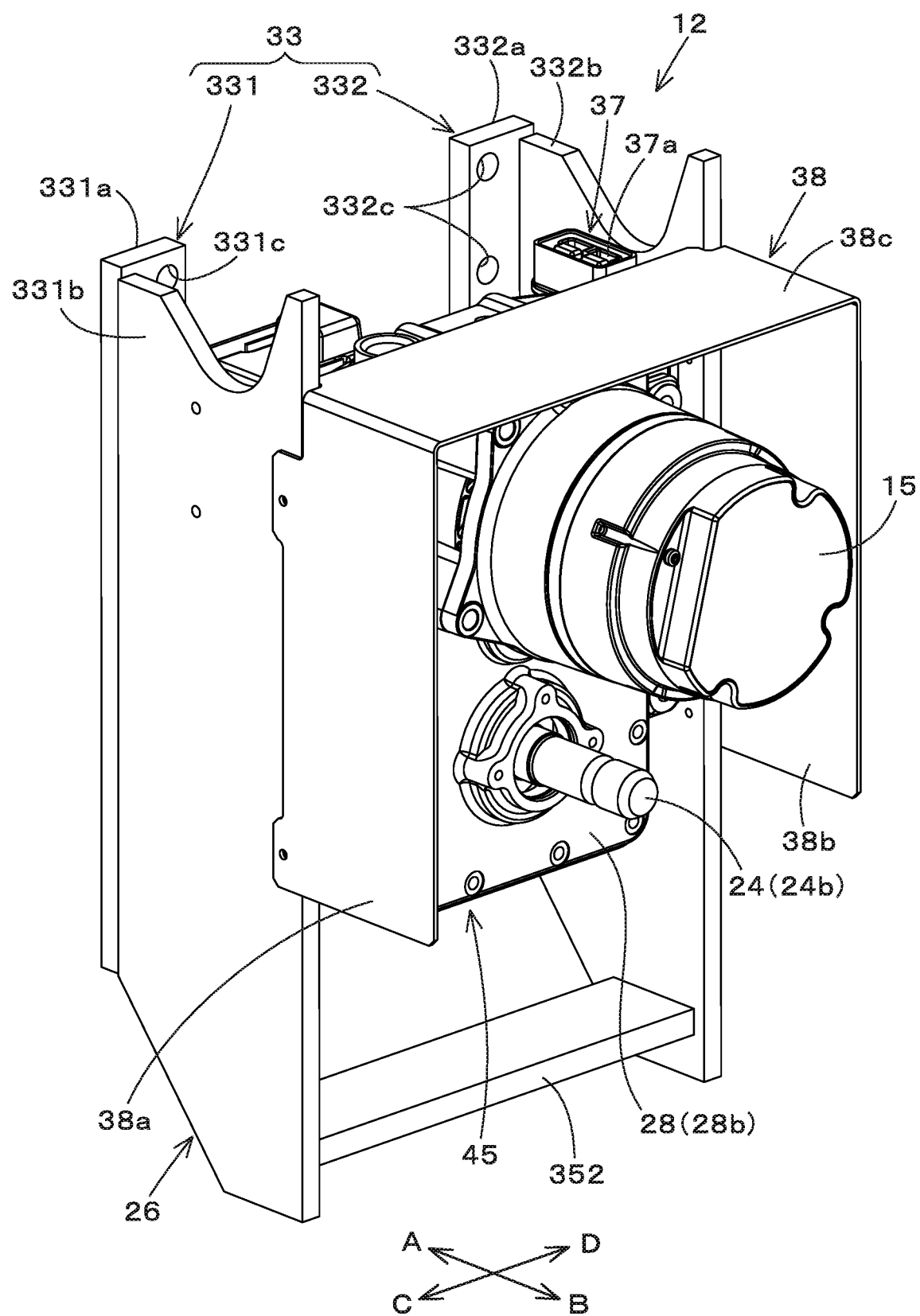
FIG. 9 is a perspective view illustrating the power generator unit according to the embodiments.

As shown in FIG. 9 to FIG. 15, the generator unit 12 includes a generator 15, an input shaft 24, a transmission mechanism 25, an attachment frame 26, and a connector 27. The generator unit 12 will be described below, but the direction with respect to the generator unit 12 is based on the state in which the generator unit 12 is mounted on the rear portion of the tractor 2 (see FIG. 5 and FIG. 6). In particular, a direction indicated by an arrowed line A in FIG. 9 is referred to as the front, a direction indicated by an arrowed line B is referred to as the rear, a direction indicated by an arrowed line C is referred to as the left, and a direction indicated by an arrowed line D is referred to as the right. In addition, the direction indicated by an arrowed line A and the direction indicated by an arrowed line B are collectively referred to as a vertical direction, and the direction indicated by an arrowed line C and the direction indicated by an arrowed line C are collectively referred to as the vehicle width direction.

The generator 15 is an alternator in the embodiment. However, the generator 15 may be a motor generator. The generator 15 rectifies the generated AC power and then outputs the DC power. However, the generator 15 may output the AC power. The output voltage of the generator 15 can be lower than 75V (less than 75V). According to the Low Voltage Directive (LVD) (2014/35/EU), electrical equipment used in the voltage range of DC 75V to 1500V is required to have the safety conforming to the regulation. However, by making the output voltage of 15 lower than 75 V, it can be used in a safer voltage range, which is lower than the voltage range specified by the LVD.

In addition, the generator 15 preferably has an output voltage of 60V or less. By using the generator 15 having an output voltage of 60V or less, no insulation measure is required. Moreover, it is excellent in safety and can reduce power consumption. Furthermore, the generator 15 can be made smaller and lighter.

Furthermore, the output voltage of the generator 15 can be set to 48V or less. By setting the output voltage of the generator 15 to 48V or less, the electrification technique for automobiles can be applied. In addition, electric power can be supplied to various types of working devices 3 for the agricultural work, and can drive them.

The output power of the generator 15 is preferably 20 kW or less, and is set in the range of, for example, 1 kW to 20 kw, 5 kW to 20 kW.

Figure 15:
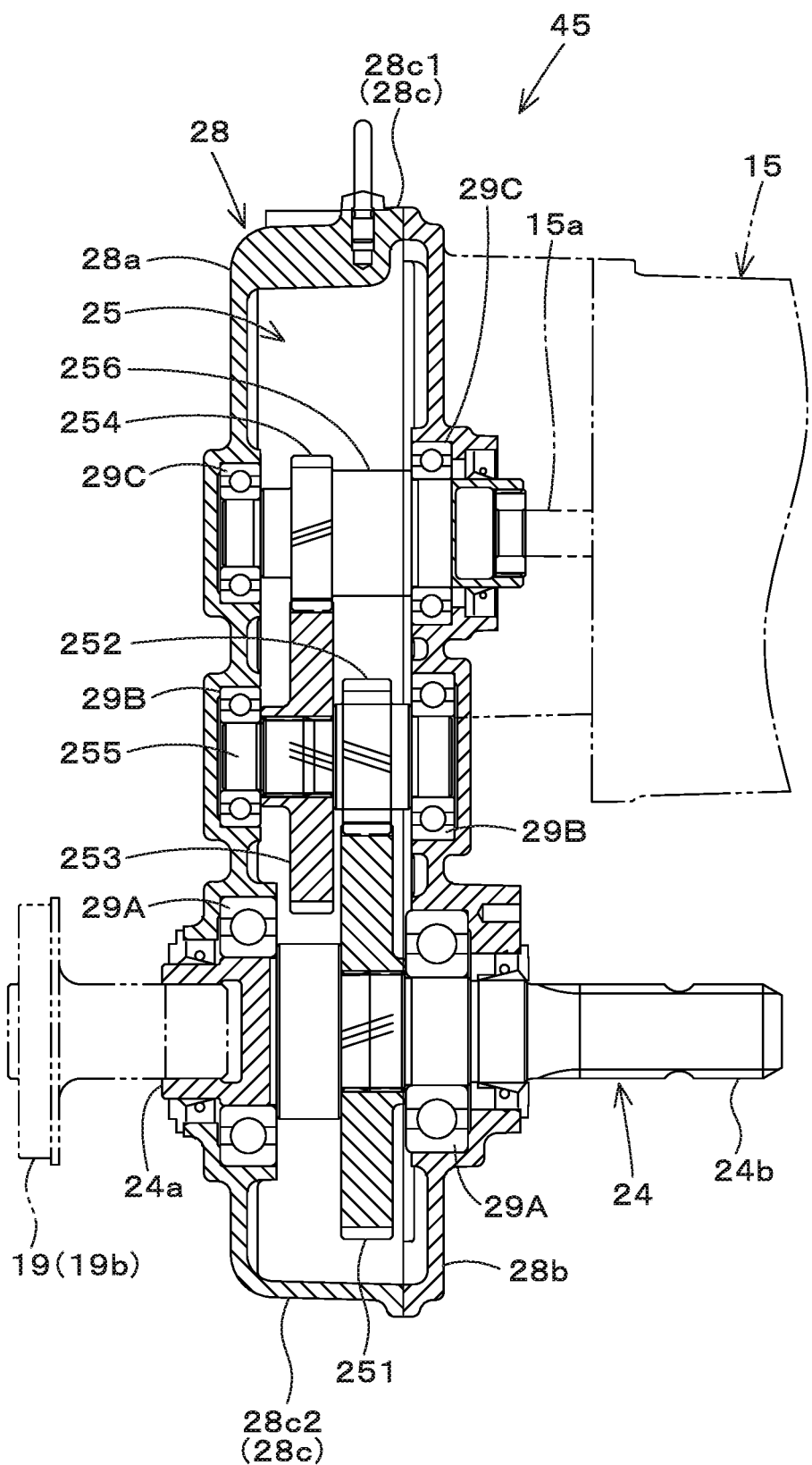
FIG. 15 is a vertical cross-section view illustrating a transmitter unit according to the embodiments.

The input shaft 24 is a shaft to which power from the engine 11 is inputted. As shown in FIG. 15, the input shaft 24 has a first connector portion 24a on one end side. The PTO shaft 19 (PTO output shaft 19b) is connected to the first connector portion 24a. In the present embodiment, the external tooth spline formed on the PTO output shaft 19b is fitted to the internal tooth spline formed on the first connector portion 24a. In this manner, the power from the engine 11 is inputted to the input shaft 24 from the first connector portion 24a through the PTO output shaft 19b. A second connector portion 24b is provided on the other end side of the input shaft 24. The second connector portion 24 can be connected to the working device 3. In the present embodiment, the second connector portion 24b is an external tooth spline formed on the outer circumference of the input shaft 24. Thereby, the power inputted to the input shaft 24 can be transmitted to the working device 3.

The PTO output shaft 19b may be an preliminarily-existing shaft that is provided in the tractor 2 from the beginning (before mounting the generator unit 12), but the existing shaft may be replaced with the PTO output shaft 19b, a new one, in mounting the generator unit 12. In particular, when mounting the generator unit 12, the existing PTO output shaft 19b of the tractor 2 may be removed from the transmission case 10 and a new PTO output shaft 19b having a different length may be mounted to the transmission case 10. For example, by replacing the existing PTO output shaft 19b with a new PTO output shaft 19b having a short length, the generator unit 12 can be mounted close to the tractor 2.

The transmission mechanism 25 is a mechanism configured to transmit, to the generator 15, the power inputted to the input shaft 24 to the generator 15. As shown in FIG. 15, the transmission mechanism 25 has a first gear 251, a second gear 252, a third gear 253, a fourth gear 254, an intermediate shaft 255, and an output shaft 256. The first gear 251 is attached to an intermediate portion of the input shaft 24 (between the first connector portion 24a and the second connector portion 24b). The first gear 251 is arranged on the same axis as the input shaft 24 and rotates integrally with the input shaft 24. The second gear 252 and the third gear 253 are mounted on the intermediate shaft 255. The intermediate shaft 255 is arranged parallel to the input shaft 24 and above the input shaft 24. The second gear 252 and the third gear 253 are arranged side by side in the axial direction of the intermediate shaft 255 and on the same axis as the intermediate shaft 255, and rotate integrally with the intermediate shaft 255. The second gear 252 is engaged with the first gear 251. The third gear 253 is engaged with the fourth gear 254. The fourth gear 254 is attached to the output shaft 256. The output shaft 256 is arranged parallel to the intermediate shaft 255 and above the intermediate shaft 255. The fourth gear 254 is arranged on the same axis as the output shaft 256, and rotates integrally with the output shaft 256.

The first gear 251, the second gear 252, the third gear 253, the fourth gear 254, and the intermediate shaft 255 are housed in the housing 28. A first bearing 29A, a second bearing 29B, and a third bearing 29C are arranged inside the housing 28. The first bearing 29A rotatably supports the input shaft 24. The second bearing 29B rotatably supports the intermediate shaft 255. The third bearing 29C rotatably supports the output shaft 256. As shown in FIG. 10 to FIG. 15, the housing 28 has a flat outer shape and a substantially rectangular parallelepiped shape, and has a first wall portion 28a, a second wall portion 28b, and a peripheral wall portion 28c.

Figure 10:
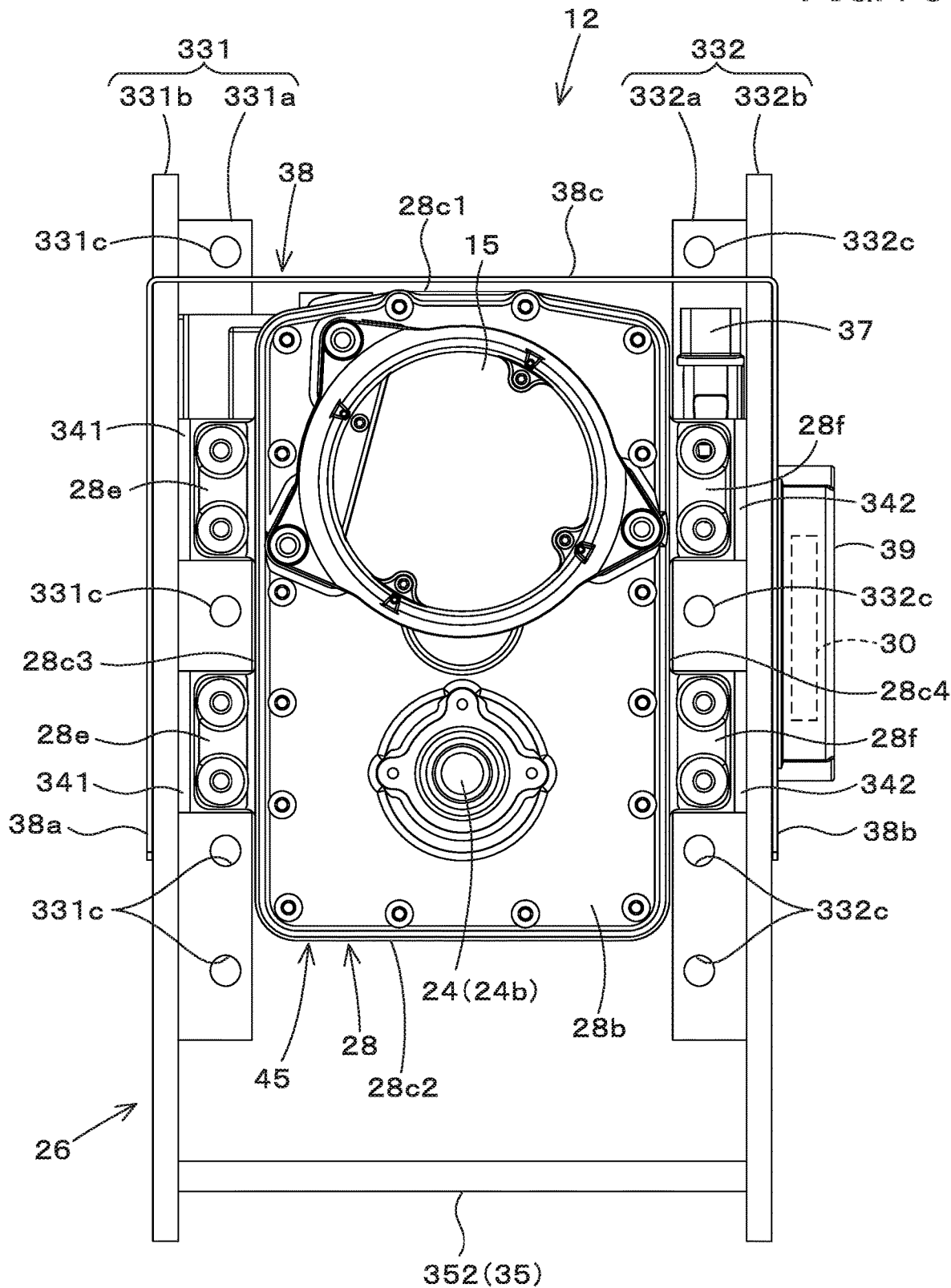
FIG. 10 is a back view illustrating the power generator unit according to the embodiments.
Figure 11:
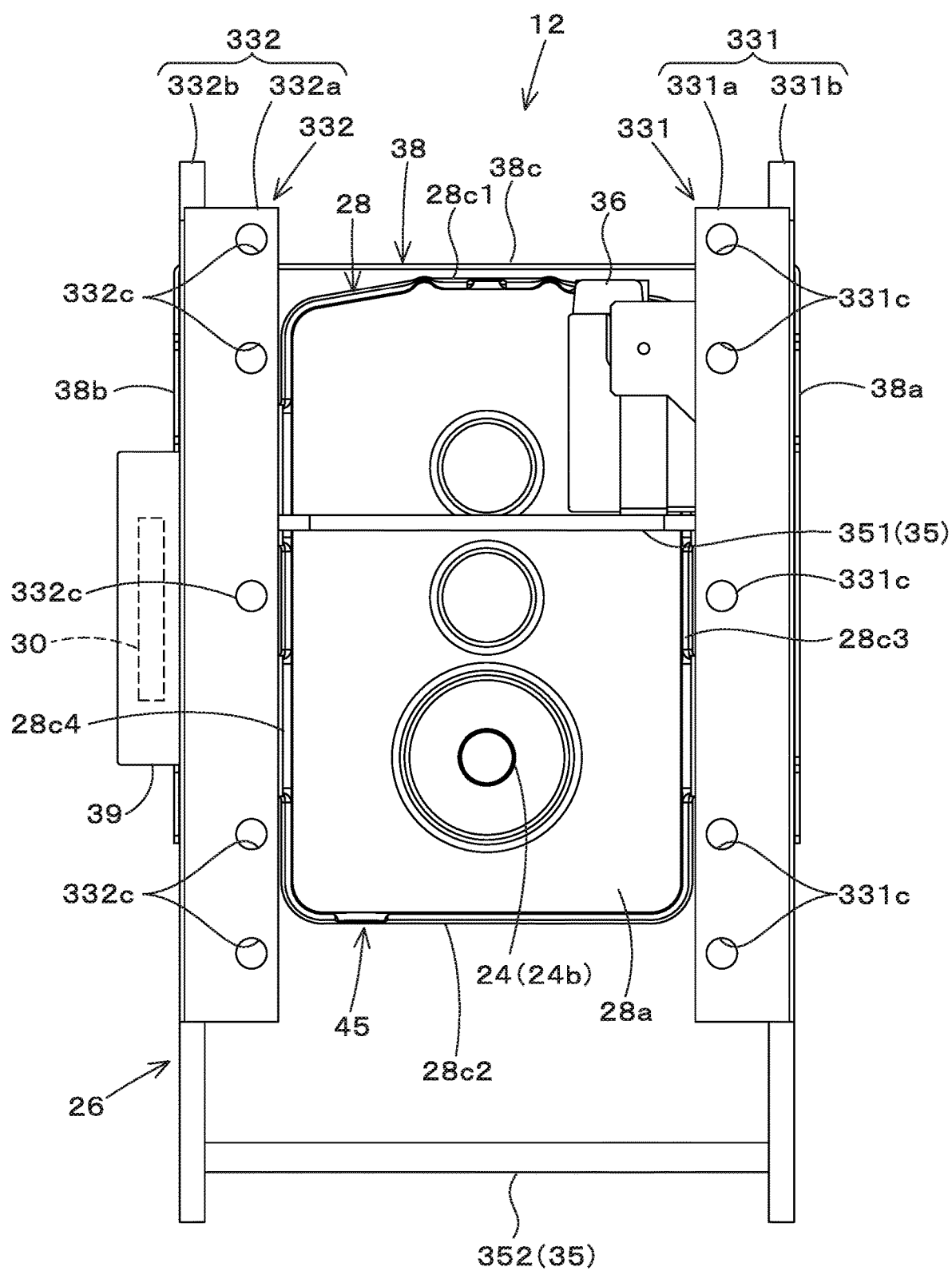
FIG. 11 is a front view illustrating the power generator unit according to the embodiments.
Figure 14:
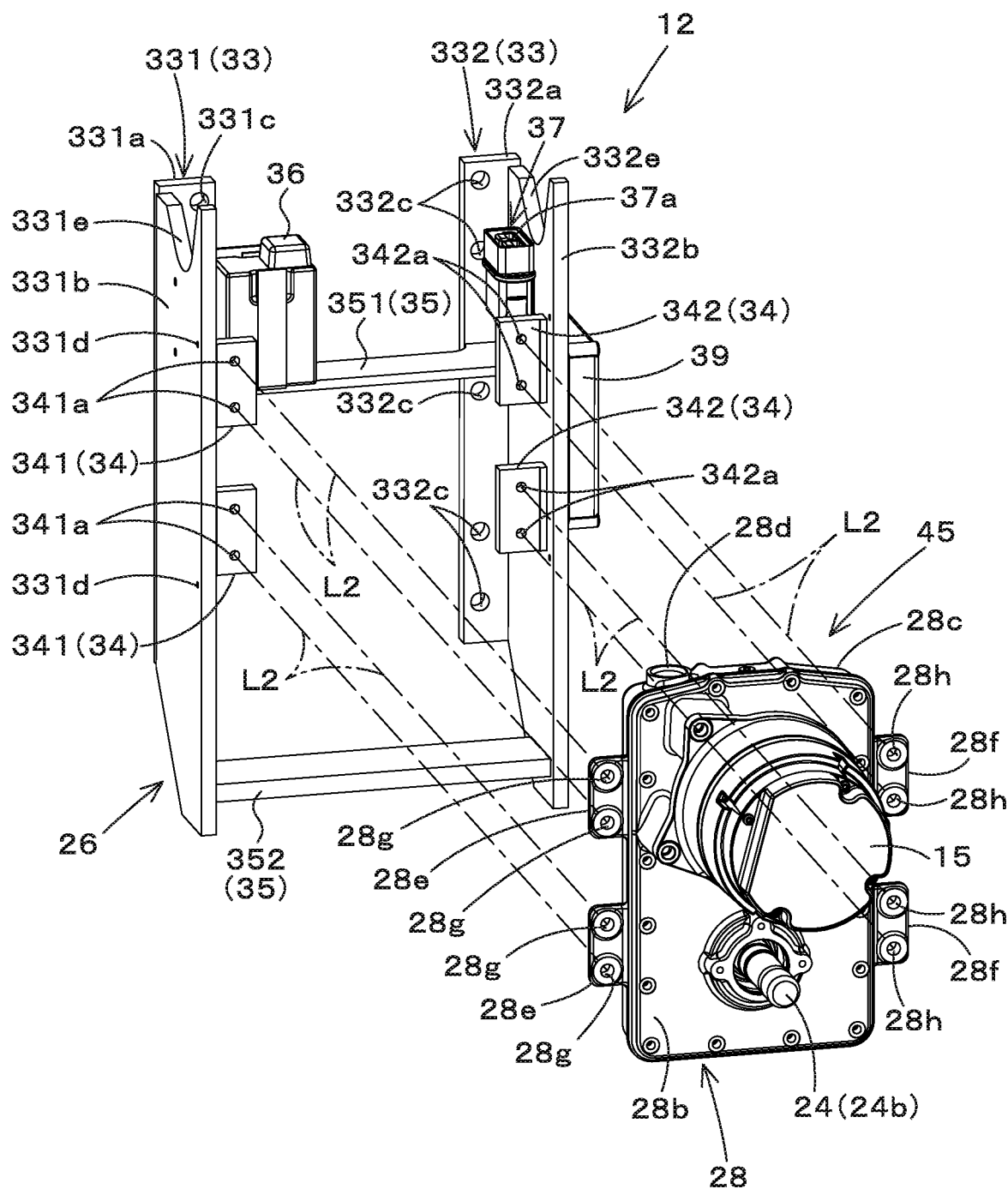
FIG. 14 is an exploded perspective view illustrating the power generator unit according to the embodiments.

As shown in FIG. 15, the first wall portion 28a is arranged on one end side (a front side) of the input shaft 24. The second wall portion 28b is arranged on the other end side (a rear side) of the input shaft 24. The second wall portion 28b faces the first wall portion 28a. The peripheral wall portion 28c connects the periphery of the first wall portion 28a and the periphery of the second wall portion 28b. As shown in FIG. 10, the peripheral wall portion 28c has an upper wall portion 28c1, a lower wall portion 28c2, a left wall portion 28c3, and a right wall portion 28c4. A fuel filler port 28d is provided on the upper wall portion 28c1. As shown in FIG. 10 and FIG. 14, the left wall portion 28c3 is provided with a first protrusion 28e. The first protruding portion 28e is plate-shaped and protrudes leftward from the left wall portion 28c. The first protruding portions 28e are provided in plurality (two) at intervals in the vertical direction. The right wall portion 28c4 is provided with a second protruding portion 28f. The second protruding portion 28f has a plate shape and protrudes rightward from the right wall portion 28c4. A plurality of (two) second protruding portions 28f are provided at intervals in the vertical direction. A first through hole 28g is formed in the first protruding portion 28e. A second through hole 28h is formed in the second protrusion 28f.

As shown in FIG. 15, the input shaft 24 penetrates the housing 28. The first connector portion 24a of the input shaft 24 protrudes forward from the first wall portion 28a of the housing 28. The second connector portion 24b of the input shaft 24 protrudes rearward from the second wall portion 28b of the housing 28. The output shaft 256 has one end (rear end) protruding rearward from the housing 28, and the input shaft 15a of the generator 15 is connected to the protruding portion. In this manner, the generator 15 is arranged above the input shaft 24.

The generator 15 is attached to the second wall portion 28b of the housing 28 with a bolt (not shown in the drawings). In this manner, the generator 15, the input shaft 24, the transmission mechanism 25, and the housing 28 are integrated. In the following description, the generator 15, the input shaft 24, the transmission mechanism 25, and the housing 28 that are integrated are collectively referred to as a "transmission unit 45".

The revolving power from the engine 11 is inputted to the input shaft 24 from the first connector portion 24a through the PTO output shaft 19b. The revolving power inputted to the input shaft 24 is divided and transmitted into two. One of the divided revolving powers is outputted from the second connector portion 24b of the input shaft 24. The other of the divided revolving power is outputted from the output shaft 256 through the first gear 251 mounted on the input shaft 24, the second gear 252, the third gear 253, and the fourth gear 256, and then is transmitted from the output shaft 256 to the generator 15.

In this manner, the revolving power from the engine 11 is transmitted to the generator 15 through the transmission mechanism 25, and thereby the generator 15 is driven. The transmission mechanism 25 also serves as a speed-changing mechanism (an acceleration mechanism). Thus, the revolving speed of the output shaft 256 increases as compared with the revolving speed of the PTO output shaft 19b. In addition to the output from the output shaft 25b, the revolving power from the engine 11 is also outputted from the second connector portion 24b of the input shaft 24.

As shown in FIG. 14 and the like, the transmission unit 45 is attached to the attachment frame 26. The attachment frame 26 has a mounting portion 33, an attachment portion 34, and a connector portion 35. In the present embodiment, the attachment frame 26 is a ladder-shaped frame (a ladder hitch frame) having a hitch portion. However, the attachment frame 26 is not limited to the ladder hitch frame.

The mounting portion 33 is a portion to be mounted on the tractor 2. The mounting portion 33 includes a first mounting portion 331 and a second mounting portion 332. The first mounting portion 331 is arranged on the left side of the attachment frame 26. The second mounting portion 332 is arranged on the right side of the attachment frame 26. The first mounting portion 331 is mounted on one side (the left side) of the tractor 2 in the width direction (in the vehicle width direction). The second mounting portion 332 is mounted on the other side (the right side) of the tractor 2 in the width direction.

As shown in FIG. 10 to FIG. 14, the first mounting portion 331 has a first front plate 331a and a first side plate 331b. The first front plate 331a is an elongated plate (a strip-shape plate) stretching in the vertical direction. One surface of the first front plate 331a faces the front (the tractor 2 side), and the other surface faces the rear (the working device 3 side). A plurality of first mounting holes 331c are formed in the first front plate 331a at intervals in the vertical direction. The first side plate 331b extends rearward from the first front plate 331a. The first side plate 331b is arranged such that one surface (an outer surface) faces the left and such that the other surface (an inner surface) faces the right. A plurality of first screw holes 331d are formed in the first side plate 331b at intervals in the vertical direction. A first cutout portion 331e cut out downward is formed on an upper portion of the first side plate 331b.

As shown in FIG. 10 to FIG. 14, the second mounting portion 332 has a second front plate 332a and a second side plate 332b. The second front plate 332a is an elongated plate (a strip plate) stretching in the vertical direction. The second front plate 332a is arranged such that one surface faces the front and the other surface faces the rear. A plurality of second mounting holes 332c are formed in the second front plate 332a at intervals in the vertical direction. The second side plate 332b stretches rearward from the second front plate 332a. The second side plate 332b is arranged such that one surface (an outer surface) faces the left and the other surface (an inner surface) faces the left. The other surface (an inner surface) of the second side plate 332b faces the other surface (an inner surface) of the first side plate 331b. A plurality of second screw holes 332d (see FIG. 16) are formed in the second side plate 332b at intervals in the vertical direction. A second cutout portion 332e cut out downward is formed on the upper portion of the second side plate 332b.

The attachment portion 34 is a portion to which the transmission unit 45 including the transmission mechanism 25 is attached. The attachment portion 34 includes a first attachment portion 341 and a second attachment portion 342.

The first attachment portion 34 firststretches from the inner surface of the first side plate 331b to the right (to the second side plate 332b side). The first attachment portion 341 has a plate shape, and one surface thereof faces the front and the other surface thereof faces the rear. The first attachment portion 341 is arranged behind the first front plate 331a of the first mounting portion 331. One surface (a front surface) of the first attachment portion 341 faces the other surface (a rear surface) of the first front plate 331a. A plurality of (two) first attachment portions 341 are provided at intervals in the vertical direction. A first attachment hole 341a is formed in the first attachment portion 341.

The second attachment portion 342 stretches from the inner surface of the second side plate 332b toward the left side (the first side plate 331b side). The second attachment portion 342 has a plate shape, and one surface thereof faces the front and the other surface thereof faces the rear. The second attachment portion 342 is arranged behind the second front plate 332a of the second mounting portion 332. One surface (a front surface) of the second attachment portion 342 faces the other surface (a rear surface) of the second front plate 332a. A plurality of (two) second attachment portions 342 are provided at intervals in the vertical direction. A second attachment hole 342a is formed in the second attachment portion 342.

The connector portion 35 stretches in the vehicle width direction and connects the first mounting portion 331 and the second mounting portion 332. In particular, the connector portion 35 connects the inner surface of the first side plate 331b and the inner surface of the second side plate 332b. The connector portion 35 includes a first connector portion 351 and a second connector portion 352. The first connector portion 351 is provided behind the mounting portion 33 and in front of the attachment portion 34. The first connector portion 351 connects the first side plate 331b and the second side plate 332b, and also connects the first front plate 331a and the second front plate 332a. The second connector portion 352 stretches in the vehicle width direction below the first connector portion 351. The second connector portion 352 connects the lower portion of the first side plate 331b and the lower portion of the second side plate 332b. A draw bar (a tow hitch) or the like can be attached to the second connector portion 352.

Figure 12:
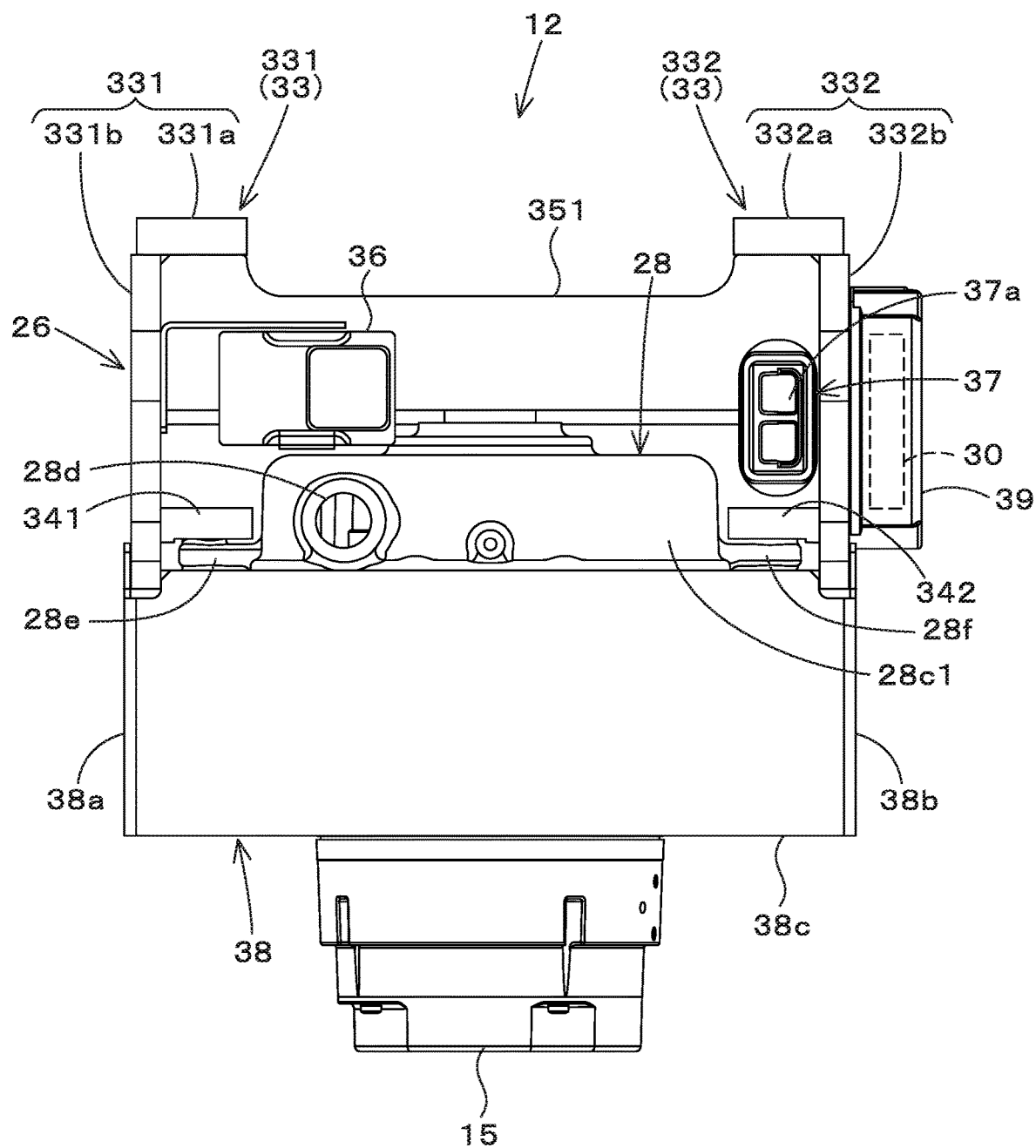
FIG. 12 is a plan view illustrating the power generator unit according to the embodiments.
Figure 13:
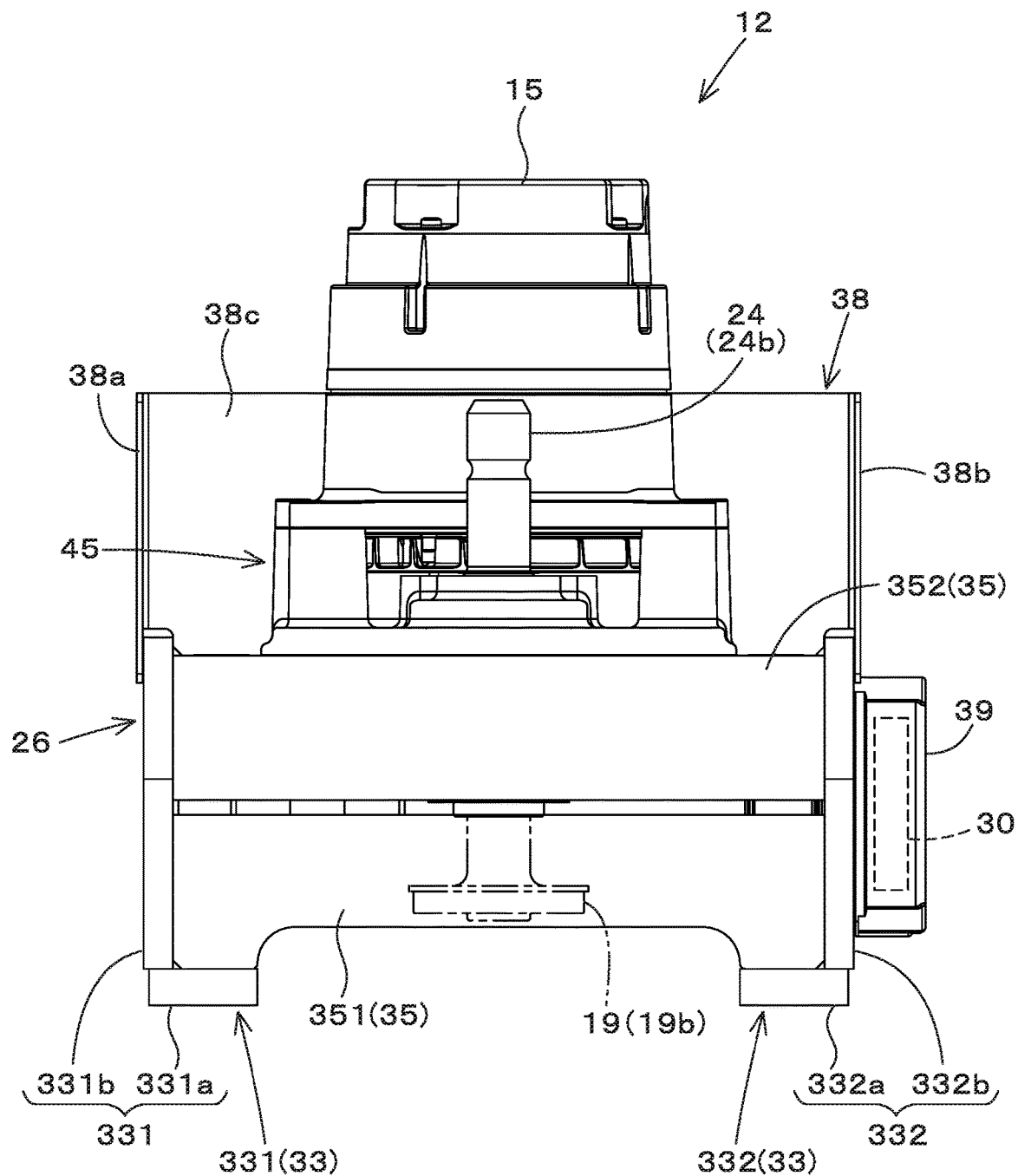
FIG. 13 is a bottom view illustrating the power generator unit according to the embodiments.

The fluid tank 36 is attached to the first connector portion 351. The fluid tank 36 stores the fluid supplied into the housing 28. As shown in FIG. 12, the fluid tank 36 is located in the vicinity of the front of the fluid supply port 28d of the housing 28 when the transmission unit 45 is attached to the attachment frame 26.

As shown in FIG. 12, FIG. 14, and the like, a connector 37 (hereinafter, referred to as a "first output connector 37") is attached to the attachment frame 26. The first output connector 37 and the generator 15 are connected by a conductive cable (not shown in the drawings). Thus, the electric power outputted from the generator 15 is guided to the first output connector 37 through the conductive cable. The first output connector 37 can be connected to a cable for supplying, to the working device 3, the electric power output from the generator 15 (hereinafter, referred to as an "electric power supply cable"). By connecting the power supply cable to the first output connector 37, the power outputted from the generator 15 can be outputted from the first output connector 37 through the power supply cable. FIG. 6 shows a state in which the power supply cable 95A is connected to the first output connector 37. The power supply cable 95A will be further described below.

The first output connector 37 is arranged between the first mounting portion 331 and the second mounting portion 332. In other words, the first output connector 37 is arranged inside the outer surface of the mounting portion 33 (a position not protruding from the outer surface). In particular, the first output connector 37 is arranged between the first side plate 331b and the second side plate 332b. In the embodiment, the first output connector 37 is attached to the inner surface of the second side plate 332b. However, the first output connector 37 may be attached to another position, for example, on the inner surface of the first side plate 331b, on the first connector portion 351, or the like.

The first output connector 37 is arranged on the upper portion of the generator unit 12 by being attached to the upper portion of the inner surface of the second side plate 332b. In the first output connector 37, a connector portion 37a to which a power supply cable is connected is arranged facing upward. In this manner, the power supply cable can be easily connected to the connector portion 37a of the first output connector 37 from above, thereby being easily arranged. The connector portion 37a is closed by a lid (not shown in the drawings) when not in use.

Figure 16:
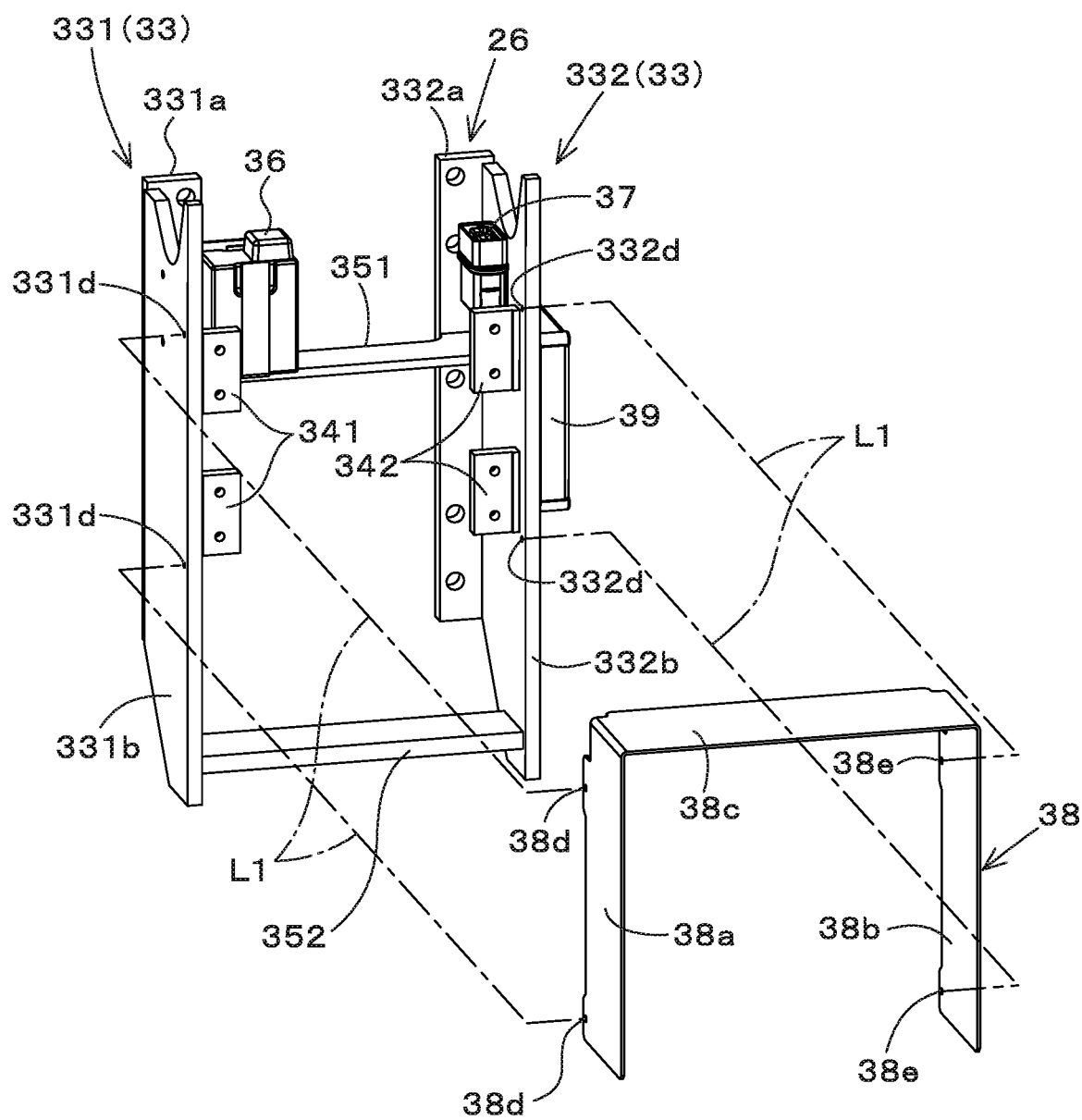
FIG. 16 is an exploded perspective view illustrating a way of attaching a cover member to an attachment frame according to the embodiments.

As shown in FIG. 9 and FIG. 16, a cover member 38 is attached to the attachment frame 26. The cover member 38 has one side plate 38a, the other side plate 38b, and an upper plate 38c. The one side plate 38a, the other side plate 38b, and the upper plate 38c are integrally formed of one plate (a metal plate or the like). The one side plate 38a and the other side plate 38b are arranged with one surface opposed to the left and the other surface opposed to the right. The other surface (an inner surface) of the one side plate 38a and one surface (an inner surface) of the other side plate 38b face each other. The upper plate 38c connects the upper portion of the one side plate 38a and the upper portion of the other side plate 38b. On one side plate 38a, a plurality of (two) first holes 38d are formed at intervals in the vertical direction. A plurality of (two) second holes 38e are formed in the other side plate 38b at intervals in the vertical direction.

The cover member 38 is attached to the attachment frame 26 by stacking the first side plate 331b and the one side plate 38a and fastening them with bolts, and stacking the second side plate 332b and the other side plate 38b and fastening them with bolts. More in particular, as shown by the chain dash line L1 in FIG. 16, the first hole 38d and the first screw hole 331d are superposed, the second hole 38e and the second screw hole 332d are superposed, and bolts (not shown in the drawings) are respectively inserted to the first hole 38d and the second holes 38e, and the bolts are respectively screwed into the first screw hole 331d and the second screw hole 332d. In this manner, as shown in FIG. 9, the cover member 38 is attached to the attachment frame 26.

Under the state where the cover member 38 is attached to the attachment frame 26, the cover member 38 protrudes rearward from the attachment frame 26. In addition, the cover member 38 covers the periphery of the generator 15 under the state of being attached to the attachment frame 26. In particular, the one side plate 38a covers one side (a left side) of the generator 15. The other side plate 38b covers the other side (a right side) of the generator 15. The upper plate 38c covers the upper side of the generator 15. That is, the cover member 38 covers the periphery of the generator 15 in three directions (the left side, the right side, and the upper side). The cover member 38 also covers the periphery of the output shaft 24 protruding from the housing 28 in three directions (the left side, the right side, and the upper side). This configuration is capable of preventing an operator or the like from unintentionally coming into contact with the generator 15, the output shaft 24, or the like. The cover member 38 may cover only a part of the generator 15 in the front-rear direction. As shown in FIG. 12 and the like, In the present embodiment, the cover member 38 covers the front portion of the generator 15 in the three directions mentioned above with respect to the front-rear direction, but does not cover the rear portion. However, the cover member 38 covers the entire (total length) of the output shaft 24 protruding from the housing 28 in the three directions with respect to the front-rear direction.

In addition, as shown in FIG. 10, under the state where the cover member 38 is attached to the attachment frame 26, the first output connector 37 is arranged below the upper plate 38c. In addition, as shown in FIG. 12, the first output connector 37 is arranged between the cover member 38 and the second front plate 332a of the second mounting portion 332 in the front-rear direction. With these configurations, it is possible to prevent an object or an operator from being unintentionally contact with the first output connector 37.

As shown in FIG. 10 to FIG. 13, the generator unit 12 includes a controller portion 30 (hereinafter, referred to as "first controller portion 30") housed in a chassis 39. The first controller portion 30 is a computer including electronic/electrical components (CPU, storage device, etc.) and the like, and is in particular an ECU. In the present embodiment, the first controller portion 30 is included in the generator unit 12, but may be included in the tractor 2 or may be included in both the tractor 2 and the generator unit 12. The first controller portion 30 controls the output from the generator 15 based on the control signal outputted from the in-vehicle ECU. In the present embodiment, the first controller portion 30 and the in-vehicle ECU are provided separately, but the in-vehicle ECU may have the function of the first controller portion 30. In addition, the first controller portion 30 may control the output from the generator 15 independently from the control signal from the in-vehicle ECU.

The first controller 30 controls the output of electric power from the generator 15 to the first output connector 37. In particular, the first controller portion 30 controls ON/OFF of output of electric power from the generator 15 to the first output connector 37. In addition, the first controller portion 30 may control the increasing/decreasing in the output of electric power from the generator 15 to the first output connector 37.

The first controller portion 30 is housed in the chassis 39 and attached to the attachment frame 26. In particular, the chassis 39 that houses the first controller portion 30 is attached to the second side plate 332b of the second mounting portion 332. In the present embodiment, the chassis 39 is attached to the outer surface of the second side plate 332b, but may be attached to the outer surface of the first side plate 331b. In addition, the chassis 39 may be attached to the inner surface of the second side plate 332b, the inner surface of the first side plate 331b, or the connector portion 35. In that case, the first controller portion 30 is arranged between the first mounting portion 331 and the second mounting portion 332.

As shown in FIG. 14, the generator unit 12 is configured by attaching the transmission unit 45 to the attachment frame 26. For mounting the transmission unit 45 to the attachment frame 26, the first attachment portion 341 and the first protruding portion 28e are stacked and fastened with a fastener, and the second attachment portion 342 and the second protruding portion 28f are stacked and fastened with a fastener. In particular, as shown by the one-dot chain line L2 in FIG. 14, the first through hole 28g and the first attachment hole 341a overlap each other, and the second through hole 28h and the second attachment hole 342a overlap each other. A bolt (not shown I the drawings) is inserted into each overlapped holes, and a nut (not shown in the drawings) is screwed to the bolt. In this manner, the transmission unit 45 is attached to the attachment frame 26 as shown in FIG. 10.

As shown in FIG. 10 and the like, under the state where the transmission unit 45 is attached to the attachment frame 26, the transmission unit 45 is arranged between the first side plate 331b and the second side plate 332b. The generator 15 and the input shaft 24 are arranged between the first mounting portion 331 and the second mounting portion 332.

As shown in FIG. 7 and FIG. 8, the generator unit 12 is attached to the tractor 2. In particular, the generator unit 12 is attached to the rear portion of the transmission case 10 of the tractor 2. The attachment of the generator unit 12 to the transmission case 10 is shown by a chain line L3 in FIG. 8, which overlaps a first mounting hole 331c and a second mounting hole 332c formed on the attachment frame 26 with the screw hole 10a formed on the rear surface of the transmission case 10, and inserts a bolt (not shown in the drawings) into the first mounting hole 331c and the second mounting hole 332c and is screwed to the screw hole 10a. In this manner, the attachment frame 26 is mounted on the rear surface of the transmission case 10, and the generator unit 12 is mounted on the tractor 2. Note that, in FIG. 8, the chain line L3 representing the overlapping between the first mounting hole 331c and the second mounting hole 332c and the screw hole 10a shows only a part of the configuration (only a visible part). The number of overlapping points between the first mounting hole 331c and the second mounting hole 332c and the screw hole 10a matches the total number of the first mounting holes 331c and the second mounting holes 332c. In the present embodiment, there are ten overlapping points in total (five on the first mounting portion 331 side and five on the second mounting portion 332 side).

As shown by the chain line L4 in FIG. 8, the PTO shaft 19 (a PTO output shaft 19b) protruding from the transmission case 10 and the input shaft 24 of the generator unit 12 are arranged on the same straight line. In this manner, when the generator unit 12 is mounted on the transmission case 10, the PTO shaft 19 (the PTO output shaft 19b) protruding from the transmission case 10 is connected to the first connector portion 24a of the input shaft 24 of the generator unit 12. (see FIG. 15).

The generator unit 12 can be easily attached to and detached from the transmission case 10 by attaching and detaching bolts that fasten the attachment frame 26 and the transmission case 10. By attaching/detaching the generator unit 12 to/from the transmission case 10, the generator 15 can be attached to and detached from the transmission case 10. Thus, the generator 15 can be easily attached to the tractor 2 that does not include the generator 15, if necessary. By mounting the generator unit 12 on the tractor 2, electric power can be supplied from the tractor 2 to the motor 23 of the working device 3 to drive the motor 23.

Next, the positional relation between the generator unit 12 and the connector device 6 established when the generator unit 12 is attached to the transmission case 10 will be described.

As shown in FIG. 7, the connector device 6 is connected to the rear portion of the transmission case 10. The connector device 6 has a lift arm 6A, a three-point link mechanism 6B, and a shift cylinder 6C.

The lift arm 6A includes a first lift arm 6AL and a second lift arm 6AR. The first lift arm 6AL is arranged on one side (the left side) in the vehicle width direction. The second lift arm 6AR is arranged on the other side (the right side) in the vehicle width direction. Front ends of the first lift arm 6AL and the second lift arm 6AR are pivotally supported by a lateral shaft 6D supported on an upper portion of the transmission case 10, and stretch rearward.

The three-point link mechanism 6B has a top link 6B1, a lower link 6B2, and a lift rod 6B3. The top link 6B1 is arranged between the first lift arm 6AL and the second lift arm 6AR, and the front end portion is pivotally supported by the first pivotal support portion 10b provided at the upper portion of the transmission case 10. The lower link 6B2 includes a first lower link 6B2L and a second lower link 6B2R. The front end portions of the first lower link 6B2L and the second lower link 6B2R are pivotally supported by second pivot portions 10c provided at the lower left portion and the lower right portion of the transmission case 10. The lift rod 6B3 includes a first lift rod 6B3L and a second lift rod 6B3R. The upper end portion of the first lift rod 6B3L is connected to the rear end portion of the first lift arm 6AL, and the lower end portion is connected to the middle portion of the first lower link 6B2L in the length direction. The upper end portion of the second lift rod 6B3R is connected to the rear end portion of the second lift arm 6AR, and the lower end portion is connected to the middle portion of the second lower link 6B2R in the longitudinal direction.

A joint capable of connecting the working device 3 is provided at the rear end portion of the top link 6B1 and the rear end portion of the lower link 6B2. By connecting the working device 3 to the rear end of the top link 6B1 and the rear end of the lower link 6B2, the working device 3 is connected to the rear of the tractor 2 so as to be able to move up and down.

The lift cylinder 6C is a hydraulic cylinder. The lift cylinder 6C includes a first lift cylinder 6CL and a second lift cylinder 6CR. One end portion of the first lift cylinder 6CL is connected to the first lift arm 6AL, and the other end portion is connected to the lower left part of the transmission case 10. The second lift cylinder 6CR has one end portion connected to the second lift arm 6AR and the other end portion connected to the lower right portion of the transmission case 10. By driving the lift cylinder 6C, the first lift arm 6AL and the second lift arm 6AR rotate about the horizontal axis 6D and swing in the vertical direction. An electromagnetic control valve is connected to the first lift cylinder 6CL and the second lift cylinder 6CR. The electromagnetic control valve is capable of driving (stretching and shortening) the first lift cylinder 6CL and the second lift cylinder 6CR based on a control signal from the controller portion (in-vehicle ECU).

By driving the lift cylinder 6C, the height of the working device 3 and the inclination in the vehicle width direction (the difference between the height of the right portion and the height of the left portion) can be adjusted. When adjusting the height, both the first lift cylinder 6CL and the second lift cylinder 6CR are driven in similar manners. When adjusting the inclination, one of the first lift cylinder 6CL and the second lift cylinder 6CR is driven. In particular, the working device 3 is driven so as to stretch the lift cylinder arranged on the side of which the height is low or to shorten the lift cylinder arranged on the side of which the height is high.

The generator unit 12 is arranged between the first lift arm 6AL and the second lift arm 6AR in the vehicle width direction. In addition, the generator unit 12 is arranged between the first lift rod 6B3L and the second lift rod 6B3R in the vehicle width direction. In addition, the generator unit 12 is arranged between the first lower link 6B2L and the second lower link 6B2R in the vehicle width direction. In other words, the first mounting portion 331 of the generator unit 12 is arranged on the right side (inward in the vehicle width direction) of the first lift arm 6AL, the first lift rod 6B3L, and the first lower link 6B2L. The second mounting portion 332 is arranged on the left side (inward in the vehicle width direction) of the second lift arm 6AR, the second lift rod 6B3R, and the second lower link 6B2R. This configuration makes it possible to avoid interference between the generator unit 12 and the lift arm 6A, the lift rod 6B3, and the lower link 6B2.

In addition, the generator unit 12 is arranged below the first pivot portion 26 that pivotally supports the front end portion of the top link 6B1. In this manner, it is possible to avoid the swinging portion of the top link 6B1 from interfering with the generator unit 12. The upper side of the generator 15 is covered with an upper plate 38c of the cover member 38. The upper plate 38c covers the upper side portion of the generator unit 12 below the first pivotally supporting portion 26 that pivotally supports the front end portion of the top link 6B1. In this manner, the interference between the generator 15 and the top link 6B1 can be avoided.

<Working Device>

Next, the working device 3 will be described below.

The working device 3 is a device for performing agricultural work. In other words, the working device 3 is a device that works on the agricultural field. The working device 3 is driven by the electric power supplied from the tractor 2 to which the generator unit 12 is attached. As the working device 3, a working device capable of operating at a low voltage of 60V or less is preferably used. In addition, the working device 3 may be operable at a low voltage of 48V or less. In particular, the working device 3 is preferably a sprayer device for spraying substances on the agricultural field, a seeder device for sowing seeds on the agricultural field, a baler device (baler) for collecting and molding cut crops (grass and the like), and the like. As the sprayer device, a fertilizer sprayer device (spreader) that sprays fertilizer on the agricultural field, a chemical sprayer device (sprayer) that sprays chemicals (chemical solution) on the agricultural field, and the like are used. As the seeder device, for example, a seeder such as a drill seeder for sowing seeds or a planter for sowing seeds at regular intervals is used. In the present embodiment, the working device 3 is a sprayer device, and hence the following description will be made assuming that the working device 3 is the sprayer device 3.

As shown in FIG. 1 and FIG. 2, the sprayer device 3 includes a housing portion 31 and a sprayer portion 32.

The housing portion 31 houses the spraying substances (fertilizer, pesticides, and the like) to be scattered in the agricultural field.

The housing portion 31 is constituted of a hopper having a substantially inverted pyramid shape. The hopper includes a first hopper 31A and a second hopper 31B. The first hopper 31A is arranged on one side (left side) in the vehicle width direction. The second hopper 31B is arranged on the other side (right side) in the vehicle width direction. However, the number of hoppers is not limited. The housing portion 31 has an inlet for the spraying substance at the upper end and an outlet for taking out the spraying substance at the lower end. Although the number of outlets is not limited, in the present embodiment, it is set according to the number of rotors (disks) 40 to be described later. In particular, the number of rotors 40 is two, and the number of outlets is also two. The number of the rotors 40 may be two, and the number of outlets may be one.

Figure 4:
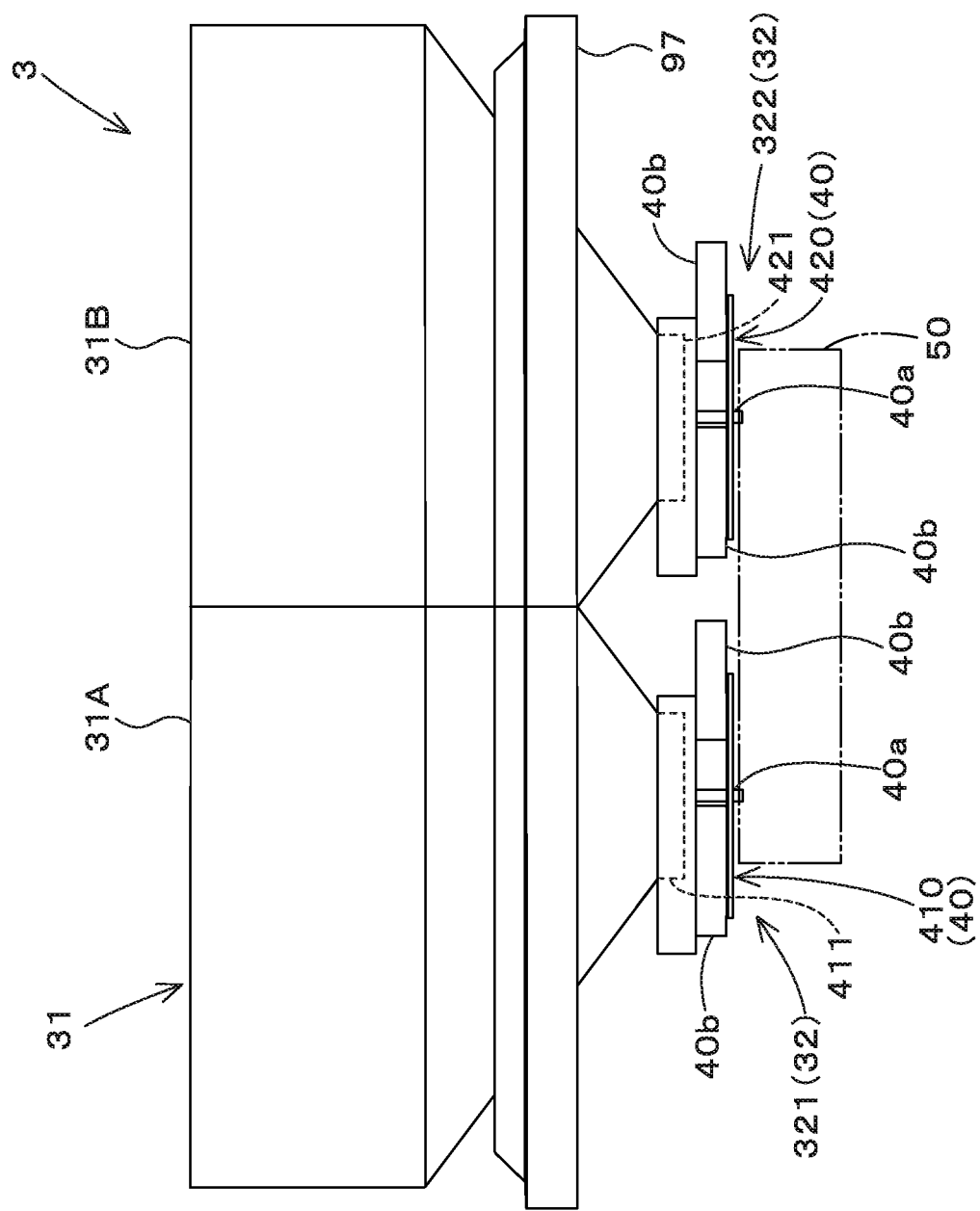
FIG. 4 is a back view illustrating a sprayer device according to the embodiments.

The sprayer portion 32 is a working portion of the working device 3 and performs agricultural work (scattering of sprayed products such as fertilizers and chemicals) by rotating. The sprayer portion 32 sprays the sprayed product stored in the housing portion 31. As shown in FIG. 1 and FIG. 4, the sprayer portion 32 is provided below the housing portion 31. The sprayer portion 32 includes at least two or more spraying portions. It is preferable that at least two or more spraying portions have different spraying directions in all of the spraying portions, but they may include spraying portions having the same spraying direction.

As shown in FIG. 2, the sprayer portion 32 includes a first sprayer portion 321 and a second sprayer portion 322. That is, In the present embodiment, the number of the sprayer portions 32 is two. However, the number of the sprayer portions 32 is not limited to two, and may be three or more, or may be one. The number of the sprayer portions 32 and the number of the rotors 40 are the same. The first sprayer portion 321 and the second sprayer portion 322 are provided along with the vehicle width direction. Hereinafter, the two spraying portions (the first sprayer portion 321 and the second sprayer portion 322) will be described.

The first sprayer portion 321 is arranged at the one side (left side) of the vehicle width direction. The second sprayer portion 322 is arranged at the other side (right side) of the vehicle width direction. As shown in FIG. 2 and FIG. 4, the first sprayer portion 321 has a first rotor 410 and a first shutter device 411.

The first rotor 410 has a disk shape and rotates around a central axis 40a extending in the vertical direction (vertical direction). A plurality of rotor blades (blade members) 40b are attached to the upper surface of the first rotor 410. The rotor blade 40b rotates around the central axis 40a together with the first rotor 410. The plurality of rotor blades 40b are arranged at intervals in the circumferential direction, and stretch from the vicinity of the central axis 40a toward the radially outward direction. The first rotor 410 rotates about the central axis 40a, so that the spraying substance falling from the first outlet 71 is applied to the rotor blades 40b to be scattered radially outward (outward in the radial direction).

The first shutter device 411 has a shutter and an electric motor (not shown in the drawings). The shutter is attached to one of the outlets (first outlet) 311 of the housing portion 31, and the area (opening) of the first outlet 311 can be changed by moving the shutter. The electric motor is a stepping motor or the like, and is connected to the shutter. The first shutter device 411 changes the opening degree of the first outlet 311 by moving the shutter by driving the electric motor. In this manner, the amount of spraying substance by the first sprayer 321 is adjusted.

The second sprayer portion 322 has a second rotor 420 and a second shutter device 421. The configuration of the second rotor 420 is the same as that of the first rotor 410, and thus the description thereof will be omitted. The configuration of the second shutter device 421 is the same as that of the first shutter device 411, except that the shutter is attached to the other outlet (second outlet) 312 of the housing portion 31. The second shutter device 421 can adjust the spray amount of the spraying substance by the second spray portion 322 by changing the opening degree of the second outlet 312.

As shown in FIG. 2, the first rotor 410 and the second rotor 420 are arranged side by side in the vehicle width direction. As shown in FIG. 2, the first rotor 410 and the second rotor 420 rotate in mutually different directions. In the present embodiment, as shown by the black arrow in FIG. 2, the first rotor 410 rotates in the clockwise direction and the second rotor 420 rotates in the counterclockwise direction in plan view.

The first rotor 410 is arranged below the first outlet 311 of the housing portion 31. The spraying substance that has fallen from the first outlet 311 is scattered by the rotating first rotor 410. The second rotor 420 is arranged below the second outlet 312 of the accommodation unit 31. The spraying substance falling from the second outlet 312 is scattered by the rotating second rotor 420.

In the embodiment, the spraying directions of the first sprayer portion 321 and the second sprayer portion 322 are different from each other. The spraying direction of the first sprayer portion 321 is one of the vehicle width direction and the rear side. The spraying direction of the second sprayer portion 322 is the other side and the rear side in the vehicle width direction. As shown by the white arrowed line in FIG. 2, in the present embodiment, the main spraying directions of the first sprayer portion 321 are left and left rear, and the main spraying directions of the second sprayer portion 322 are right and right rear. The direction indicated by the white arrowed line is the main spraying direction, and in actuality, it is spread in a fan shape including the direction shown by the white arrowed line.

<Power Transmission Mechanism>

As shown in FIG. 1, FIG. 2, and FIG. 4, the sprayer device 3 includes a power transmission mechanism 50. The power transmission mechanism 50 receives the power generated by the driving of the motor 23 and the power supplied from the engine 11, and transmits the input power to the sprayer portion (working device) 32. In particular, the power transmission mechanism 50 is a mechanism capable of transmitting the power from the motor 23 and the power from the PTO shaft 19 to the first rotor 410 and the second rotor 420.

The power transmission mechanism 50 will be described below with reference to FIG. 17. However, the power transmission mechanism 50 shown in FIG. 17 is an example, and the structure of the power transmission mechanism 50 is not limited thereto.

Figure 17:
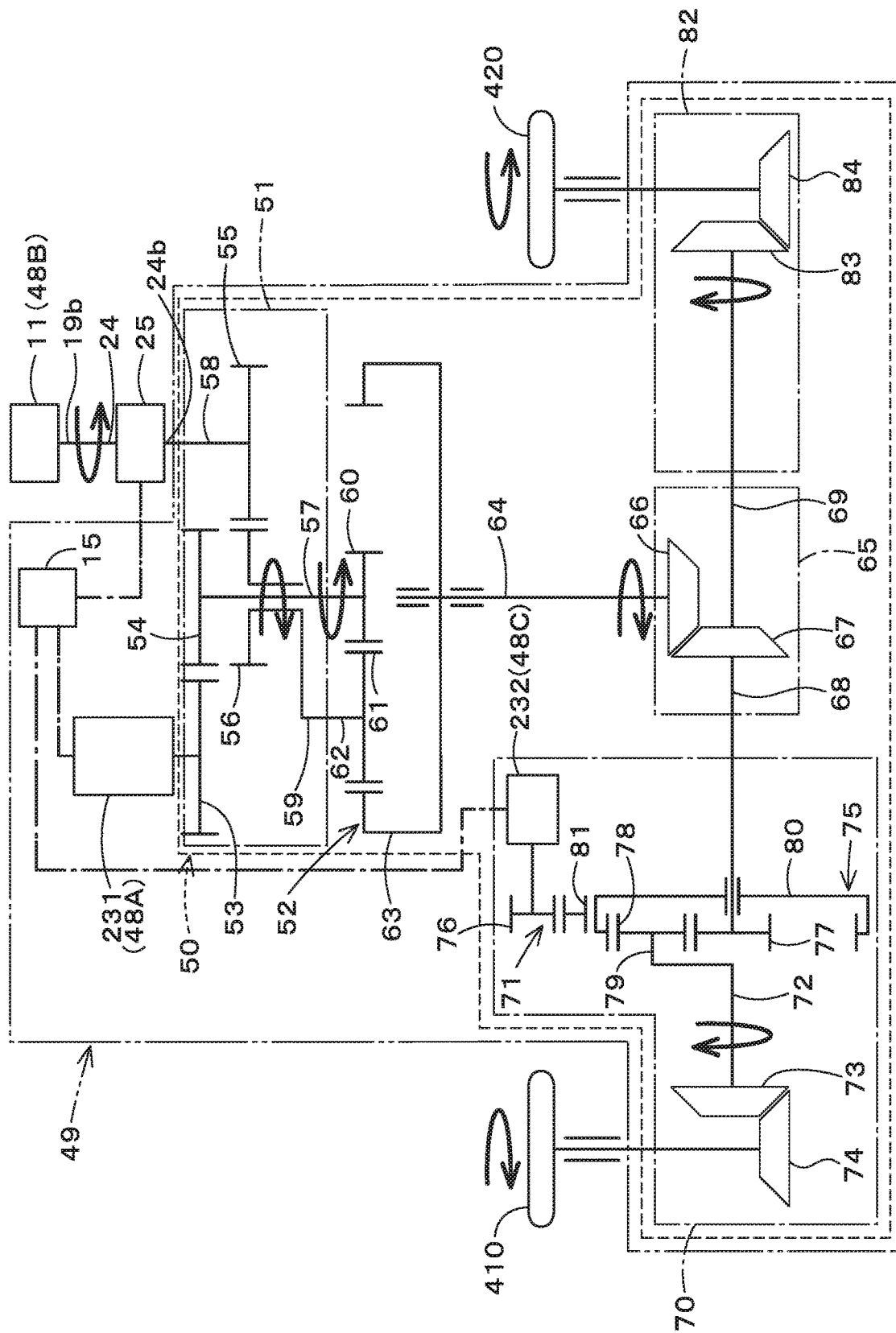
FIG. 17 is a view illustrating a configuration of a driver portion including a power transmission mechanism according to the embodiments.

FIG. 17 shows the configuration of the driver portion 49 including the power transmission mechanism 50. The driver portion 49 has a first driving source 48A, a third driving source 48C, and a power transmission mechanism 50. The driver portion 49 is provided in the sprayer device 3 and drives the sprayer portion 32.

The sprayer portion 32 is driven by power from a driving source (the first driving source 48A, the third driving source 48C) included in the driver portion 49 and another driving source (the second driving source 48B) included in the tractor 2.

The first driving source 48A and the third driving source 48C are variable-speed driving sources included in the driver portion 49 of the sprayer device 3. In the present embodiment, the first driving source 48A and the third driving source 48C are the first motor 231 and the second motor 232 that are driven by the power from the generator 15, respectively. The second driving source 48B is the engine 11 provided in the tractor 2.

The power transmission mechanism 50 can transmit the power from the first driving source 48A and the power from the second driving source 48B to the rotors (the first rotor 410 and the second rotor 420) of the sprayer portion 32. In particular, the power transmission mechanism 50 can transmit the power of the first driving source 48A to the first rotor 410 and the second rotor 420, and can transmit the power of the second driving source 48B to the first rotor 410 and the second rotor 420. The third driving source 48C is a driving source mainly used for changing the revolving speeds of the first rotor 410 and the second rotor 420.

The power transmission mechanism 50 has an input transmission portion 51 and a first planetary gear mechanism 52.

The input transmission portion 51 transmits the power input from the first driving source 48A (the first motor 231) and the power input from the second driving source 48B (the engine 11) to the first planetary gear mechanism 52. The input transmission portion 51 includes a first input gear 53, a second input gear 54, a third input gear 55, a fourth input gear 56, a first shaft 57, a second shaft 58, and a third shaft 59. The first input gear 53 is connected to the output shaft of the first motor 231, and is rotated by driving the first motor 231. The second input gear 54 is engaged with the first input gear 53 and rotates with the rotation of the first input gear 53. One end of the first shaft 57 is connected to the center of the second input gear 54. One end of the second shaft 58 is connected to the center of the third input gear 55. The other end of the second shaft 58 is connected to the second connector portion 24b (see FIG. 15) of the input shaft 24 through a connecting tool (universal joint or the like). Revolving power from the engine 11 is inputted to the input shaft 24 through the PTO output shaft 19b. The revolving power inputted to the input shaft 24 is branched and transmitted to two paths via the transmission mechanism 25 shown in FIG. 15. One of the branched revolving powers is transmitted to the generator 15, and the other is transmitted from the second connector portion 24b of the input shaft 24 to the second shaft 58.

The fourth input gear 56 is engaged with the third input gear 55, and rotates as the third input gear 55 rotates. One end of the third shaft 59 is connected to the fourth input gear 56.

The first planetary gear mechanism 52 has a first sun gear 60, a first planetary gear 61, a first planetary carrier 62, and a first internal gear 63. The first sun gear 60 is engaged with the first planetary gear 61. The first planetary gear 61 is rotatably supported by the first planetary carrier 62, and can rotate (revolve) around the first sun gear 60. The first planet carrier 62 rotates as the first planetary gear 61 rotates (revolves). The first internal gear 63 is engaged with the first planetary gear 61. The other end of the third shaft 59 is connected to the first planetary gear 61. In this manner, the first planetary gear 61 rotates (revolves) around the first sun gear 60 with the rotation of the fourth input gear 56, and the first internal gear 63 rotates with the rotation of the first planetary gear 61.

An output transmission shaft 64 that outputs power from the first planetary gear mechanism 52 is connected to the first planetary gear mechanism 52. One end side of the output transmission shaft 64 is connected to the center of the first internal gear 63. The other end of the output transmission shaft 64 is connected to a separation transmission portion 65 to be described later. In this manner, the power outputted from the first planetary gear mechanism 52 to the output transmission shaft 64 is transmitted to the separation transmission portion 65.

The separation transmission portion 65 separates and transmits the power outputted from the output transmission shaft 64 into one and the other. The separation transmission portion 65 has a first transmission gear 66, a second transmission gear 67, a first transmission shaft 68, and a second transmission shaft 69. The other end of the output transmission shaft 64 is connected to the center of the first transmission gear 66. The second transmission gear 67 is engaged with the first transmission gear 66. The gears (the first transmission gear 66 and the second transmission gear 67) forming the separation transmission portion 65 are all bevel gears. The direction of the rotation axis of the first transmission gear 66 intersects (orthogonally) with the direction of the rotation axis of the second transmission gear 67.

One end of one transmission shaft 68 and one end of the other transmission shaft 69 are connected to the second transmission gear 67. The one transmission shaft 68 and the other transmission shaft 69 stretch from the center of the second transmission gear 67 toward opposite sides. In this manner, the power output from the output transmission shaft 64 is separated and transmitted from the second transmission gear 67 to the one transmission shaft 68 (one side) and the other transmission shaft 69 (the other side) in the separation transmission portion 65.

On the other hand, the transmission shaft 68 is connected to the first power transmission portion 70.

The first power transmission portion 70 transmits the power transmitted from the separation transmission portion 65 to one side (the one transmission shaft 68) to the first rotor 410. The first power transmission portion 70 has a transmission portion 71, a transmission shaft 72, a third transmission gear 73, and a fourth transmission gear 74.

The transmission portion 71 includes a third driving source 48C (the second motor 232). The transmission portion 71 changes the revolving speed of the first rotor 410 or the second rotor 420 according to the speed change of the third driving source 48C. The transmission portion 71 has a second planetary gear mechanism 75 and a drive gear 76.

The second planetary gear mechanism 75 has a second sun gear 77, a second planetary gear 78, a second planetary carrier 79, and a second internal gear 80.

The second sun gear 77 is engaged with the second planetary gear 78. The second sun gear 77 is connected to the separation transmission portion 65. In particular, the other end of the one transmission shaft 68 is connected to the center of the second sun gear 77. The second planetary gear 78 is engaged with the second sun gear 77. The second planetary gear 78 is rotatably supported by the second planetary carrier 79, and can rotate (revolve) around the second sun gear 77. The second planet carrier 79 rotates with the rotation (revolution) of the second planet gear 78.

The second internal gear 80 has internal teeth formed on the inner peripheral surface and external teeth formed on the outer peripheral surface. The inner teeth engage with the second planetary gear 78. The outer teeth are engaged with the relay gear 81. The relay gear 81 is engaged with the drive gear 76 that rotates by the power from the third driving source 48C.

The one end side of the transmission shaft 72 is connected to the second planet carrier 79. The other end of the transmission shaft 72 is connected to the center of the third transmission gear 73. The fourth transmission gear 74 is engaged with the third transmission gear 73. The direction of the rotation axis of the fourth transmission gear 74 intersects (or crosses) with the direction of the rotation axis of the third transmission gear 73. The center of the fourth transmission gear 74 is connected to the central axis of the first rotor 410. In this manner, the power of rotation of the fourth transmission gear 74 is transmitted to the first rotor 410.

The second sun gear 77 can transmit power to the second rotor 420 through the separation transmission portion 65. The second planetary gear 78 can transmit power to the first rotor 410 through the second planet carrier 79 and the transmission shaft 72.

In addition, one end side of the transmission shaft 72 is connected to the center of the second sun gear 77, the other end side of the transmission shaft 72 is connected to the center of the third transmission gear 73, and the one transmission shaft 68 of the one transmission shaft 68 is connected to the second planet carrier 79. The other end side may be connected, and the one end side of the one transmission shaft 68 may be connected to the second transmission gear 67. In this case, the second planetary gear 78 can transmit power to the second rotor 420 through the second planetary carrier 79 and the separation transmission portion 65, and the second sun gear 77 can transmit the power to the first rotor 410 through the transmission shaft 72.

The other transmission shaft 69 is connected to the second power transmission portion 82.

The second power transmission portion 82 can transmit, to the second rotor 420, the power transmitted from the separation transmission portion 65 to the other (the other transmission shaft 69).

The second power transmission portion 82 has a fifth transmission gear 83 and a sixth transmission gear 84. The gears (fifth transmission gear 83, sixth transmission gear 84) forming the second power transmission portion 82 are all bevel gears.

The other end of the other transmission shaft 69 is connected to the center of the fifth transmission gear 83. The sixth transmission gear 84 is engaged with the fifth transmission gear 83. The direction of the rotation axis of the sixth transmission gear 84 intersects (orthogonally) with the direction of the rotation axis of the fifth transmission gear 83. The center of the sixth transmission gear 84 is connected to the central axis of the second rotor 420.

In the first planetary gear mechanism 52, the first planet carrier 62 connected to the third shaft 59 is a first input portion to which the power from the engine 11 is inputted through the PTO shaft 19. The first sun gear 60 connected to the first shaft 57 is a second input portion to which the power generated by driving the motor 23 is inputted. In addition, in the power transmission mechanism 50, the output transmission shaft 64, the separation transmission portion 65, the first power transmission portion 70, and the second power transmission portion 82 are provided from the first planetary gear mechanism 52 to the distribution portion (working portion) 32.

Hereinafter, the operation (movement) of the driver portion 49 will be described.

The power from the first driving source 48A (the first motor 231) is inputted to the first planetary gear mechanism 52 through the input transmission portion 51. Power from the second driving source 48B (the engine 11) is inputted to the first planetary gear mechanism 52 through the PTO output shaft 19b, the input shaft 24, the second shaft 58, and the input transmission portion 51.

The power inputted to the first planetary gear mechanism 52 is outputted from the output transmission shaft 64 and transmitted to the separation transmission portion 65. The separation transmission portion 65 separates and transmits the power outputted from the output transmission shaft 64 to one (one transmission shaft 68) and the other (the other transmission shaft 69). That is, the separation transmission portion 65 separately transmits the power from the first driving source 48A and the power from the second driving source 48B to one side and the other side.

The power transmitted from the separation transmission portion 65 to one side (the one transmission shaft 68) is transmitted to the first rotor 410 through the first power transmission portion 70. The power transmitted from the separation transmission portion 65 to the other (the other transmission shaft 69) is transmitted to the second rotor 420 through the second power transmission portion 82.

Thus, the first rotor 410 and the second rotor 420 can be rotated by the power from the first driving source 48A (the first motor 231). In addition, the first rotor 410 and the second rotor 420 can be rotated by the power from the second driving source 48B (the engine 11). That is, the power of either the first driving source 48A or the second driving source 48B can be used to rotate the first rotor 410 and the second rotor 420. In addition, the power of both the first driving source 48A and the second driving source 48B can be used to rotate the first rotor 410 and the second rotor 420. In addition, since the first driving source 48A can change the speed, the revolving speeds of the first rotor 410 and the second rotor 420 can be changed by changing the speed of the first driving source 48A.

Furthermore, since the power transmission mechanism 50 has the transmission portion 71, the driver portion 49 can make the revolving speed of the first rotor 410 and the revolving speed of the second rotor 420 different from each other.

The operation of the transmission portion 71 will be described below.

When the third driving source 48C (the second motor 232) of the transmission portion 71 is driven, the power from the third driving source 48C is transmitted to the external teeth of the second internal gear 80 through the drive gear 76 and the relay gear 81. Thus, when the third driving source 48C is driven, the second internal gear 80 rotates. The rotation of the second internal gear 80 is transmitted to the second planetary gear 78 through the internal teeth of the second internal gear 80, and the second planetary gear 78 rotates. The second planetary carrier 79 rotates as the second planetary gear 78 rotates, and the power of the rotation is transmitted to the first rotor 410 through the transmission shaft 72, the third transmission gear 73, and the fourth transmission gear 74.

In this manner, the power from the transmission portion 71 including the third driving source 48C is transmitted to the first rotor 410. Thus, the revolving speed of the first rotor 410 can be changed according to the shift of the third driving source 48C. In this manner, the revolving speed of the first rotor 410 and the revolving speed of the second rotor 420 can be made different.

In addition, the transmission portion 71 may be provided in the second power transmission portion 82, and the power from the third driving source 48C may be transmitted to the transmission portion 71 of the second power transmission portion 82 (external teeth of the second internal gear 80). When this configuration is adopted, the revolving speed of the second rotor 420 can be changed according to the shift of the third driving source 48C. Also with this configuration, the revolving speed of the first rotor 410 and the revolving speed of the second rotor 420 can be made different.

As a modified example of the driver portion 49, a switch portion can be provided in the first power transmission portion 70 or the second power transmission portion 82. The switch portion includes, for example, a clutch that can be switched by an operation lever or the like. Preferably, the switch portion is constituted of an electric clutch, but may be constituted of a mechanical clutch. When the switch portion is provided in the first power transmission portion 70, the switch portion is provided, for example, in the middle of the one transmission shaft 68. When the switch portion is provided in the second power transmission portion 82, the switch portion is provided, for example, in the middle of the other transmission shaft 69.

The switch portion provided in the first power transmission portion 70 allows the power transmitted from the separation transmission portion 65 to one side (the one transmission shaft 68) to be transmitted to the first rotor 410 in the first state. It is possible to switch to the second state in which no transmission to the first rotor 410 is made. The switch portion provided in the second power transmission portion 82 transfers the power transmitted from the separation transmission portion 65 to the other (the other transmission shaft 69) to the second rotor 420 in the first state. It is possible to switch to the second state in which no transmission to the second rotor 420 is made.

By providing the switch portion in the first power transmission portion 70 or the second power transmission portion 82, the rotation of either the first rotor 410 or the second rotor 420 can be performed without stopping the rotation of the PTO shaft 19.

<Regenerative Power Processor Portion>

Figure 18:
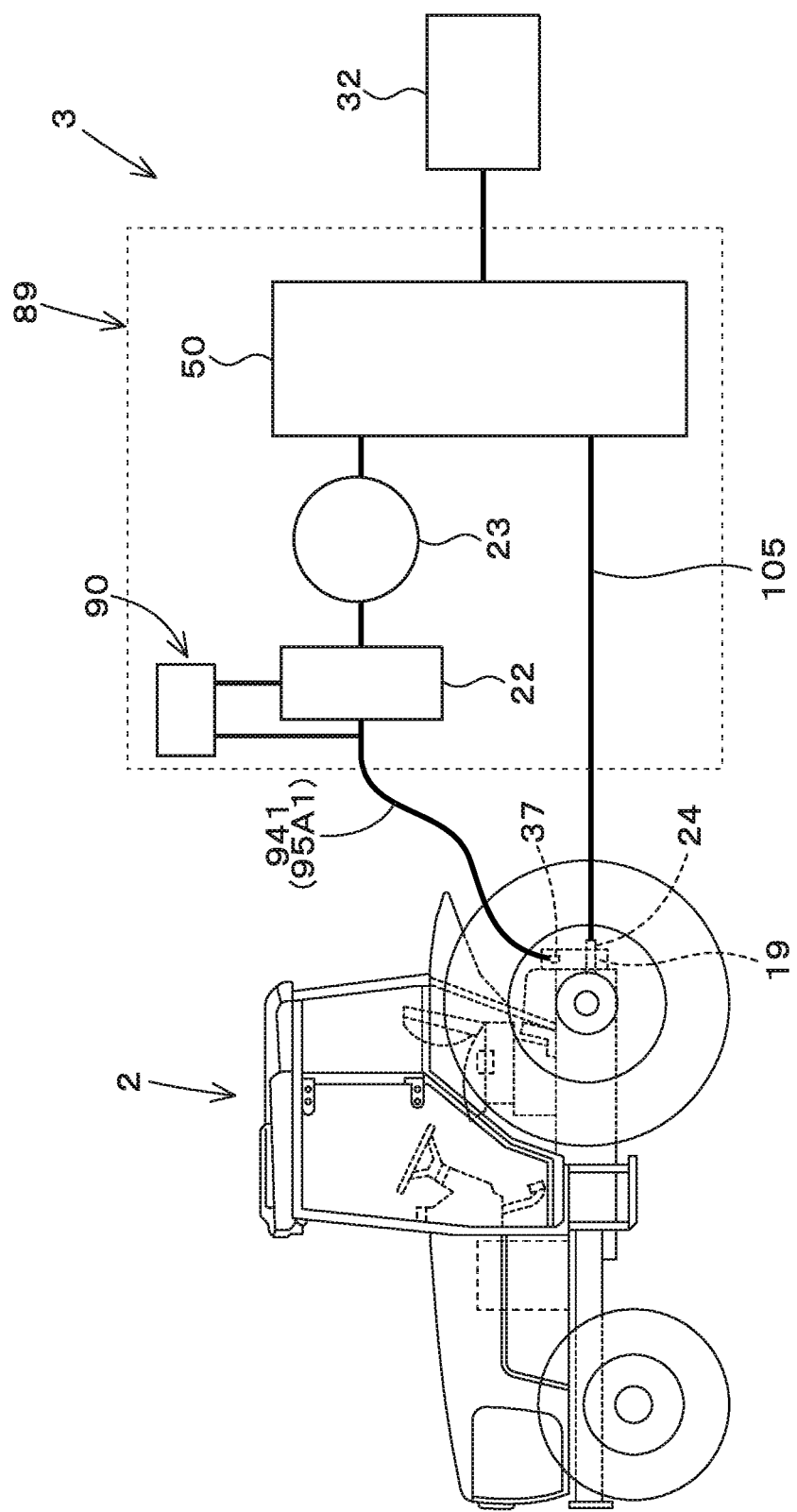
FIG. 18 is a view illustrating a working machine having a regenerative force processor portion according to the embodiments.
Figure 19:
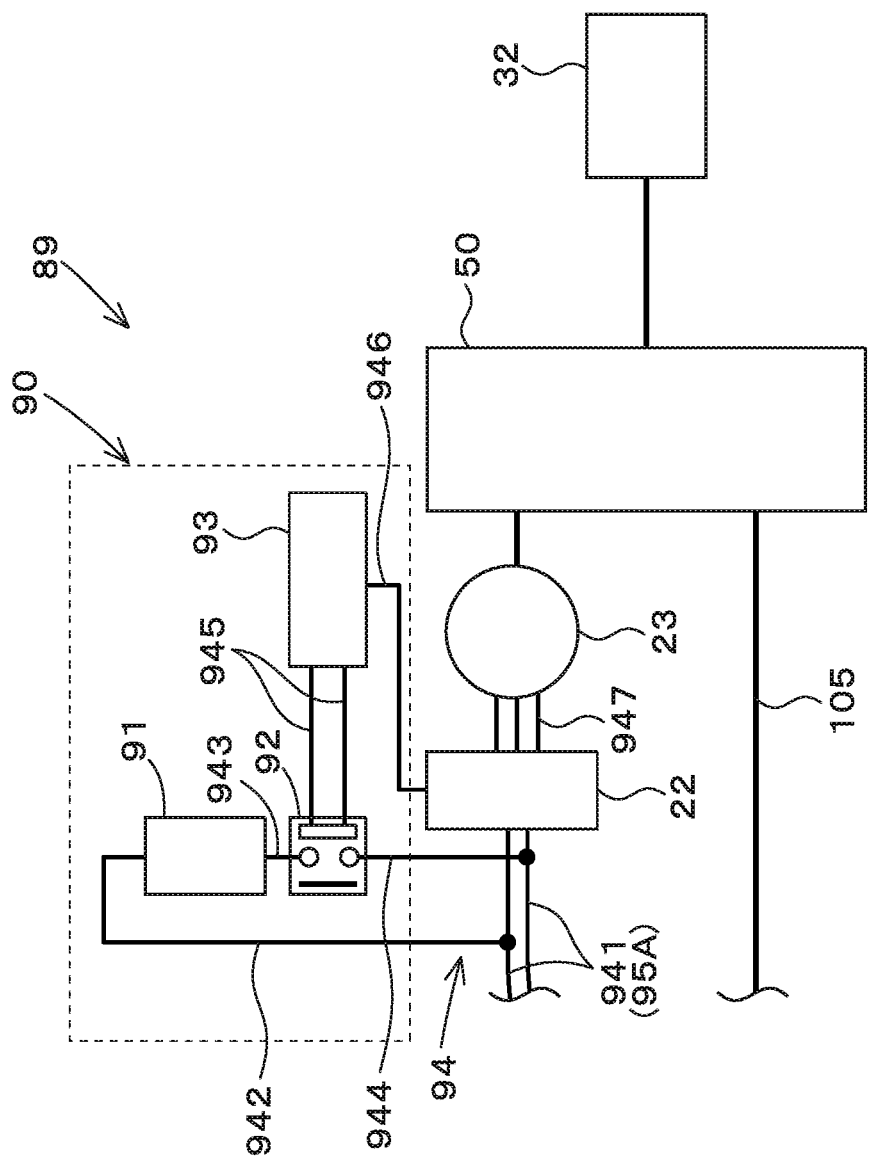
FIG. 19 is a view illustrating a configuration of the regenerative force processor portion according to the embodiments.

As shown in FIG. 18 and FIG. 19, the sprayer device (working device) 3 has a regenerative power processor portion 89 for processing (consuming) the regenerative power (revolving power) generated in the motor 23. The motor 23 whose regenerative power is processed by the regenerative power processor portion 89 may be the first motor 231, the second motor 232, or both the first motor 231 and the second motor 232.

The regenerative power processor portion 89 includes the motor 23, the inverter 22, the power transmission mechanism 50, and the processing circuit 90. The processing circuit 90 includes a regeneration resistor (resistor) 91, a switch portion 92, a controller portion 93 (hereinafter, referred to as "second controller portion 93"), and a wiring 94 capable of transmitting an electric signal.

The motor 23 is connected to the power supply cable 95A connected to the first output connector 37 via the inverter 22, and receives and drives electric power (DC power) from the generator 15 through the inverter 22. The motor 23 is an AC motor (a three-phase AC motor). The inverter 22 receives and converts the electric power (DC power) outputted from the generator 15 and outputs an AC voltage to the motor 23. However, the generator 15 may output AC power, and the inverter 22 that receives the AC power may output AC voltage to the motor 23. The inverter 22 controls the drive (speed or the like) of the motor 23. The power transmission mechanism 50 has, for example, the configuration shown in FIG. 17, and the power generated by driving the motor 23 and the power supplied from the engine 11 (power from the PTO shaft 19) are inputted. The inputted power is transmitted to the sprayer portion (working portion) 32.

The regeneration resistor 91 consumes the regenerative power generated in the motor 23. The regeneration resistor 91 is a device that converts regenerative power (regenerative electric power) into heat and consumes it. As the regeneration resistor 91, for example, a cement resistor, an enamel resistor, or the like is used, but the regeneration resistor 91 is not limited thereto. As the regeneration resistor 91, one whose rated power consumption is larger than the maximum value of regenerative power (regenerative power) is used. However, the rated power consumption of the regeneration resistor 91 is preferably a value close to the maximum value of the regenerative power (a value that does not greatly exceed the maximum value).

The switch portion 92 switches between a connecting state and a shut-off state between the motor 23 and the regeneration resistor 91. In particular, the switch portion 92 switches between the connecting state and the shut-off state between the power supply cable 95A (first wiring 941) that supplies power to the motor 23 and the regeneration resistor 91. In the embodiment, the switch portion 92 is constituted of a relay (relay). However, the switch portion 92 is not limited to a relay and may be, for example, a switching element (ECU) or the like.

The second controller 93 controls driving of the motor 23. In addition, the second controller portion 93 controls the switching operation of the switch portion 92. The drive control of the motor 23 executed by the second controller portion 93 includes a command of the revolving speed (torque) of the motor 23 to the inverter 22 and a monitor of the revolving speed (torque) of the motor 23. The second controller portion 93 is a computer including electronic/electrical components (CPU, storage device, etc.) housed in a housing, and in particular is an ECU. The second controller portion 93 is connected to the in-vehicle ECU through ISOBUS. The second controller portion 93 controls the drive of the motor 23 and the switching operation of the switch portion 92 based on the control signal from the in-vehicle ECU.

In the present embodiment, the second controller portion 93 is provided in the sprayer device 3 separately from the inverter 22, but the inverter 22 may have the function of the second controller portion 93. In addition, the in-vehicle ECU may have the function of the second controller portion 93. In addition, the first controller portion 30 may have the function of the second controller portion 93. The second controller portion 93 may control the driving of the motor 23 and the switching operation of the switch portion 92 without depending on the control signal from the in-vehicle ECU.

The wiring 94 includes a first wiring 941, a second wiring 942, a third wiring 943, a fourth wiring 944, a fifth wiring 945, a sixth wiring 946, and a seventh wiring 947. The first wiring 941 connects the inverter 22 and the first output connector 37. The first wiring 941 is constituted of the power supply cable 95A described above, and includes a positive side wiring and a negative side wiring. The first wiring 941 is connected to the inverter 22 and constitutes a power supply circuit that supplies power to the motor 23 through the inverter 22. Hereinafter, the first wiring 941 may be referred to as a "power supply circuit 941". One end of the second wiring 942 is connected to the middle of one (positive side) wiring of the first wiring 941 and the other end is connected to one end of the regeneration resistor 91. One end of the third wiring 943 is connected to the other end of the regeneration resistor 91, and the other end is connected to one contact of the switch portion (relay) 92. One end of the fourth wiring 944 is connected to the other contact of the switch portion 92, and the other end of the fourth wiring 944 is connected to the middle of the other (negative side) wiring of the first wiring 941. The fifth wiring 945 connects the switch that connects or disconnects one contact and the other contact of the switch portion 92 and the second controller portion 93. The sixth wiring 946 connects the second controller 93 and the inverter 22 and is constituted of, for example, a CAN (Controller Area Network). The seventh wiring 947 connects the inverter 22 and the motor 23.

The control signal from the second controller portion 93 is transmitted to the switch portion 92 through the fifth wiring 945. In this manner, it is possible to switch between the connecting state and the shut-off state of the switch portion 92. The control signal from the second controller portion 93 is transmitted to the inverter 22 through the sixth wiring 946. Thereby, the drive of the motor 23 can be controlled through the inverter 22.

As described above, the power transmission mechanism 50 receives the power generated by the driving of the motor 23 and the power supplied from the engine 11 (power from the PTO shaft 19), and distributes the inputted power to the sprayer portion (working portion). Here, depending on the load state of the sprayer portion 32 (for example, the revolving speed of the first rotor 410 or the second rotor 420), a negative torque is applied to the motor 23, and regenerative power (regenerative power) is generated. When regenerative power is generated in the motor 23, a desired rotation output cannot be obtained unless the regenerative power is consumed. In particular, when the revolving speed of the PTO shaft 19 (PTO output shaft 19b) is kept constant and the revolving speed of the motor 23 is changed to change the revolving speed of the first rotor 410 or the second rotor 420, the regenerative power of the motor 23 is changed. The regenerative power processor portion 89 processes (consumes) the generated regenerative power.

However, the sprayer portion (working device) 32 may be driven only by the power generated by driving the motor 23 without using the power supplied from the engine 11 (power from the PTO shaft 19). In this case, the power transmission mechanism 50 is a mechanism in which only the power generated by the driving of the motor 23 is inputted and the inputted power is transmitted to the sprayer portion (working device) 32.

The processing method (processing operation) of the regenerative power by the regenerative power processor portion 89 will be described below.

The second controller portion 93 switches the switch portion 92 to the connecting state when the regenerative power is generated, and switches the switch portion 92 to the shut-off state when the regenerative power is extinguished. In particular, the second controller portion 93 switches the switch portion 92 to the connecting state at the output rotation immediately before the regenerative power is generated (the output revolving speed of the motor 23), and switches the switch portion 92 to the connecting state at the output rotation immediately after the regenerative power is generated.

When the switch portion 92 is switched to the connecting state, the current generated by the regenerative power (regenerative electric power) generated in the motor 23 flows to the regeneration resistor 91 through the inverter 22, the fourth wiring 944, and the switch portion 92. The regeneration resistor 91 consumes power by generating heat. In this manner, the regenerative power generated in the motor 23 is consumed, and a desired rotation output can be obtained. On the other hand, when the regenerative power disappears, the switch portion 92 is switched to the shut-off state, so that no current flows from the motor 23 side to the regeneration resistor 91.

Since the sprayer device (working device) 3 has the above-described regenerative power processor portion 89, the regenerative power generated by the motor 23 can be processed (consumed). Thus, the regenerative power can be processed (consumed) even when an alternator is used as the generator 15 instead of the motor generator. When a motor generator is used as the generator 15, the motor generator can generate regenerative power by generating electric power.

In the present embodiment, the motor 23 includes a plurality of motors (the first motor 231 and the second motor 232). In this case, the second controller portion 93 switches the switch portion 92 to the connecting state when the regenerative power is generated in at least one of the plurality of motors (at least one of the first motor 231 and the second motor 232). The configuration for controlling (hereinafter, referred to as a "first configuration") can be adopted.

In addition, the second controller portion 93 performs control for switching the switch portion 92 to the connecting state when regenerative power is generated in all of the plurality of motors (both the first motor 231 and the second motor 232). The configuration for controlling (hereinafter, referred to as a "second configuration") also can be adopted.

In addition, the second controller portion 93 switches the switch portion 92 to the connecting state when all of the motors (both the first motor 231 and the second motor 232) generates the regenerative power (hereinafter, referred to as a "first condition") and when one of the motors (for example, the first motor 231) generates the regenerative power, the other one of the motors (for example, the second motor 232) generates the powering power, and the regenerative power is larger than the powering power (hereinafter, referred to as a "second condition"). The configuration for controlling (hereinafter, referred to as a "third configuration") can be adopted. That is, the second controller portion 93 controls the switch portion 92 to switch to the connecting state both when the first condition is satisfied and when the second condition is satisfied. That is, in the third configuration, when the total value of the actual required powers of the plurality of motors (the first motor 231 and the second motor 232) is negative, the switch portion 92 is switched to the connecting state, and when the total value of the actual required powers of the plurality of motors (the first motor 231 and the second motor 232) is positive, the switch portion 92 is switched to the shut-off state.

In addition, the second controller portion 93 sets the switch portion 92 to the connecting state when transmitting a reverse rotation command to at least one of the plurality of motors (at least one of the first motor 231 and the second motor 232). The configuration for performing switching control (hereinafter, referred to as "fourth configuration") can also be adopted.

Hereinafter, a method (processing operation) for processing the regenerative power by the above-described regenerative power processor portion 89 will be described with a specific example. A specific example is an example in which the working device is the sprayer device 3 having the driver portion 49 shown in FIG. 17, and the driver portion 49 satisfies the following conditions (hereinafter, referred to as "setting conditions").

$$\omega M1:\omega A1=43:104=1:2.476$$

$$\omega M2:\omega C2=77:120=1:1.558$$

$$\omega PTO:\omega S1=59:58=1:0.983$$

$$\omega C1:\omega A2=18:14=1:0.778$$

$$\omega A2:\omega B2=41:12=1:0.293$$

$$\omega S2:\omega B1=14:27=1:1.929$$

$$ZC1/ZA1=63/27=2.333$$

$$ZC2/ZA2=96/48=2.0$$

where $\omega M1$ is revolving speed of the first motor 231, $\omega M2$ is revolving speed of the second motor 232, $\omega A1$ is revolving speed of the first sun gear 60 (second input gear 54), $\omega A2$ is second sun gear 77 (second $\Omega B1$ is revolving speed of the first rotor 410, $\omega B2$ is revolving speed of the second rotor 420, $\omega B1$ is revolving speed of the first planet carrier 62 (fourth input gear 56), $\omega B2$ is revolving speed of the second planet carrier 79 (transmission shaft 72), $\omega C1$ is revolving speed of the first internal gear 63 (first transmission gear 66), $\omega C2$ is revolving speed of the second internal gear 80, $\omega PTO$ is revolving speed (revolving speed of the input shaft 24) of the PTO output shaft 19b, ZA1 is the number of teeth of the second input gear 54, ZA2 is the number of teeth of the second sun gear 77, ZC1 is the number of teeth of the first internal gear 63, ZC2 is the number of teeth (inner teeth) of the second internal gear 80. The revolving speeds are either angular velocities or revolving speeds (rpm).

The values of $\omega M1$: $\omega C2$, $\omega PTO$: $\omega S1$, $\omega A2$, $\omega A2$: $\omega B2$, $\omega S2$: $\omega B1$ can all be obtained by the tooth ratio of the gears that form the driver portion 49 (power transmission mechanism 50).

FIG. 20 to FIG. 23 are tables showing examples of drive patterns of the driver portion 49. Hereinafter, the drive pattern shown in FIG. 20 is "pattern 1", the drive pattern shown in FIG. 21 is "pattern 2", the drive pattern shown in FIG. 22 is "pattern 3", and the drive pattern shown in FIG. Pattern 4". The numerical value shown in each table is the revolving speed (rpm). In all drive patterns, the revolving speed of the PTO output shaft 19b is fixed at 1000 (rpm).

The second controller portion 93 transmits a command signal according to the command value of the target number of rotations of the first rotor 410 and the second rotor 420 transmitted from an in-vehicle ECU, and orders the number of revolutions to be set to the first motor 231 and the second motor 232 (hereinafter, referred to as "commanded number of revolutions"). The second controller portion 93 may transmit the command signal according to the command value inputted to the second controller portion 93 itself, without depending on the command value transmitted from the vehicle ECU.

In the tables shown in FIG. 20 to FIG. 23, B1 is the first rotor 410, B2 is the second rotor 420, M1 is the first motor 231, and M2 is the second motor 232. The upper numerical values are target revolving speeds of the first rotor 410 and the second rotor 420. The lower numerical values are the revolving speeds (ordered revolving speeds) of the first motor 231 and the second motor 232 for obtaining the target revolving speed. Among the numerical values of the number of rotations of the first motor 231 and the second motor 232, the numerical value marked with a black triangle indicates reverse rotation, and the numerical value not marked with a black triangle indicates forward rotation.

In the planetary gear mechanism (the first planetary gear mechanism 52 and the second planetary gear mechanism 75), when the torque direction of one shaft is determined, the torque directions of the other shafts are also determined. In the case of the sprayer device 3, since the torque directions of the rotors (the first rotor 410 and the second rotor 420) are always constant, the torque direction applied to the motor shaft through the planetary gear mechanism is constant. When the revolving direction of the motor 23 is switched between the forward direction and the reverse direction while the torque direction remains constant, the powering state and the regenerative state are switched at the same time when the revolving direction is switched. In the drive patterns shown in FIG. 20 to FIG. 23, the regenerative power is generated under the condition that the motor 23 rotates in the reverse direction (the condition marked with black triangles).

When the states of the presence or absence of the generation of regenerative power of the first motor 231 and the second motor 232 in each drive pattern are categorized, there are four states; (A) Occurring in neither the first motor 231 nor the second motor 232 occurs, (B) Occurring only in the first motor 231, (C) Occurring only in the second motor 232, and (D) Occurring in both the first motor 231 and the second motor 232.

The second controller portion 93 controls the switch portion 92 to switch to the connecting state based on any of the above-described first to fourth configurations. In particular, in the case of the first configuration, the switch portion 92 is controlled to switch to the connecting state in the (B) state, the (C) state, and the (D) state. In the case of the second configuration, the switch portion 92 is controlled to switch to the connecting state in the (D) state. In the case of the third configuration, the switch portion 92 is controlled to switch to the connecting state in any one of the (B) state, the (C) state, and the (D) state when the regenerative power generated in one of the motors (for example, the first motor 231) is larger than the powering power generated in the other one of the motors (for example, the second motor 232). In the case of the fourth configuration, the switch portion 92 is controlled to switch to the connecting state to be in any one of the (B) state, the (C) state, and the (D) state when issuing an order to reversely rotate to the motor (at least one of the first motor 231 and the second motor 232) that should be reversely rotated.

Next, a case where the second controller portion 93 performs control based on the third configuration will be described with a specific example. In FIG. 24, items related to power are added to the table of pattern 3 (FIG. 22). The lower part of FIG. 24 (MOTOR POWER item) shows the torque of each motor and each rotor, the power (M1) generated in the first motor 231, the power (M2) generated in the second motor 232, and the total value (Σ) of the power generated in the first motor 231 and the power generated in the second motor 232 respectively calculated from the revolving speeds of the first motor 231, the second motor 232, the first rotor 410, and the second rotor 420.

First, the leftmost condition (B1:200, B2:500) in the table of FIG. 24 will be described. Under this condition, regenerative power is generated only in the second motor 232. That is, it corresponds to the above state (C). In addition, under this condition, the powering power (989 W) of the first motor 231 exceeds the regenerative power (777 W) of the second motor 232. Thus, in the control based on the third configuration, neither the first condition nor the second condition for switching the switch portion 92 to the connecting state is satisfied. Thus, the second controller portion 93 does not control the switch portion 92 to switch to the connecting state. That is, under this condition, the motor 23 is not connected to the regeneration resistor 91.

Next, the second condition from the left in the table of FIG. 24 (B1:300, B2:400) will be described. Under this condition, the regenerative power is generated only in the second motor 232. That is, it corresponds to the above state (C). In addition, under this condition, the regenerative power (1025 W) of the second motor 232 exceeds the powering power (527 W) of the first motor 231. Thus, the second condition for switching the switch portion 92 to the connecting state in the control based on the third configuration is satisfied. Thus, the second controller portion 93 controls the switch portion 92 to switch to the connecting state. That is, under this condition, the motor 23 is connected to the regeneration resistor 91, and the regenerative power generated in the motor 23 is consumed by the regeneration resistor 91.

Next, the third condition (B1:400, B2:300) from the left of the table in FIG. 24 will be described. Under this condition, the regenerative power is generated in both the first motor 231 and the second motor 232. In particular, 151 W of regenerative power is generated in the first motor 231, and 693 W of regenerative power is generated in the second motor 232. Thus, it corresponds to the state (D). Thus, the first condition for switching the switch portion 92 to the connecting state in the control based on the third configuration is satisfied. Thus, the second controller portion 93 controls the switch portion 92 to switch to the connecting state. That is, under this condition, the motor 23 is connected to the regeneration resistor 91, and the regenerative power generated in the motor 23 is consumed by the regeneration resistor 91.

Finally, the rightmost condition (B1:500, B2:200) in the table of FIG. 24 will be described. Under this condition, the regenerative power is generated only in the first motor 231. That is, it corresponds to the above state (B). In addition, under this condition, the regenerative power (1045 W) of the first motor 231 exceeds the powering power (218 W) of the second motor 232. Thus, the second condition for switching the switch portion 92 to the connecting state in the control based on the third configuration is satisfied. Thus, the second controller portion 93 controls the switch portion 92 to switch to the connecting state. That is, under this condition, the motor 23 is connected to the regeneration resistor 91, and the regenerative power generated in the motor 23 is consumed by the regeneration resistor 91.

In addition, the control based on the third configuration is referred to as "when the power generated in the first motor 231 and the power generated in the second motor 232 are summed and the summed power becomes regenerative power, the second controller portion 93 performs control for switching the switch portion 92 to the connecting state." In this case, the description about FIG. 24 can be restated as follows.

In the leftmost condition (B1:200, B2:500) in the table of FIG. 24, when the power generated in the first motor 231 and the power generated in the second motor 232 are summed, a powering power (211 W) is obtained and regeneration is performed. No regenerative power is generated. Thus, the second controller portion 93 does not control the switch portion 92 to switch to the connecting state.

Under the second condition (B1:300, B2:400) from the left in the table of FIG. 24, the power generated in the first motor 231 and the power generated in the second motor 232 are combined to obtain regenerative power (497 W). Thus, the second controller portion 93 controls the switch portion 92 to switch to the connecting state.

Under the third condition (B1:400, B2:300) from the left in the table of FIG. 24, the total of the power generated in the first motor 231 and the power generated in the second motor 232 gives a regenerative power (844 W). Thus, the second controller portion 93 controls the switch portion 92 to switch to the connecting state.

Under the rightmost condition (B1:500, B2:200) in the table of FIG. 24, the sum of the power generated in the first motor 231 and the power generated in the second motor 232 results in a regenerative power (828 W). Thus, the second controller portion 93 controls the switch portion 92 to switch to the connecting state.

<Arrangement of Regeneration Resistor>

As shown in FIG. 25 to FIG. 28, the sprayer device 3 includes an wind guide member 96. The wind guide member 96 is a member that guides the wind generated by driving the sprayer portion 32 (first sprayer portion 321 and second sprayer portion 322) toward the regeneration resistor 91. In particular, the wind guide member 96 is a plate-shaped member having a wind receiving surface, and receives the wind generated by the rotation of the rotor blades 40*b* on the wind receiving surface and causes the wind to flow along the wind receiving surface. Then, the wind guide member 96 changes the direction of the wind and guides it toward the regeneration resistor 91. In addition, the wind guide member 96 also has a function of restricting the respective spraying directions of the first sprayer portion 321 and the second sprayer portion 322.

The wind guide member 96 includes a first wind guide member 961 and a second wind guide member 962. The first wind guide member 961 and the second wind guide member 962 are attached to the frame 97 that supports the sprayer portion 32 and the power transmission mechanism 50. The structure of the frame 97 will be described later.

Figure 27:
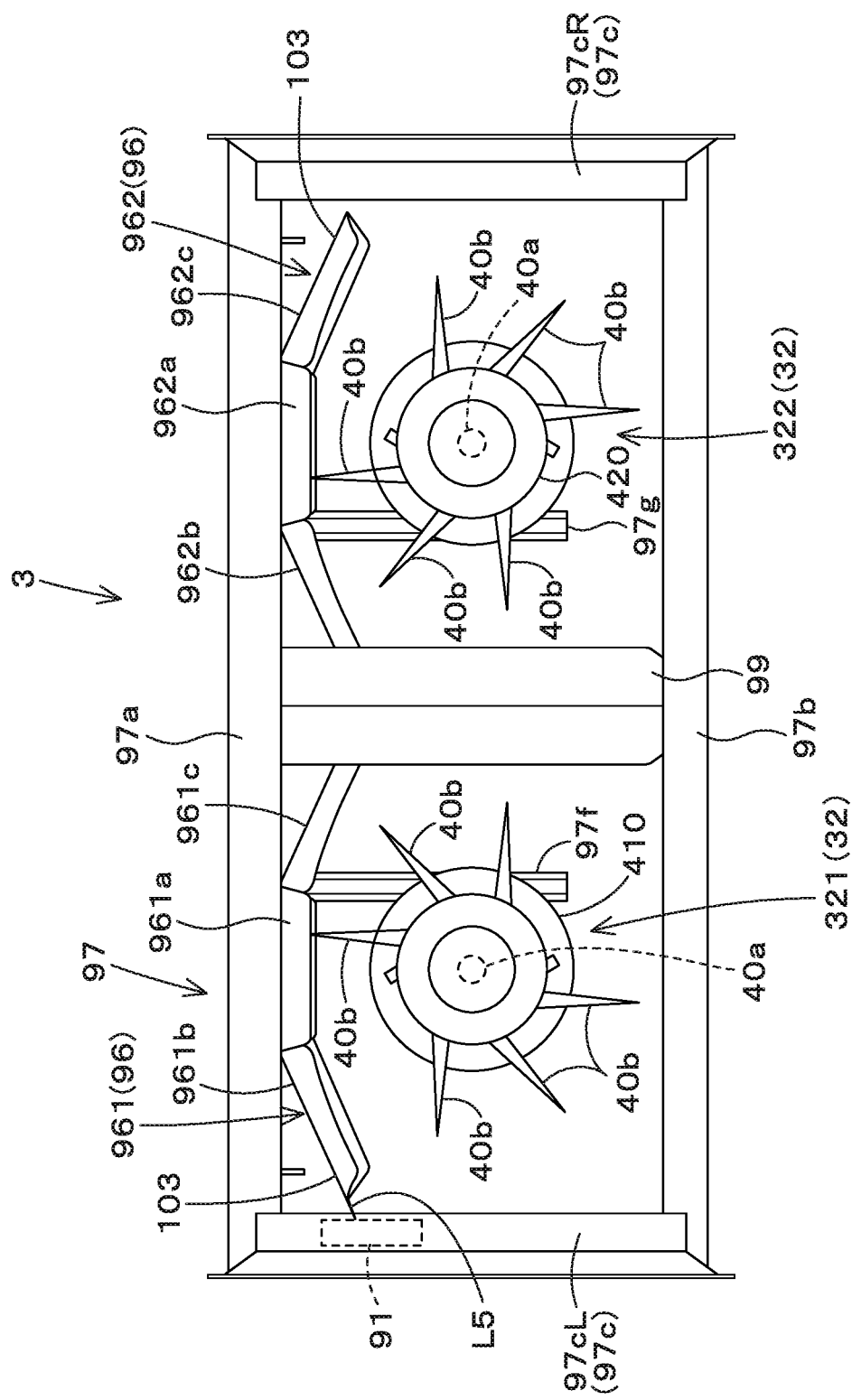
FIG. 27 is a plan view extracting a frame, a wind guide member, a rotor, a rotor blade, and the like of the sprayer device according to the embodiments.
Figure 28:
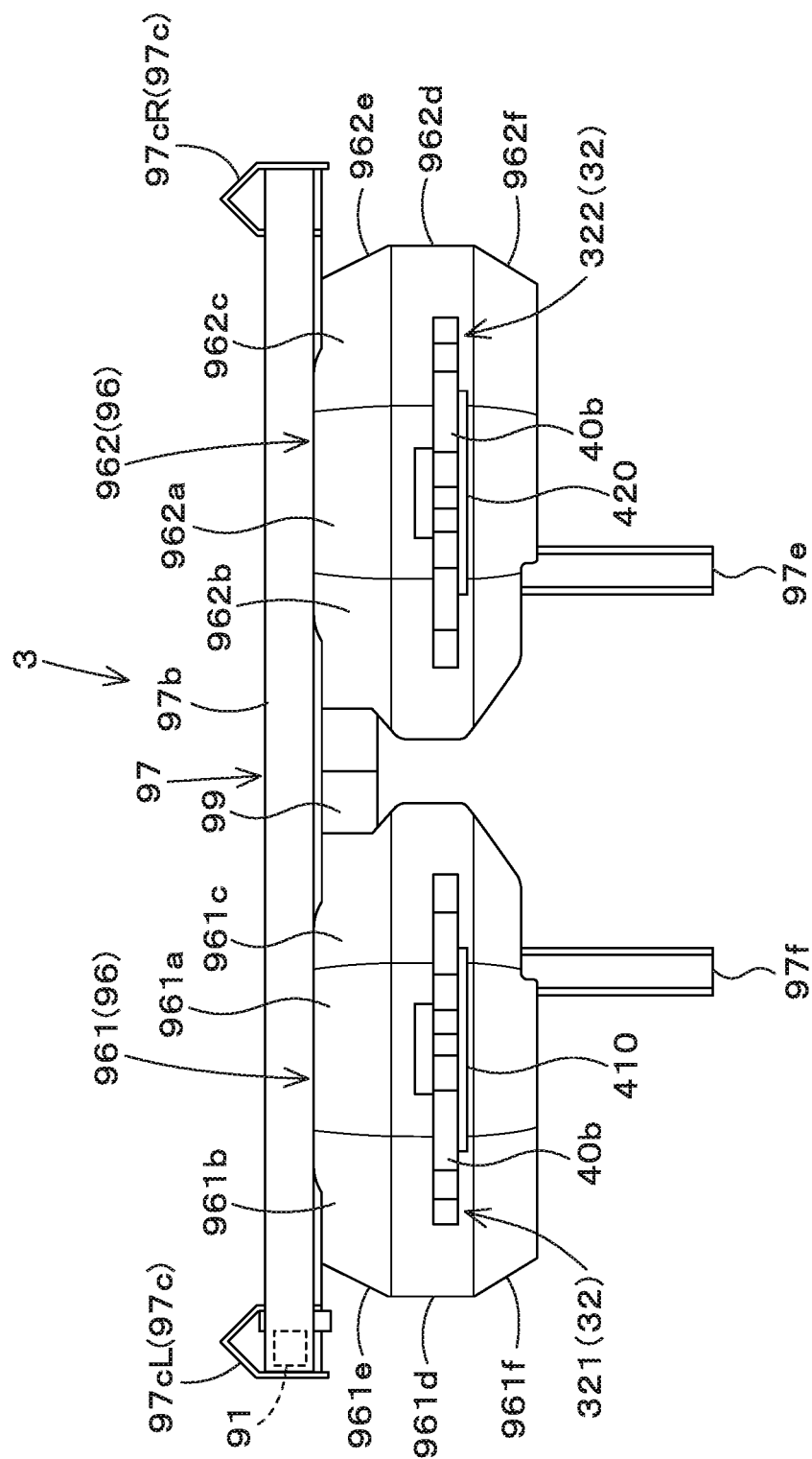
FIG. 28 is a back view extracting the frame, the wind guide member, the rotor, the rotor blade, and the like of the sprayer device according to the embodiments.
Figure 29:
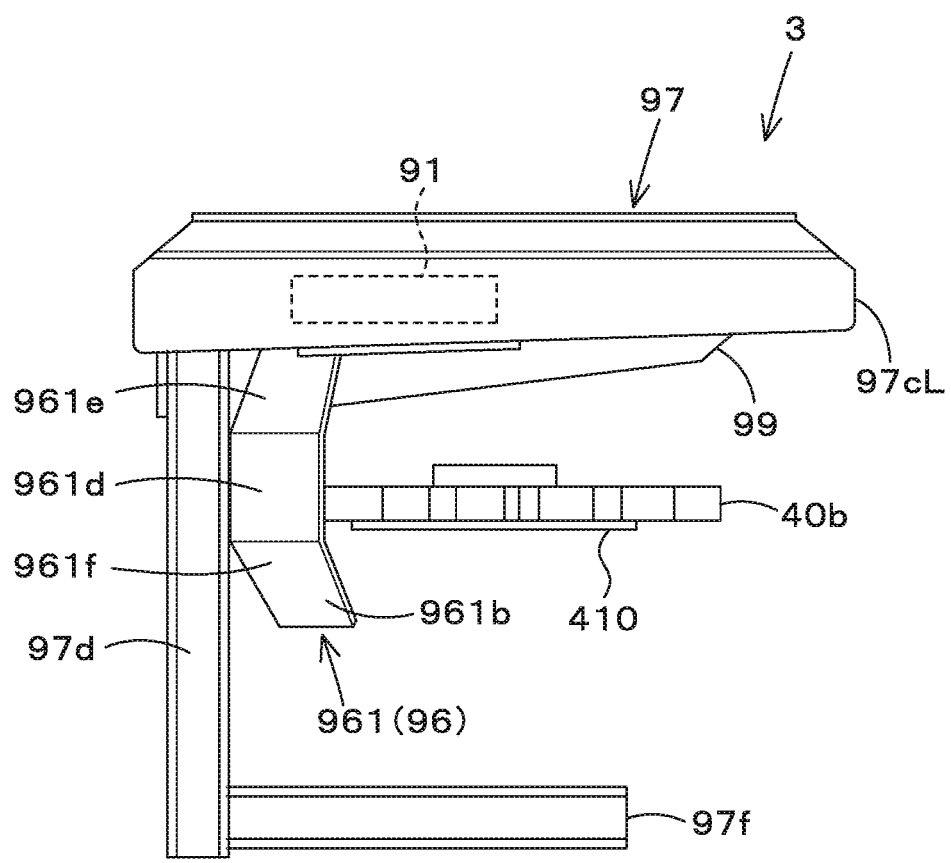
FIG. 29 is a left side view extracting the frame, the wind guide member, the rotor, the rotor blade, and the like of the sprayer device according to the embodiments.

The first wind guide member 961 is provided in front of the first rotor 410. The second wind guide member 962 is provided in front of the second rotor 420. As shown in FIG. 27, the first wind guide member 961 and the second wind guide member 962 have a convex arc shape toward the front in a plan view. In addition, as shown in FIG. 29, the first wind guide member 961 and the second wind guide member 962 have a convex arc shape toward the front even in a side view. That is, the wind receiving surface of the wind guide member 96 has a circular arc shape that is convex toward the front in plan view and side view. In addition, as shown in FIG. 28, the first wind guide member 961 has a size (range) that overlaps with the entire first rotor 410 and the rotor blades 40b provided on the first rotor 410 in a rear view. The second baffle member 962 is provided with a size (range) that overlaps with the second rotor 420 and the entire rotor blades 40b provided on the second rotor 410 in a rear view.

As shown in FIG. 27 and FIG. 28, the first wind guide member 961 has a center portion 961a, a left portion 961b, and a right portion 961c. The center portion 961a is arranged in front of the first rotor 410 and extends in the vehicle width direction. In particular, the center portion 961a extends leftward and rightward from the front position of the central axis 40a of the first rotor 410, respectively. The left portion 961b is arranged on the left front side of the first rotor 410. The left portion 961b extends leftward from the left end of the center portion 961a, and shifts rearward as stretching leftward. The right portion 961c is arranged on the right front side of the first rotor 410. The right portion 961c stretches rightward from the right end portion of the center portion 961a and moves rearward as stretching rightward. The center portion 961a, the left portion 961b, and the right portion 961c are integrated.

In addition, as shown in FIG. 28, the center portion 961a, the left portion 961b, and the right portion 961c have a vertical portion 961d, an upper stretching portion 961e, and a lower stretching portion 961f, respectively. The vertical portion 961d stretches in the vertical direction (vertical direction), and one surface faces the front and the other surface faces the rear. The vertical portion 961d is arranged at a position (height) that overlaps the rotor blade 40b of the first rotor 410 in the vertical direction. The upper stretching portion 961e extends upward from the upper end of the vertical portion 961d. The upper stretching portion 961e is inclined so as to move rearward as stretching upward. The downward stretching portion 961f stretches downward from the lower end of the vertical portion 961d. The downward stretching portion 961f is inclined so as to move backward as stretching downward. The vertical portion 961d, the upper stretching portion 961e, and the lower stretching portion 961f are integrated.

As shown in FIG. 27 and FIG. 28, the second wind guide member 962 has a center portion 962a, a left portion 962b, and a right portion 962c. The center portion 962a is arranged in front of the second rotor 420 and extends in the vehicle width direction. In particular, the center portion 962a stretches leftward and rightward from the front position of the central axis 40a of the second rotor 420, respectively.

The left portion 962b is arranged on the left front side of the second rotor 420. The left portion 962b stretches leftward from the left end portion of the center portion 962a, and moves rearward as stretching leftward. The right portion 962c is arranged on the right front side of the second rotor 420. The right portion 962c stretches rightward from the right end portion of the center portion 962a and moves rearward as stretching rightward. The center portion 962a, the left portion 962b, and the right portion 962c are integrated.

In addition, as shown in FIG. 28, the center portion 962a, the left portion 962b, and the right portion 962c have a vertical portion 962d, an upper stretching portion 962e, and a lower stretching portion 962f, respectively. The vertical portion 962d extends in the vertical direction (the longitudinal direction), and one surface faces the front and the other surface faces the rear. The vertical portion 962d is arranged at a position (height) that overlaps the rotor blade 40b of the second rotor 420 in the vertical direction. The upper stretching portion 962e stretches upward from the upper end of the vertical portion 962d. The upper stretching portion 962e is inclined so as to move rearward as it extends upward. The downward stretching portion 962f stretches downward from the lower end of the vertical portion 962d. The downward stretching portion 962f is inclined so as to move backward as stretching downward. The vertical portion 962d, the upper stretching portion 962e, and the lower stretching portion 962f are integrated.

As described above, in the embodiment, the first wind guide member 961 and the second wind guide member 962 are formed by combining a plurality of flat plates. However, each of the first wind guide member 961 and the second wind guide member 962 may be constituted of one curved plate. In addition, the first wind guide member 961 and the second wind guide member 962 may be integrated.

The direction of spraying by the rotation of the first rotor 410 is mainly leftward and left-rearward because the first wind guide member 961 restricts (blocks) forward spraying. The spraying direction due to the rotation of the second rotor 420 is mainly rightward and right-rearward because the second wind guide member 962 restricts (blocks) forward spraying. However, the first baffle member 961 and the second baffle member 962 may be partly or wholly configured (position, number, shape) as long as the baffle direction and the spray direction can be restricted to desired directions (mounting structure, etc.) may be changed. In addition to the wind guide member 96, a regulation plate for regulating the spraying direction of the first sprayer portion 321 and the second sprayer portion 322 may be provided.

In the present embodiment, the first sprayer portion 321 and the second sprayer portion 322 are responsible for spraying in different directions. In this manner, uniform spraying on the agricultural field can be easily performed. In addition, by making the revolving speeds of the first rotor 410 and the second rotor 420 different, it is possible to make the spraying distance of the tractor 2 to one side and the spraying distance to the other side of the vehicle width direction different. This facilitates proper spraying according to the shape of the agricultural field and the traveling position of the tractor 2.

In addition, as shown in FIG. 25 to FIG. 29, the sprayer device 3 includes a frame 97 to which the wind guide member 96 is attached, and a connector portion 98 for connecting the frame 97 to the tractor 2. The frame 97 supports the wind guide member 96, the housing portion 31, the spray portion 32, the motor 23, the power transmission mechanism 50, and the like. The frame 97 is formed of a metal material such as steel. The connector portion 98 is detachably connected to the connector device 6 provided on the rear portion of the tractor 2. As shown in FIG. 5, by connecting the connector portion 98 to the connector device 6, the sprayer device 3 is detachably connected to the rear portion of the tractor 2.

The configuration of the frame 97 will be described below with reference to FIG. 25 to FIG. 29. However, the structure of the frame 97 is not limited to the illustrated structure. In the following description, the directions with respect to the frame 97 (up, down, front, rear, left, right) are based on the state in which the sprayer device 3 is connected to the rear portion of the tractor 2.

The frame 97 has an upper frame 97A and a lower frame 97B.

Figure 25:
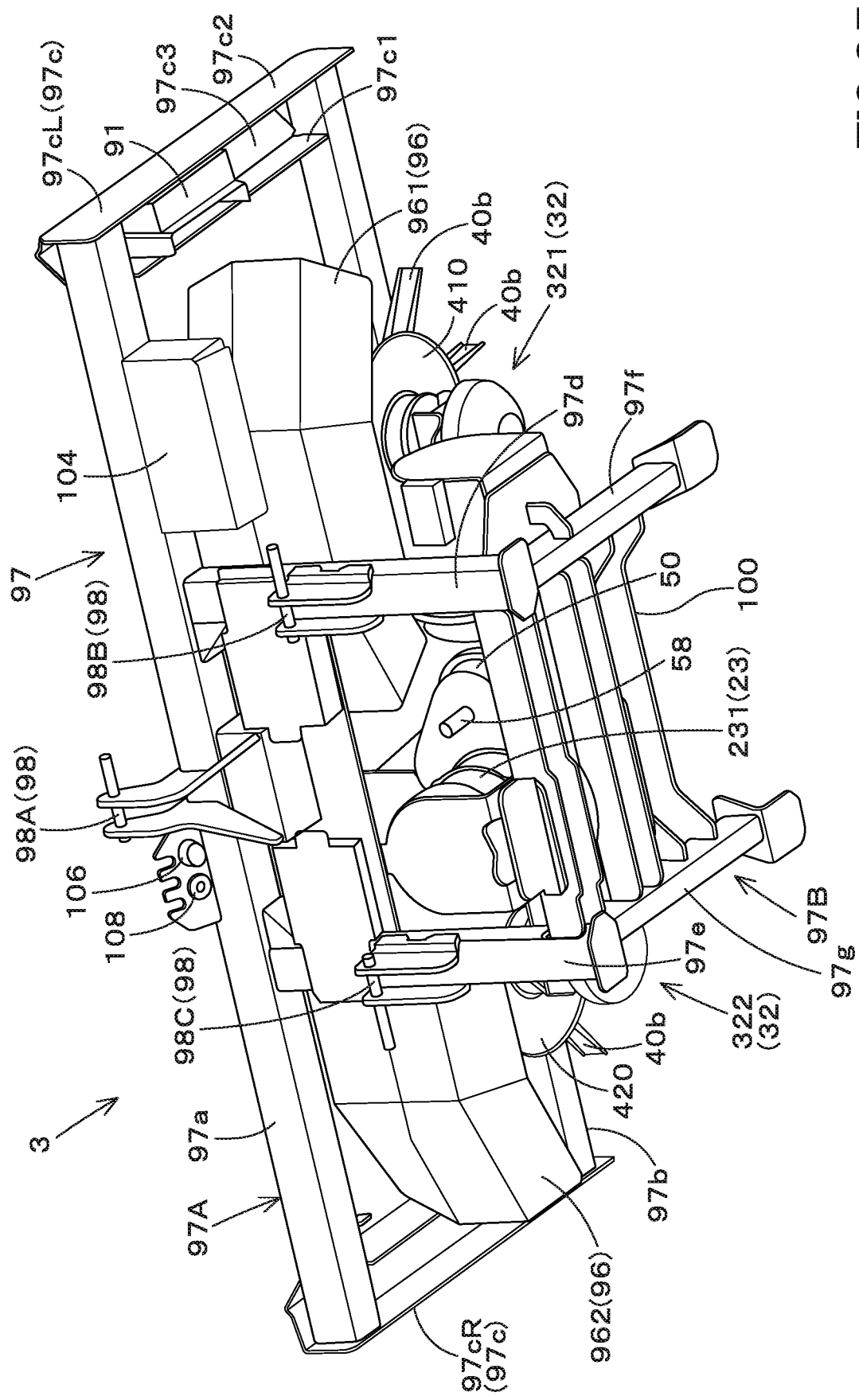
FIG. 25 is a front perspective view of a sprayer device according to the embodiments.
Figure 26:
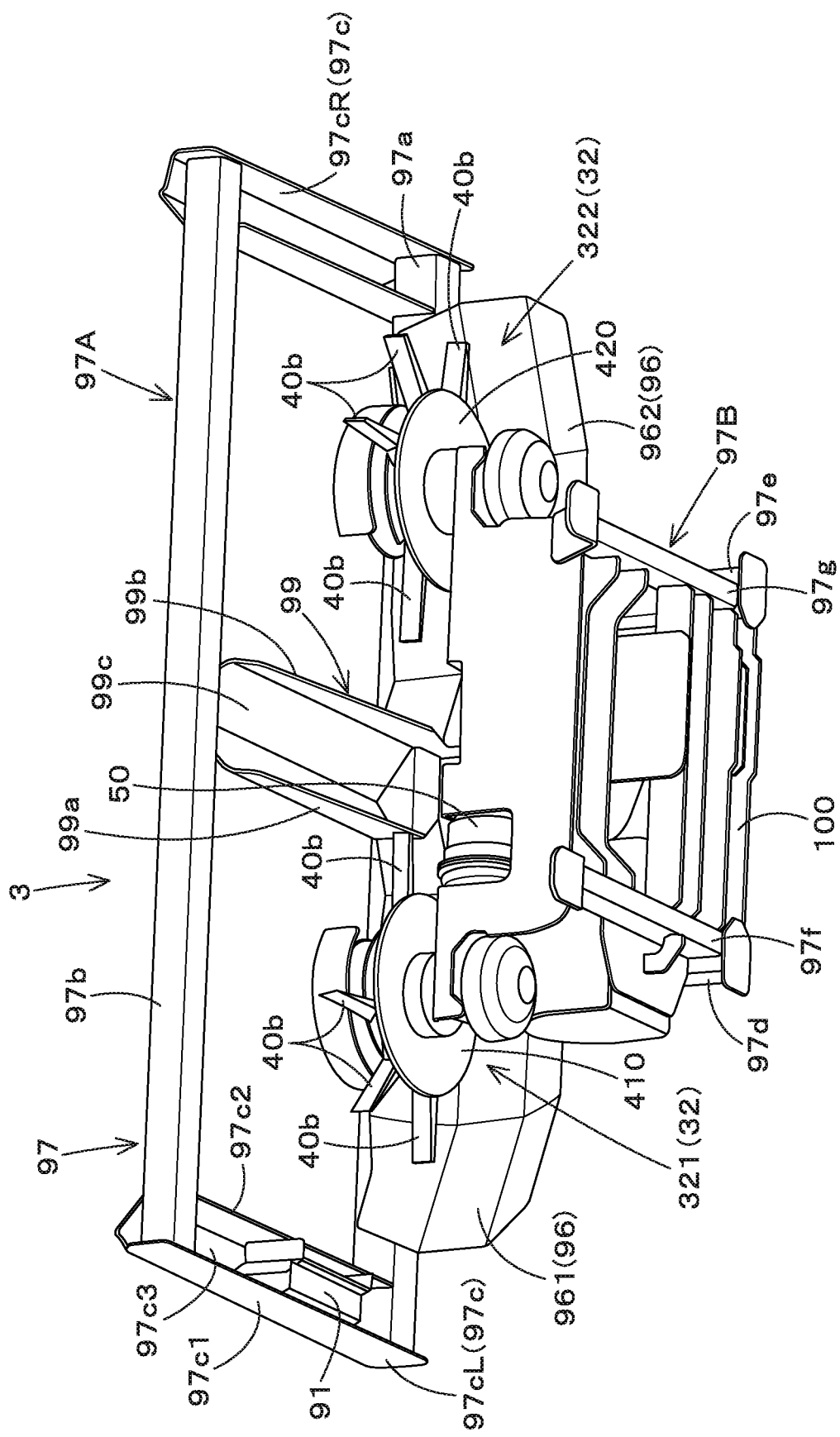
FIG. 26 is a rear perspective view of the sprayer device according to the embodiments.

The upper frame 97A is a frame that supports the housing portion 31, and is located above the sprinkling portion 32. As shown in FIG. 25 to FIG. 27, the upper frame 97A is formed in a rectangular frame shape in plan view. The upper frame 97A has a front frame 97*a*, a rear frame 97*b*, and a side frame 97*c*. The front frame 97*a* is arranged on the connector portion 98 side (front side) and extends in the vehicle width direction. The rear frame 97*b* is arranged on the opposite side (rear side) of the connector portion 98 and extends in the vehicle width direction. The front frame 97*a* and the rear frame 97*b* are arranged in parallel with each other with an interval in the front-rear direction. The side frame 97*c* connects the front frame 97*a* and the rear frame 97*b* at an end portion in the vehicle width direction. In particular, the side frame 97*c* includes a left side frame 97*c*L and a right side frame 97*c*R. The left side frame 97*c*L connects the left end of the front frame 97*a* and the left end of the rear frame 97*b*. The right side frame 97*c*R connects the right end of the front frame 97*a* and the right end of the rear frame 97*b*.

In the present embodiment, the side frame 97*c* is constituted of a member (channel material) having a substantially C-shaped cross section. In particular, the side frame 97*c* has an inner plate 97*c*1, an outer plate 97*c*2, and an upper plate 97*c*3. The inner side plate 97*c*1 is arranged inside the frame 97 (on the side of the central shaft 40*a*). The outer side plate 97*c*2 is arranged outside the frame 97 (on the side opposite to the central axis 40*a*) and faces the inner side plate 97*c*1. The upper plate 97*c*3 connects the upper portion of the inner plate 97*c*1 and the upper portion of the outer plate 97*c*2. The lower part of the inner plate 97*c*1 and the lower part of the outer plate 97*c*2 are not connected, and the lower part of the side frame 97*c* is open. That is, the side frame 97*c* is arranged with the C-shaped open side facing downward.

The front frame 97*a* and the rear frame 97*b* are connected by a connecting member 99 extending in the front-rear direction. The connection member 99 connects the front frame 97*a* and the rear frame 97*b* at the center in the vehicle width direction. As shown in FIG. 26, the connecting member 99 is constituted of a member having a substantially C-shaped cross section, like the side frame 97*c*, and is arranged with the open side of the C-shaped facing downward. In particular, the connecting member 99 has two side plates 99*a* and 99*b* and an upper plate 99*c*.

The lower frame 97B is arranged below the upper frame 97A. The lower frame 97B is connected to the upper frame 97A. The lower frame 97B has a first vertical member 97*d*, a second vertical member 97*e*, a first horizontal member 97*f*, and a second horizontal member 97*g*. The first vertical member 97*d* and the second vertical member 97*e* respectively extend in the vertical direction, and the upper ends of the first vertical member 97*d* and the second vertical member 97*e* are connected to the lower surface of the front frame 97*a*. The first vertical member 97*d* and the second vertical member 97*e* are arranged in parallel with each other with an interval in the vehicle width direction. The first vertical member 97*d* is arranged behind the first sprayer portion 321 (behind the first rotor 410). The second vertical member 97*e* is arranged rearward of the second dispersion portion 322 (rearward of the second rotor 420).

The first horizontal member 97*f* extends rearward from the lower end of the first vertical member 97*d*. The second horizontal member 97*g* extends rearward from the lower end of the second vertical member 97*e*. The first lateral member 97*f* and the second lateral member 97*g* are arranged in parallel with each other with a space in the vehicle width direction. The first lateral member 97*f* is arranged below the first sprayer portion 321 (below the first rotor 410). The second lateral member 97*g* is arranged below the second dispersion portion 322 (below the second rotor 420).

The support bracket 100 is attached to the lower frame 97B. The support bracket 100 supports the sprayer portion 32 (first sprayer portion 321, second sprayer portion 322), the motor 23, and the power transmission mechanism 50. The support bracket 100 is laid across the first vertical member 97*d* and the second vertical member 97*e* and between the first horizontal member 97*f* and the second horizontal member 97*g*. The sprayer portion 32, the motor 23, and the power transmission mechanism 50 are supported by the support bracket 100 above the first lateral member 97*f* and the second lateral member 97*g*.

As shown in FIG. 25, the frame 97 is provided with a connector portion 98. The connector portion 98 includes an upper connector portion 98A, a first lower connector portion 98B, and a second lower connector portion 98C. The upper connector portion 98A is provided on the front frame 97*a* of the upper frame 97A. The first lower connector portion 98B is provided on the first vertical member 97*d* of the lower frame 97B. The second lower connector portion 98C is provided on the second vertical member 97*e* of the lower frame 97B. The upper connector portion 98A is connected to the rear end portion of the top link 6B1. The first lower connector portion 98B is connected to the rear end portion of the first lower link 6B2L. The second lower connector portion 98C is connected to the rear end portion of the second lower link 6B2R. In this manner, the frame 97 is connected to the rear portion of the tractor 2 so as to be able to move up and down.

An wind guide member 96 is attached to the frame 97. A first wind guide member 961 is attached to the first vertical member 97*d*. A second wind guide member 962 is attached to the second vertical member 97*e*. In particular, the center portion 961*a* of the first wind guide member 961 is attached to the rear portion of the first vertical member 97*d*. The center portion 962*a* of the second wind guide member 962 is attached to the rear portion of the second vertical member 97*e*.

As shown in FIG. 27, the first wind guide member 961 is arranged between the front frame 97*a* and the first rotor 410 in the front-rear direction. The second wind guide member 962 is arranged between the front frame 97*a* and the second rotor 420 in the front-rear direction.

The left portion 961*b* of the first baffle member 961 and the right portion 962*c* of the second baffle member 962 extend from between the front frame 97*a* and the rotary wing 40*b* toward the side frame 97*c* and to the side. It moves rearward as it approaches the partial frame 97*c*. Hereinafter, the left portion 961*b* of the first wind guide member 961 and the right portion 962*c* of the second wind guide member 962 will be collectively referred to as the "inclined portion 103".

The inclined portion 103 guides the wind generated by driving the first sprayer portion 321 and the second sprayer portion 322 to the side frame 97*c* side.

As shown in FIG. 25, the frame 97 is provided with a second housing 104 that houses the second controller 93 and the inverter 22. In the embodiment, the second housing 104 is attached to the front frame 97*a*. However, the mounting position of the second housing 104 is not limited to the illustrated position.

In addition, as shown in FIG. 25 to FIG. 29, a regeneration resistor 91 for consuming the regenerative power generated in the motor 23 is attached to the frame 97. The arrangement (mounting position) of the regeneration resistor 91 will be described below.

The regeneration resistor 91 is arranged at a position where the regeneration resistor 91 is cooled by the wind generated by the rotation of the working portion 32. The position cooled by the wind generated by the rotation of the working portion 32 is preferably a position hit by the wind generated by the rotation of the working portion 32, but may be a position not hit by the wind. When the regeneration resistor 91 is arranged at a position where wind does not hit, the regeneration resistor 91 is arranged at a position where it comes into contact with or comes close to a member (for example, the frame 97 or the like) that is cooled by hitting the wind. In this manner, the regeneration resistor 91 is also cooled in association with the cooling of the member that is in contact with or close to the regeneration resistor 91. That is, the regeneration resistor 91 is indirectly cooled by the wind generated by the rotation of the working portion 32 through the other members.

In the present embodiment, as shown in FIG. 27 and the like, the regeneration resistor 91 is arranged radially outside the central axis 40*a*. More in particular, the regeneration resistor 91 is arranged at a position around the rotor blade 40*b*. In the present embodiment, the regeneration resistor 91 is attached to the side frame 97*c* on the side of the rotary shaft 40*b*. In particular, the regeneration resistor 91 is attached to the left side frame 97*c*L, but may be attached to the right side frame 97*c*R.

As shown in FIG. 27, the regeneration resistor 91 is arranged on the extension line L5 in the inclination direction of the inclined portion 103 of the first wind guide member 961 in a plan view. In this manner, the wind generated by driving the first sprayer portion 321 is guided to the left side frame 97*c*L side by the inclined portion 103 of the first wind guide member 961 and hits the regeneration resistor 91 to cool the regeneration resistor 91. When the regeneration resistor 91 is attached to the right side frame 97*c*R, the regeneration resistor 91 is arranged on an extension line of the inclined portion 103 of the second wind guide member 962 in the inclination direction in a plan view. In this case, the wind generated by driving the second sprayer portion 322 is guided to the right side frame 97*c*R side by the inclined portion 103 of the second wind guide member 962, hits the regeneration resistor 91, and the regeneration resistor 91 is cooled.

As described above, since the regeneration resistor 91 is arranged at the position around the rotor blade 40*b*, the wind generated by the rotation of the rotor blade 40*b* hits the regeneration resistor 91. In addition, the wind guide member 96 guides the wind generated by the rotation of the rotor blade 40*b*, so that the wind can be efficiently applied to the regeneration resistor 91. Thus, when the regeneration resistor 91 generates heat due to the generation of regenerative power, the regeneration resistor 91 can be effectively cooled.

The regeneration resistor 91 is attached between the inner plate 97*c*1 and the outer plate 97*c*2 of the side frame 97*c*. The regeneration resistor 91 is surrounded by the inner plate 97*c*1, the outer plate 97*c*2, and the upper plate 97*c*3 of the side frame 97*c* on the upper side, the right side, and the left side. Thus, the spraying substance scattered by the first spreading portion 321 is blocked by the inner plate 97*c*1 and the like and does not hit the regeneration resistor 91. In addition, the lower side of the regeneration resistor 91 is opened without being surrounded by the side frame 97*c*. Thus, the wind generated by the first sprayer portion 321 wraps around from below the side frame 97*c* and hits the regeneration resistor 91. That is, the regeneration resistor 91 is arranged at a position where the wind generated by the rotation of the sprayer portion 32 hits but the spraying substance sprinkled by the sprayer portion 32 does not hit (or is hard to hit). This makes it possible to cool the regeneration resistor 91 while preventing the spraying substance from hitting the regeneration resistor 91.

In addition, as shown in FIG. 28, the regeneration resistor 91 is arranged at a position displaced from the rotor blade 40*b* in the axial direction of the central axis 40*a*. In particular, the regeneration resistor 91 is arranged at a position (height) above the rotor blade 40*b* in the vertical direction. Since the spraying substance scattered by the sprayer portion 32 moves downward (falls) due to gravity as it moves away from the rotor blade 40*b*, this configuration also has an effect that the spraying substance scattered by the rotor blade 40*b* hits the regeneration resistor 91. In addition, the wind generated by the rotor blade 40*b* can be applied to the regeneration resistor 91 from below.

The frame 97 is made of a metal material such as steel and has excellent heat conductivity. Thus, the frame 97 is quickly cooled by being hit by wind even when the temperature rises due to the heat generation of the regeneration resistor 91. By cooling the frame 97 around the regeneration resistor 91, the regeneration resistor 91 can be indirectly cooled.

The mounting position of the regeneration resistor 91 is not limited to the position shown in the drawings, and the wind generated by the sprayer portion 32 hits, but the spraying substance distributed by the sprayer portion 32 does not hit (or is hard to hit). For example, the regeneration resistor 91 may be attached to the outer surface (the surface opposite to the inner plate 97*c*1) of the outer plate 97*c*2 that constitutes the side frame 97*c*. In this case, the spraying substance scattered by the scattering section 32 is blocked by the inner plate 97*c*1 and the outer plate 97*c*2 and does not hit the regeneration resistor 91, but the wind generated by the scattering section 32 wraps around from below the side frame 97*c*.

The regeneration resistor 91 may be attached to the frame 97 at a position other than the side frame 97*c*. For example, the regeneration resistor 91 may be attached to the rear frame 97*b* or the connection member 99. When the regeneration resistor 91 is attached to the rear frame 97*b*, it is preferable to attach the regeneration resistor 91 to the rear surface or the upper surface of the rear frame 97*b* in order to prevent the spraying substance from hitting. When the regeneration resistor 91 is attached to the connecting member 99, it is preferable to attach it between the side plates 99*a* and 99*b* in order to prevent the spraying substance from hitting.

<Cable Arrangement Structure>

As shown in FIG. 5, the sprayer device (working device) 3 is connected to a connector device 6 provided at the rear of the tractor (traveling vehicle) 2. In particular, the upper connector portion 98A, the first lower connector portion 98B, and the second lower connector portion 98C provided on the frame 97 are the top link 6B1, the first lower link 6B2L, and the second lower link of the connector device 6, respectively. In this manner, the sprayer device 3 is connected to the rear portion of the tractor 2.

The second shaft 58 of the power transmission mechanism 50 of the sprayer device 3 extends forward (to the tractor 2 side) in a state where the sprayer device 3 is connected to the rear portion of the tractor 2. The second shaft 58 of the power transmission mechanism 50 and the input shaft 24 of the transmission mechanism 25 are connected through a connector (universal joint or the like) 105. In this manner, the power from the engine 11 (second driving source) transmitted from the PTO output shaft 19b to the input shaft 24 of the transmission mechanism 25 is transmitted to the second shaft 58 of the power transmission mechanism 50 through the connector 105.

Next, a cable connection structure (arrangement structure) between the tractor (traveling vehicle) 2 side and the sprayer device (working device) 3 side will be described based on FIG. 5, FIG. 6, FIG. 9, FIG. 25 and the like.

The cable 95 connecting the tractor 2 side and the sprayer device 3 side includes a power supply cable 95A and a signal transmission cable 95B.

The power supply cable 95A is a cable for supplying the sprayer device 3 with the electric power generated from the generator 15 mounted on the rear portion of the tractor 2. The signal transmission cable 95B is a cable for transmitting a signal from the tractor 2 to the sprayer device 3, and transmits a signal based on the ISOBUS, which is an international standard for agricultural machine communication. The signal transmitted from the tractor 2 to the sprayer device 3 is, for example, a control signal from a controller portion (in-vehicle ECU) of the tractor 2 or a signal from an electrical component mounted on the tractor 2 (for example, a detection signal of a sensor).

The power supply cable 95A connects the generator unit 12 and the sprayer device 3. One end side (output side) of the power supply cable 95A is connected to the first output connector 37. The other end side (input side) of the power supply cable 95A is connected to the first input connector 106. In this manner, the power supply cable 95A is routed from the first output connector 37 to the first input connector 106.

As shown in FIG. 9 and the like, the first output connector 37 is provided on the attachment frame 26 of the generator unit 12. In addition, as shown in FIG. 25, the first input connector 106 is provided on the frame 97 (upper frame 97A) of the sprayer device 3. In particular, the first input connector 106 is provided on the front frame 97a. The first input connector 106 is located in the vicinity (side) of the upper connector portion 98A connected to the top link 6B1. The first input connector 106 is connected to the motor 23 (first motor 231 and second motor 232) of the sprayer device 3 through a cable (not shown in the drawings).

Electricity generated from the generator 15 is supplied to the first input connector 106 from the first output connector 37 through the power supply cable 95A, and drives the motor 23 (first motor 231 and second motor 232) of the sprayer device 3.

The signal transmission cable 95B connects the tractor 2 and the sprayer device 3. One end side (output side) of the signal transmission cable 95B is connected to the second output connector 107. The other end side (input side) of the signal transmission cable 95B is connected to the second input connector 108. Accordingly, the signal transmission cable 95B is routed from the second output connector 107 to the second input connector 108.

As shown in FIG. 5 and FIG. 6, the second output connector 107 is provided on the rear portion of the tractor 2. The second output connector 107 is provided above the generator unit 12, and is located above the first output connector 37. The second output connector 107 is provided above the front end portion of the top link 6B1 and the front end portion of the lift arm 6A, and is provided between the first lift arm 6AL and the second lift arm 6AR in the vehicle width direction.

The second input connector 108 is connected to the second controller 93 through a cable (not shown in the drawings). As shown in FIG. 25, the second input connector 108 is provided on the frame 97 (upper frame 97A) of the sprayer device 3. In particular, the second input connector 108 is provided on the front frame 97a. The second input connector 108 is located near (side) the upper connector portion 98A connected to the top link 6B1. In the present embodiment, the second input connector 108 is provided side by side with the first input connector 106. However, the arrangement of the first input connector 106 and the second input connector 108 is not limited to the illustrated arrangement.

As described above, the power supply cable 95A is connected to the first output connector 37 and the first input connector 106. Here, in the first output connector 37, the connector portion 37a to which the power supply cable 95A is connected is arranged so as to face upward, so the power supply cable 95A stretches upward from the first output connector 37.

As shown in FIG. 6 and FIG. 7, the first output connector 37 includes a top link 6B1 in the vehicle width direction and a link member (second lower link 6B2R, first link) provided on the other side (right side) in the vehicle width direction. The second lift arm 6AR and the second lift rod 6B3R). Thus, the power supply cable 95A connected to the first output connector 37 can be extended upward through between the top link 6B1 and the link member. This can prevent the power supply cable 95A from interfering with the connector device 6.

In addition, as shown in FIG. 10, the first output connector 37 is arranged below the upper plate 38c of the cover member 38, and the cover member 38 and the second front plate 332a of the second mounting portion 332. Thus, unintended contact with the end portion (connection portion with the first output connector 37) on the one end side of the power supply cable 95A is prevented, and the power supply cable 95A is prevented from falling off. In addition, the power supply cable 95A connected to the first output connector 37 can be stretched upward through the space between the cover member 38 and the second front plate 332a.

As shown in FIG. 5 and FIG. 6, the power supply cable 95A and the signal transmission cable 95B are bound by a bundling member 109. The bundling member 109 is constituted of, for example, a binding band such as INSULOK (a registered trademark). The power supply cable 95A and the signal transmission cable 95B are preferably bundled at a plurality of portions, and are bundled at least at three portions (a first binding portion 111, a second binding portion 112, a third binding portion 113) described later.

The power supply cable 95A and the signal transmission cable 95B are routed from the tractor 2 side to the sprayer device 3 side while being bound by the bundling member 109. In particular, the power supply cable 95A is routed from the first output connector 37 to the first input connector 106 in a state of being bound to the signal transmission cable 95B by the bundling member 109. The signal transmission cable 95B is routed from the second output connector 107 to the second input connector 108 while being bound with the power supply cable 95A by the bundling member 109.

As shown in FIGS. 5 and 6, the power supply cable 95A extending upward from the first output connector 37 passes through the vicinity of the second output connector 107 arranged above the first output connector 37 and receives the first input. Routed to connector 106. The power supply cable 95A is bound by the bundling member 109 to the signal transmission cable 95B connected to the second output connector 107 at a portion passing near the second output connector 107. The first binding portion 111 is a portion where the power supply cable 95A passes near the second output connector 107.

The second binding portion 112 is a portion located near the first input connector 106 and the second input connector 108. The third binding portion 113 is a portion between the first binding portion 111 and the second binding portion 112. When the cable 95 is short, the third binding portion 113 can be omitted. When the cable 95 is long, for example, in addition to the first binding portion 111, the second binding portion 112, and the third binding portion 113, another portion may be bound.

As shown in FIG. 5, the power supply cable 95A and the signal transmission cable 95B are arranged in a state of being bound to each other by the bundling member 109 and pass through above the connector device 6 (above the top link 6B1) to the sprayer device 3 side. The power supply cable 95A and the signal transmission cable 95B bound by the bundling member 109 are located between the top link 6B1 and the second lift arm 6AR in the vehicle width direction (the first lift arm 6AL and the second lift arm 6AR). Thereby, it is also routed to the sprayer device 3 side. This can prevent the power supply cable 95A and the signal transmission cable 95B from interfering with the connector device 6.

As described above, the power supply cable 95A and the signal transmission cable 95B are routed from the tractor 2 side to the sprayer device 3 side while being bound by the bundling member 109, so that the tractor 2 side to the sprayer device 3 side are provided. The cables (the power supply cable 95A and the signal transmission cable 95B) can be easily routed, and the workability of the cable routing is improved. In addition, since the power supply cable 95A and the signal transmission cable 95B are bound by the bundling member 109 and are in close proximity to each other, a space required for routing rather than separating the power supply cable 95A and the signal transmission cable 95B is reduced. Thus, the cable is less likely to contact the connector device 6 and the like, damage to the cable due to contact can be prevented, and the reliability of the cable is improved.

The power supply cable 95A stretches upward from the first output connector 37, passes near the second output connector 107, and is bundled with the signal transmission cable 95B to be routed to the first input connector 106. In this manner, the power supply cable 95A and the signal transmission cable 95B can be routed along a short path while avoiding the movable portions such as the connector device 6 and the input shaft 24.

<Adapter of Generator Unit>

As shown in FIG. 30 to FIG. 34, the generator unit 12 includes an adapter 114. The adapter 114 is a member that can be mounted on at least one (preferably two or more) of the tractor 2, the working device 3, and the towing member 110 (hereinafter collectively referred to as "mounting target"). By mounting the adapter 114 on the mounting target, the generator unit 12 can be mounted on the mounting target. The tow member 110 is a member that connects the working device 3 to the rear portion of the tractor 2, and is a member that allows the working device 3 to be pulled by the tractor 2.

The configuration of the adapter 114 will be described below with reference to FIG. 30 to FIG. 34. However, the configuration of the adapter 114 is not limited to the illustrated configuration. In addition, in the illustrated example, the number of adapters 114 included in the generator unit 12 is one, but the generator unit 12 may include a plurality of adapters 114.

The adapter 114 is attached to the mounting portion 33 of the generator unit 12. In particular, the adapter 114 is detachably attached to the first mounting portion 331 and the second mounting portion 332. In particular, the adapter 114 is attached to the first mounting hole 331c formed in the first front plate 331a and the second mounting hole 332c formed in the second front plate 332a with bolts or the like.

Figure 32:
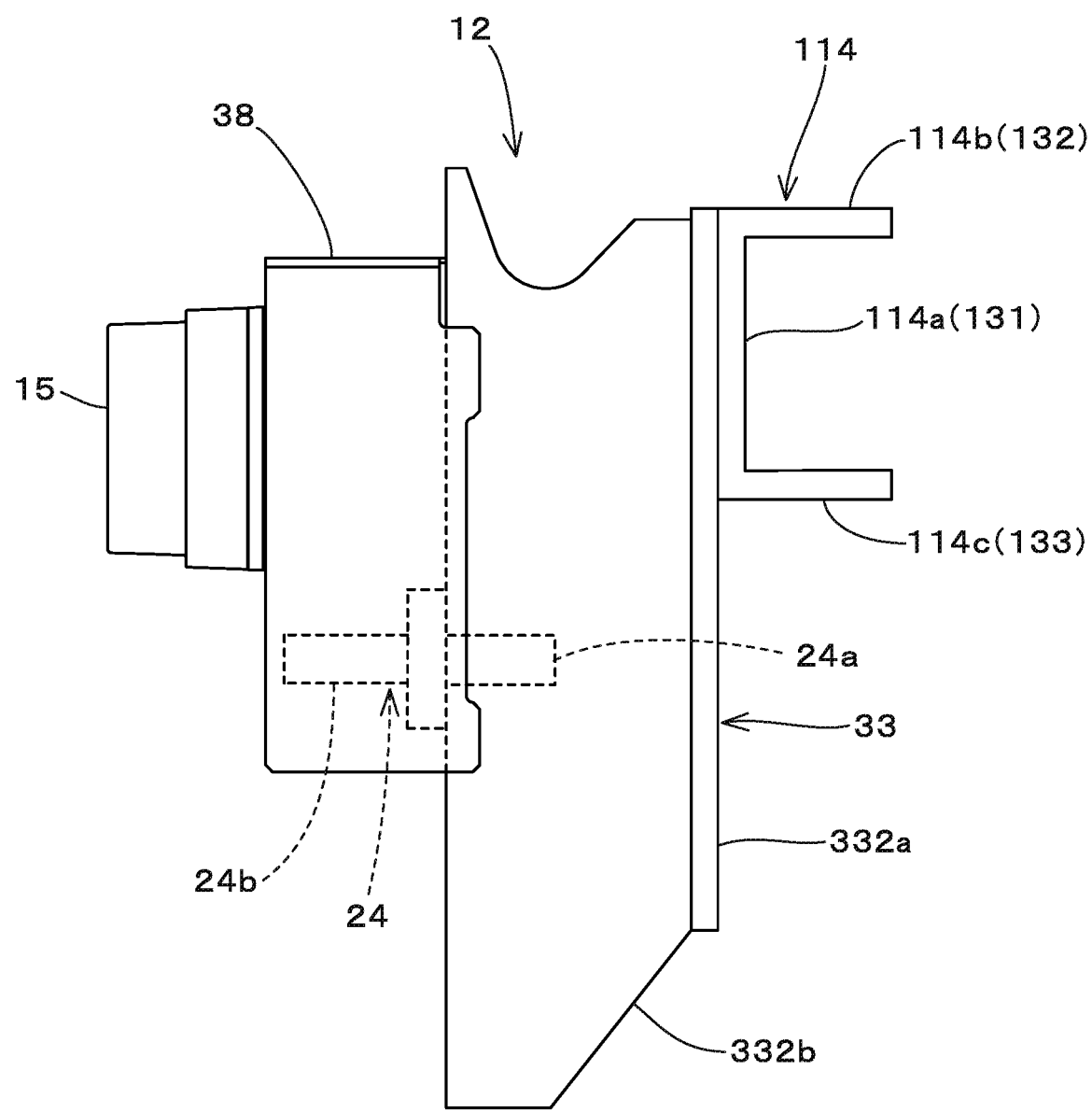
FIG. 32 is a side view illustrating a state where an adapter according to a second embodiment is attached to the power generator unit according to the embodiments.
Figure 33:
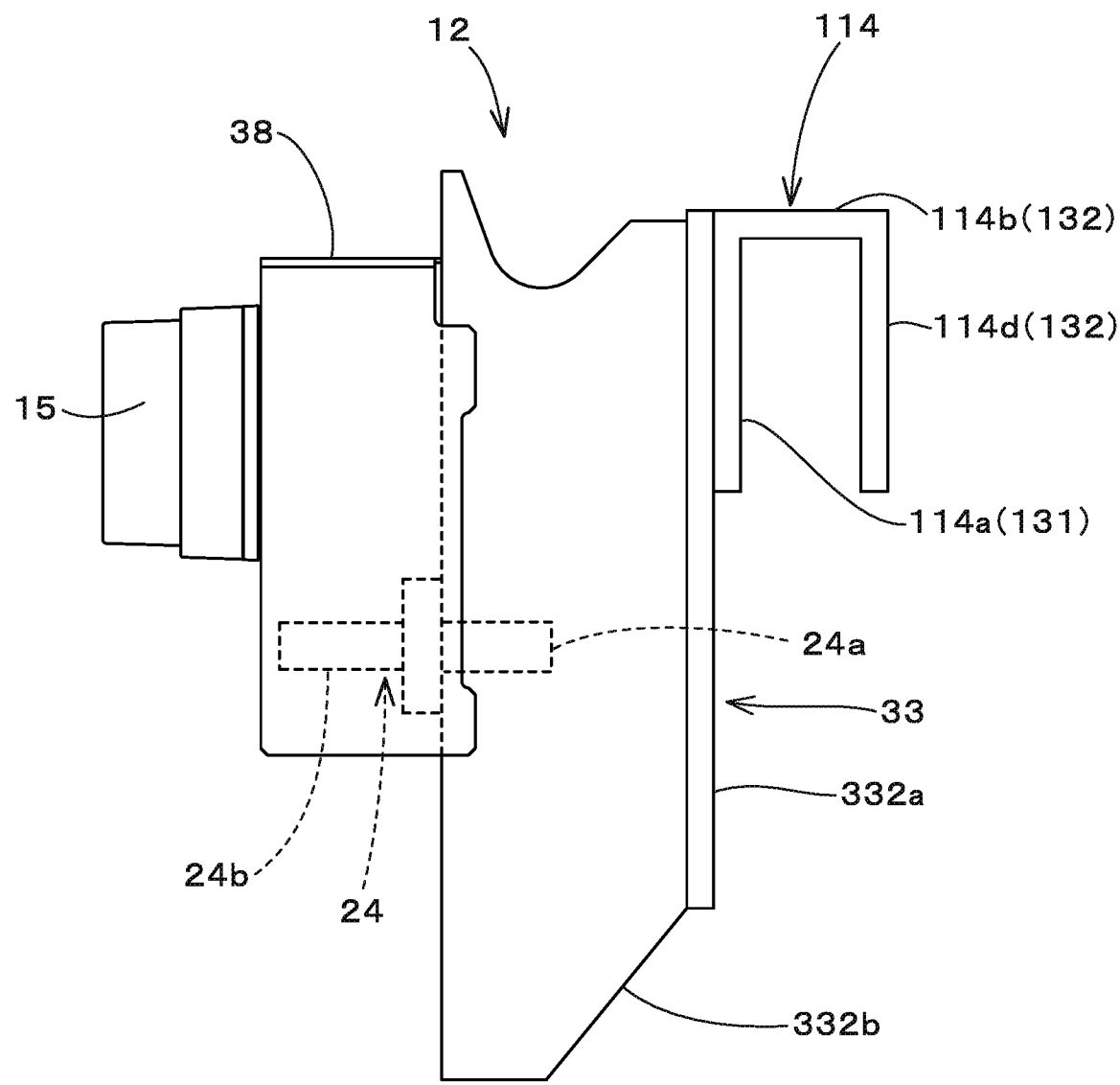
FIG. 33 is a side view illustrating a state where an adapter according to a third embodiment is attached to the power generator unit according to the embodiments.
Figure 34:
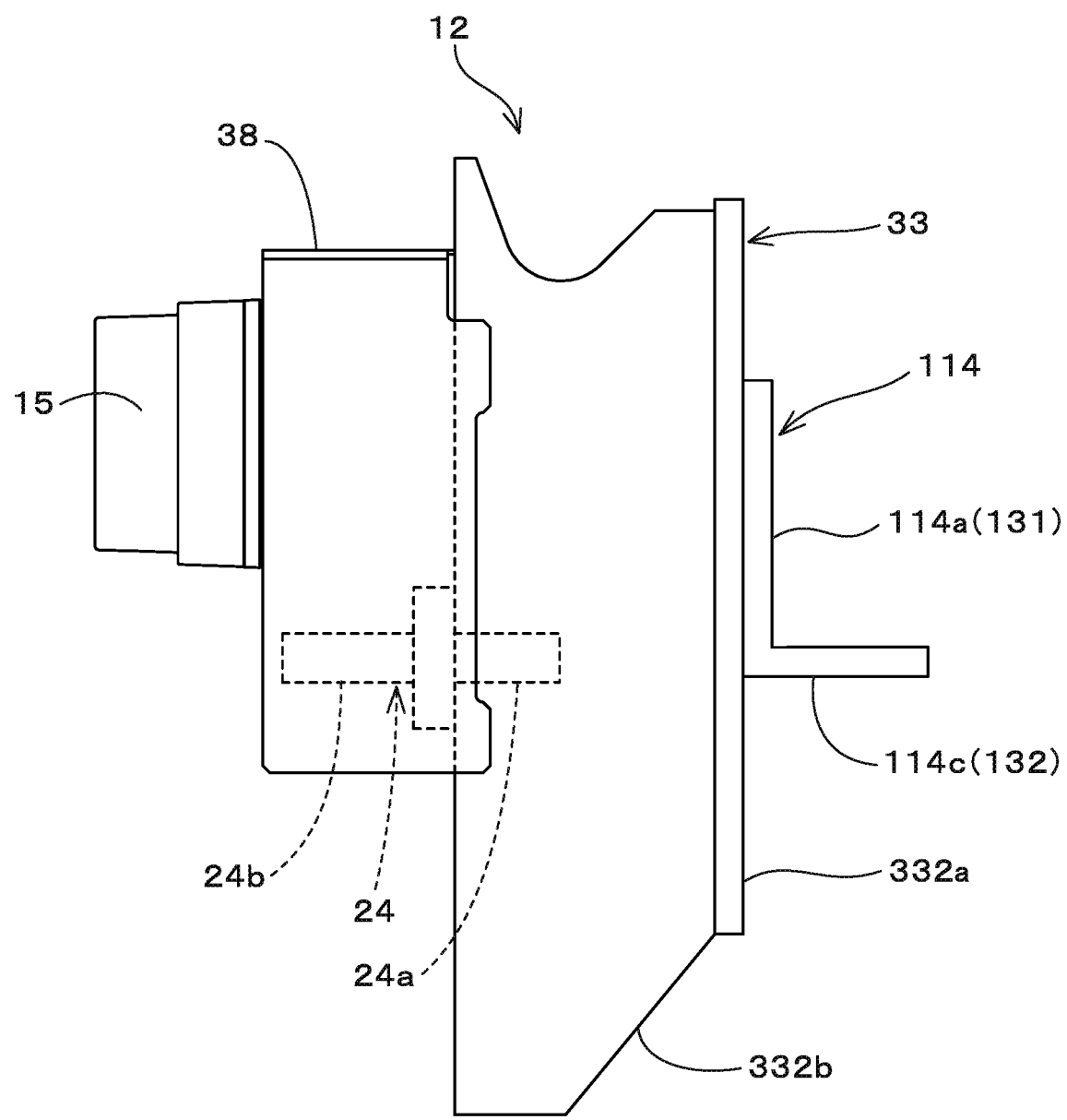
FIG. 34 is a side view illustrating a state where an adapter according to a fourth embodiment is attached to the power generator unit according to the embodiments.

In the example shown in FIG. 30 to FIG. 33, the adapter 114 is attached to the upper portion of the mounting portion 33, but the mounting position of the adapter 114 is the vertical middle portion of the mounting portion 33 as shown in FIG. 34. It may be the lower portion of the mounting portion 33.

Figure 30:
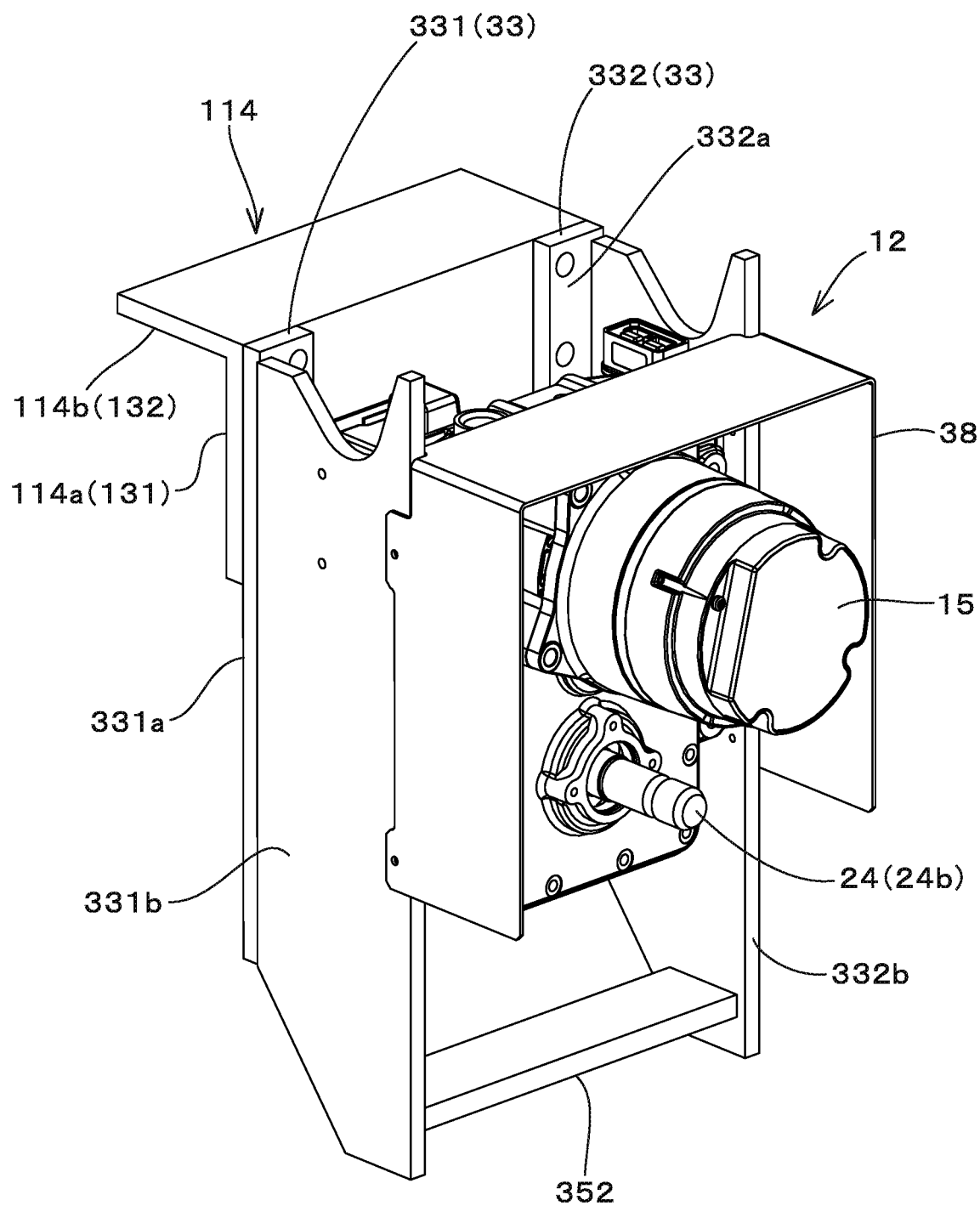
FIG. 30 is a perspective view illustrating a state where an adapter according to a first embodiment is attached to a power generator unit according to the embodiments.
Figure 31:
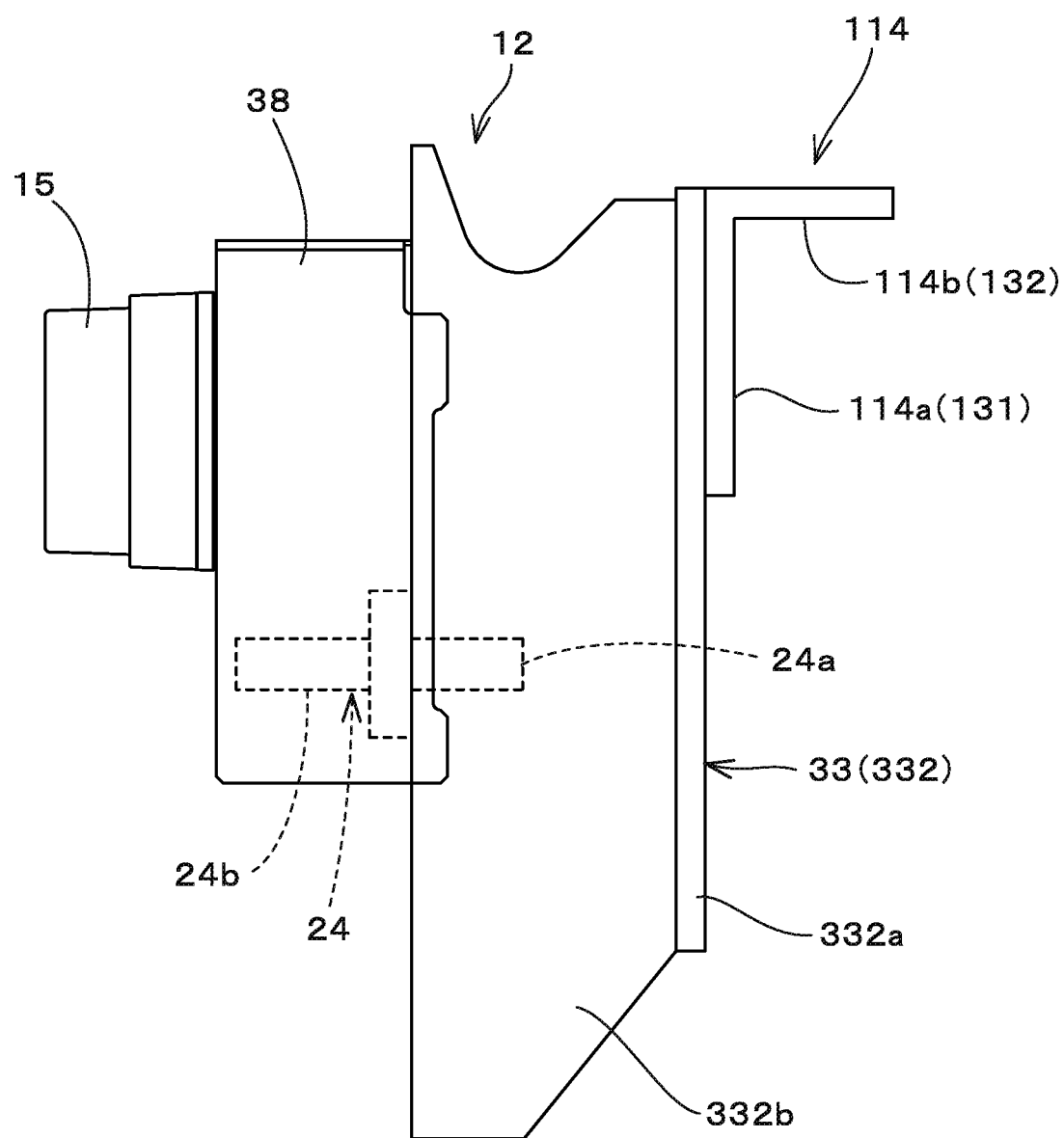
FIG. 31 is a side view illustrating the state where the adapter according to the first embodiment is attached to the power generator unit according to the embodiments.

FIG. 30 and FIG. 31 show a first embodiment of the adapter 114. The adapter 114 has a vertical plate portion 114a and a horizontal plate portion 114b. The vertical plate portion 114a is a first portion 131 attached to the generator unit 112, and the horizontal plate portion 114b is a second portion 132 attached to an attachment target. The vertical plate portion 114a and the horizontal plate portion 114b are integrally formed by one plate. The vertical plate portion 114a is attached across the first front plate 331a and the second front plate 332a. The horizontal plate portion 114b extends from the upper end of the vertical plate portion 114a at a right angle to the vertical plate portion 114a and in a direction away from the vertical plate portion 114a. A through hole (not shown in the drawings) through which a bolt can be inserted can be formed in the lateral plate portion 114b.

FIG. 32 shows a second embodiment of the adapter 114. The adapter 114 of the second embodiment has a second horizontal plate portion 114c in addition to the vertical plate portion 114a and the horizontal plate portion 114b similar to the adapter 114 of the first embodiment. The vertical plate portion 114a corresponds to the first portion 131, and the horizontal plate portion 114b and/or the second horizontal plate portion 114c corresponds to the second portion 132. The vertical plate portion 114a, the horizontal plate portion 114b, and the second horizontal plate portion 114c are integrally formed by one plate. The second horizontal plate portion 114c extends from the lower end of the vertical plate portion 114a at a right angle to the vertical plate portion 114a and in a direction away from the vertical plate portion 114a. The second horizontal plate portion 114c is provided below the horizontal plate portion 114b and separated from the horizontal plate portion 114b. A through hole (not shown in the drawings) through which a bolt can be inserted can be formed in one or both of the horizontal plate portion 114b and the second horizontal plate portion 114c.

FIG. 33 shows a third embodiment of the adapter 114. The adapter 114 of the third embodiment has a vertical plate portion 114a and a horizontal plate portion 114b similar to the adapter 114 of the first embodiment, and further has a second vertical plate portion 114d. The vertical plate portion 114a corresponds to the first portion 131, and the horizontal plate portion 114b and/or the second vertical plate portion 114d corresponds to the second portion 132. The vertical plate portion 114a, the horizontal plate portion 114b, and the second vertical plate portion 114d are integrally formed by one plate. The second vertical plate portion 114d extends downward at a right angle to the horizontal plate portion 114b. The second vertical plate portion 114d is provided so as to be separated from the vertical plate portion 114a and parallel to the vertical plate portion 114a. A through hole (not shown in the drawings) through which a bolt can be inserted can be formed in one or both of the horizontal plate portion 114b and the second vertical plate portion 114d.

FIG. 34 shows a fourth embodiment of the adapter 114. The adapter 114 of the fourth embodiment has a vertical plate portion 114a similar to the adapter 114 of the first embodiment, and further has a second horizontal plate portion 114c similar to the adapter 114 of the second embodiment. The vertical plate portion 114a corresponds to the first portion 131, and the second horizontal plate portion 114c corresponds to the second portion 132. The vertical plate portion 114a and the second horizontal plate portion 114c are integrally formed by one plate. A through hole (not shown in the drawings) through which a bolt can be inserted can be formed in the second horizontal plate portion 114c.

In the present embodiment, the adapter 114 is attached across both the first mounting portion 331 and the second mounting portion 332. It may be attached to either one of the first mounting portion 331 and the second mounting portion 332. In addition, the adapter 114 may be attached at a position different from the front plate (first front plate 331a, second front plate 332a) of the mounting portion 33. For example, the adapter 114 may be attached to either or both of the first side plate 331b and the second side plate 332b.

In addition, the adapter 114 may be attached at a position different from the mounting portion 33. For example, the adapter 114 may be attached to the cover member 38 (any one of the one side plate 38a, the other side plate 38b, and the upper plate 38c) or the connector portion 35 (the first connector portion 351 or the second connector portion 352).

In addition, In the present embodiment, the adapter 114 extends toward one side of the input shaft 24 (the first connector portion 24a side), but may extend toward the other side of the input shaft 24 (the second connector portion 24b side). In addition, the adapter 114 may be extended in a direction (left and/or right) orthogonal to the input shaft 24.

Figure 35:
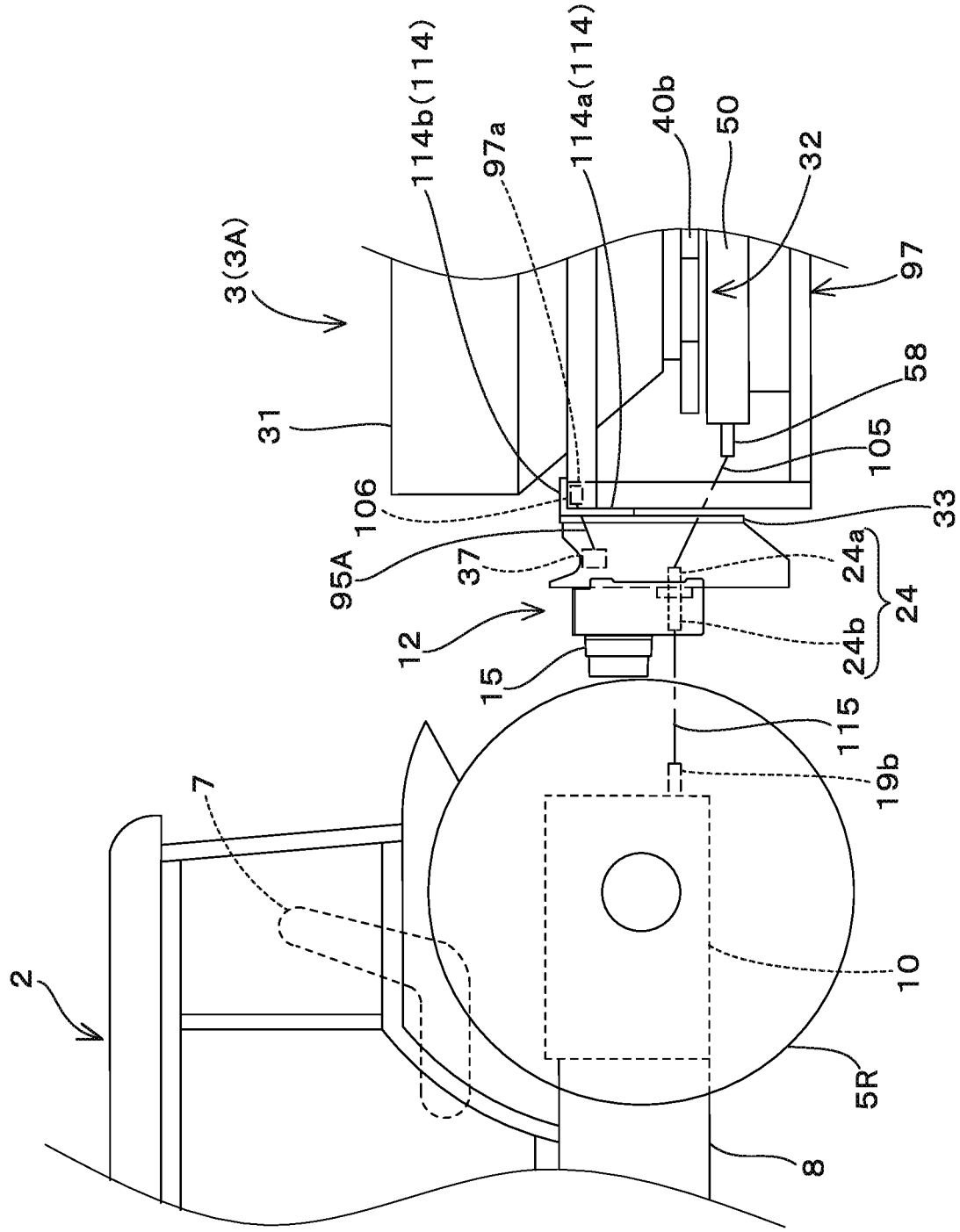
FIG. 35 is a side view illustrating a state where the power generator unit is attached to a spreader with use of the adapter according to the embodiments.
Figure 36:
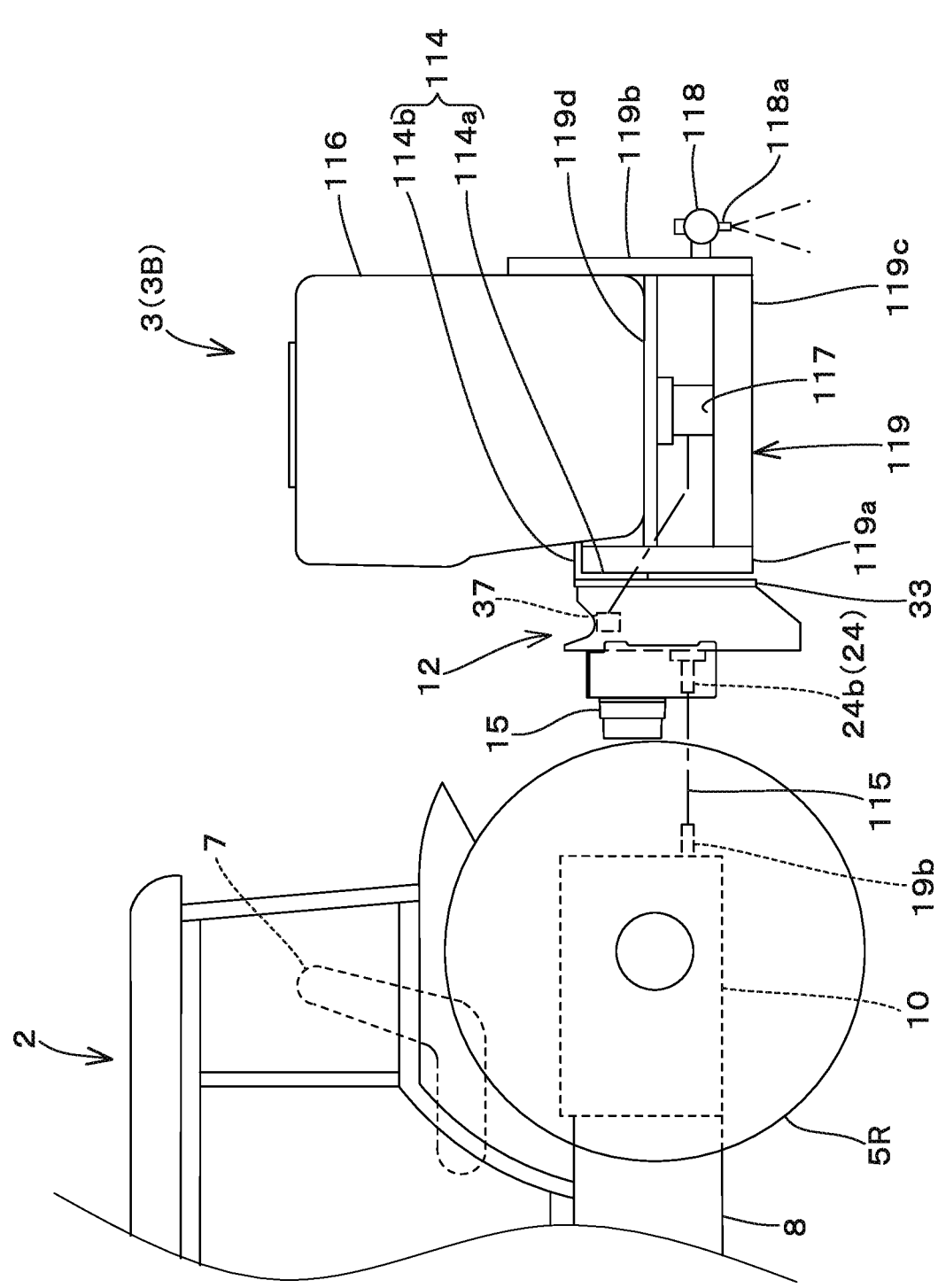
FIG. 36 is a side view illustrating a state where the power generator unit is attached to a sprayer with use of the adapter according to the embodiments.

FIG. 35 and FIG. 36 show an example of a state in which the adapter 114 is attached to the sprayer device 3.

The example shown in FIG. 35 is an example in which the sprayer device 3 is a spreader 3A.

The spreader 3A is the sprayer device 3 of the above-described embodiment, and is a hybrid spreader that is driven by using the power from the PTO shaft 19 of the tractor 2 and the power from the generator 15.

The spreader 3A is connected to the rear portion of the tractor 2 by a connecting device (not shown in the drawings) such as the above-mentioned three-point link mechanism. The adapter 114 is attached to the frame 97 of the spreader 3A. The adapter 114 is the adapter of the first embodiment, and the horizontal plate portion 114b is in contact with the upper surface of the front frame 97a, and the vertical plate portion 114a is in contact with the front surface of the front frame 97a. At least one of the vertical plate portion 114a and the horizontal plate portion 114b of the adapter 114 is fixed to the front frame 97a by bolts or the like. In this manner, the generator unit 12 is attached to the frame 97 of the spreader 3A.

In the generator unit 12 mounted on the spreader 3A, the second connector portion 24b of the input shaft 24 faces the tractor 2 side, and the first connector portion 24a of the input shaft 24 faces the spreader 3A side. The second connector portion 24b of the input shaft 24 is connected to the PTO output shaft 19b of the tractor 2 via a connecting tool (universal joint or the like) 115. The first connector portion 24a of the input shaft 24 is connected to the second shaft 58 of the power transmission mechanism 50 of the spreader 3A via a connecting tool (universal joint or the like) 105. The generator 15 is driven by the power input from the input shaft 24 to generate power. The electric power generated from the generator 15 is supplied to the electric motors (the first motor 231 and the second motor 232) of the spreader 3A, and the electric motor drives the sprayer portion 32.

The adapter 114 may be attached to another portion of the frame 97 (for example, the side frame 97c or the like). In addition, instead of the adapter of the first embodiment, the adapter 114 of another embodiment or an adapter of a different shape may be used. In addition, the spreader 3A is not limited to the hybrid spreader, and may be an electric spreader that is driven only by the electric power from the generator 15.

The example shown in FIG. 36 is an example when the sprayer device 3 is a sprayer 3B.

The sprayer 3B is connected to the rear portion of the tractor 2 by a connecting device (not shown in the drawings) such as a three-point link mechanism. The sprayer 3B includes a tank 116, an electric pump 117, a boom 118, and a support frame 119. The tank 116 stores chemicals and the like to be sprayed on the agricultural field. The electric pump 117 sends out the medicine or the like stored in the tank 116. The boom 118 has a spray nozzle 118a that sprays the medicine or the like delivered by the electric pump 117. The boom 118 has a first posture that extends in the vehicle width direction (left and right) of the tractor 2 when in use, and has a second posture that extends upward when not in use. The support frame 119 has a front frame 119a, a rear frame 119b, a lower frame 119c, and a horizontal frame 119d. The support frame 119 supports the tank 116, the electric pump 117, and the boom 118. The sprayer 3B also includes a drive controller portion that controls the drive of the electric pump 117 and the like based on a control signal from the in-vehicle ECU. The drive controller portion has the same function as the second controller portion 93 described above, and may be provided separately from the first controller portion 30, or the first controller portion 30 has the function of the drive controller portion. The vehicle ECU may have the function of the drive controller portion. In addition, the drive controller portion may control the drive of the electric pump 117 and the like without depending on the control signal from the in-vehicle ECU.

In addition, the sprayer 3B may have a valve mechanism that adjusts the opening degree of the path through which the medicine or the like flows from the tank 116 toward the boom 118. In this case, the operation (opening/closing) of the valve mechanism can be controlled by the drive controller portion.

The adapter 114 is the adapter of the first embodiment and is fixed to the front frame 119a with bolts or the like. In this manner, the generator unit 12 is attached to the frame 119 of the sprayer 3B.

In the generator unit 12 mounted on the sprayer 3B, the second connector portion 24b of the input shaft 24 faces the tractor 2 side. The second connector portion 24*b* of the input shaft 24 is connected to the PTO output shaft 19*b* of the tractor 2 via a connecting tool (universal joint or the like) 115. The generator 15 is driven by the power input from the input shaft 24 to generate power. The electric power generated from the generator 15 is supplied to the electric pump 117, and the electric pump 117 is driven by the electric power.

The adapter 114 may be attached to another portion of the frame 119 (for example, the horizontal frame 119*d* or the like). In addition, instead of the adapter of the first embodiment, the adapter 114 of another embodiment or an adapter of a different shape may be used. In addition, the sprayer 3B may be a hybrid type sprayer that is driven by the electric power from the generator 15 and the power from the PTO shaft 19 of the tractor 2.

As described above, the spreader 3A and the sprayer 3B, which are the sprayer devices, have been illustrated as the working device 3 to which the generator unit 12 is attached by the adapter 114, but the configurations of the spreader 3A and the sprayer 3B are not limited to the above-described configurations. The working device 3 to which the generator unit 12 is attached by the adapter 114 is not limited to the sprayer device. The working device 3 may be a working device provided with an electric actuator (electric motor, electric pump, etc.) driven by electric power supplied from the generator 15 of the generator unit 12, and is supplied from the generator 15, for example. For example, it may be a seeder device equipped with an electric motor driven by electric power. When the adapter 114 is attached to the seeder device, the adapter 114 can be attached to a frame that supports a hopper for storing seeds, a feeding device for feeding seeds, and the like.

Figure 37:
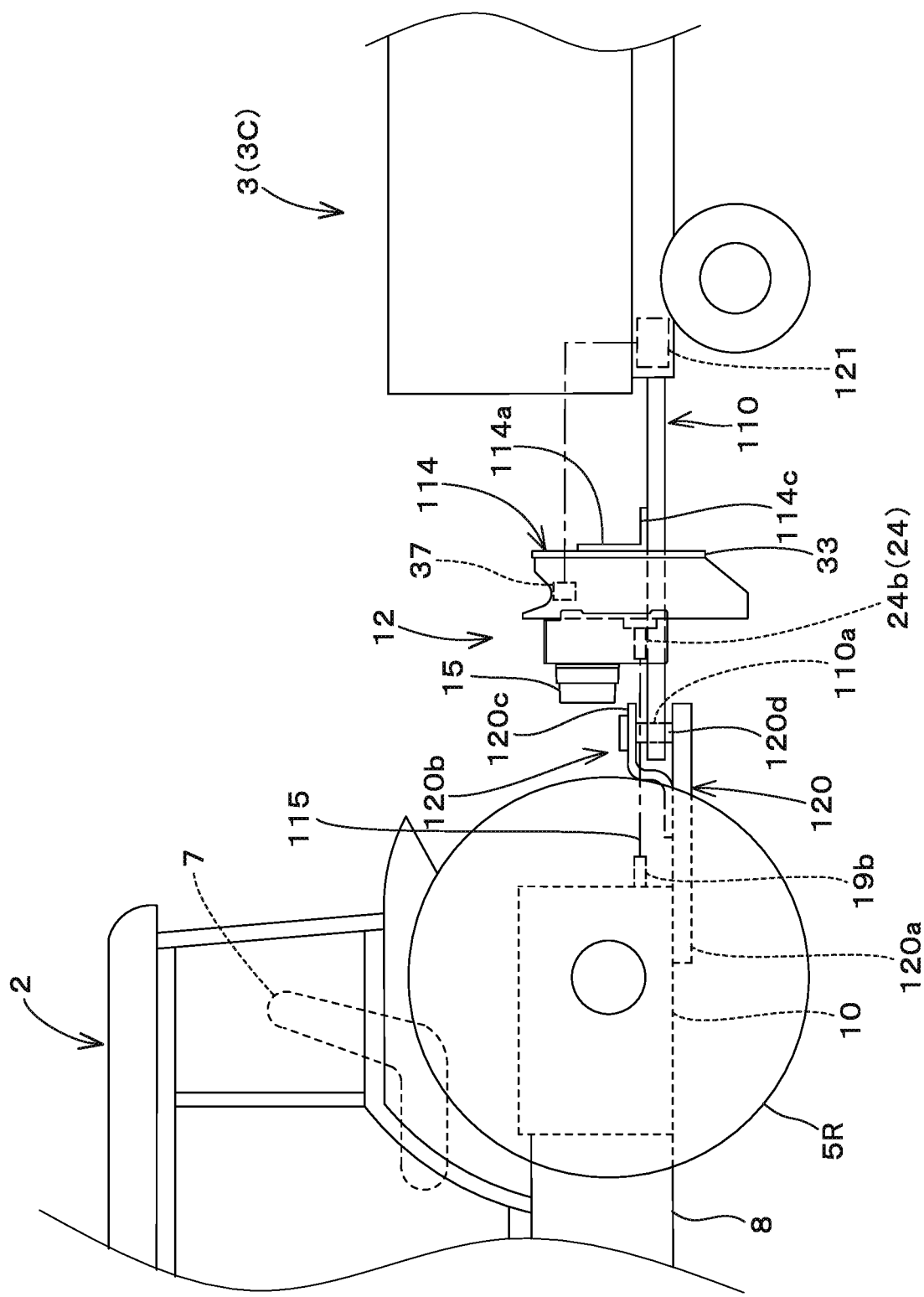
FIG. 37 is a side view illustrating a state where the power generator unit is attached to a towing member with use of the adapter according to the embodiments.

FIG. 37 shows an example of a state in which the adapter 114 is attached to the towing member 110.

The towing member 110 connects the working device 3 to the rear portion of the tractor 2. In this manner, the working device 3 can be pulled by the tractor 2.

One end of the towing member 110 is connected to a towing hitch (drawer or the like) 120 provided at the rear of the tractor 2. The other end of the towing member 110 is connected to the working device 3. The configurations of the tow member 110, the tow hitch 120, and the working device 3 are not limited to the illustrated configurations.

The tow hitch 120 may be a fixed type or a swing type (swing drawbar or the like). The tow hitch 120 of the illustrated example has a base portion 120*a* and a hitch portion 120*b*. The base portion 120 *a* is attached to the lower portion of the transmission case 10 and extends rearward from the transmission case 10. The hitch portion 120*b* is provided on the rear portion of the base portion 120*a*. The hitch portion 120*b* has an upper plate portion 120*c* and a support shaft 120*d*. The front portion of the upper plate portion 120*c* is fixed to the upper surface of the base portion 120*a* with bolts or the like. The rear portion of the upper plate portion 120*c* is arranged above and spaced apart from the upper surface of the base portion 120*a*. The support shaft 120*d* stretches in the vertical direction from the upper plate portion 120*c* to the base portion 120*a*.

A through hole 110*a* extending in the vertical direction is formed on one end side of the towing member 110. By inserting the support shaft 120*d* into the through hole 110*a* formed in the towing member 110, the towing member 110 is connected to the hitch portion 120*b* of the pulling hitch 120. By connecting the towing member 110 to the hitch portion 120*b*, the working device 3 is connected to the rear portion of the tractor 2 so as to be towable. The type of the working device 3 is not limited and may be any working device that includes the electric actuator 121 that is driven by the electric power supplied from the generator 15 of the generator unit 12.

The adapter 114 is the adapter of the fourth embodiment, and the second horizontal plate portion 114*c* is fixed to the upper portion of the towing member 110 by bolts or the like. Thereby, the generator unit 12 is mounted on the towing member 110 between the tractor 2 and the working device 3.

In the generator unit 12, the second connector portion 24*b* of the input shaft 24 faces the tractor 2 side in a state where the generator unit 12 is mounted on the towing member 110. The second connector portion 24*b* of the input shaft 24 is connected to the PTO output shaft 19*b* of the tractor 2 via a connecting tool (universal joint or the like) 115. The generator 15 is driven by the power input from the input shaft 24 to generate power. The electric power generated from the generator 15 is supplied to the electric actuator 121 of the working device 3, and the electric actuator 121 is driven by the electric power.

It should be noted that the adapter 114 may be attached not to the upper portion of the towing member 110 but to another portion such as a side portion. In addition, instead of the adapter of the fourth embodiment, the adapter 114 of another embodiment or an adapter of a different shape may be used. In addition, the working device 3 towed by the towing member 110 may be a hybrid type working device that is driven by electric power from the generator 15 and power from the PTO shaft 19 of the tractor 2.

As described above, by mounting the adapter 114 on the generator unit 12, the generator unit 12 can be mounted on not only the tractor 2 but also devices and members other than the tractor 2 (working device 3, towing member 110). Since the adapter 114 is attachable to and detachable from the generator unit 12, when the generator unit 12 is attached to the working device 3 or the towing member 110, the adapter 114 is attached to the attachment portion 33, and the generator unit 12 is attached to the mission of the tractor 2. When mounted on the case 10 (see FIG. 11 and the like), it can be removed from the mounting portion 33.

Figure 38:
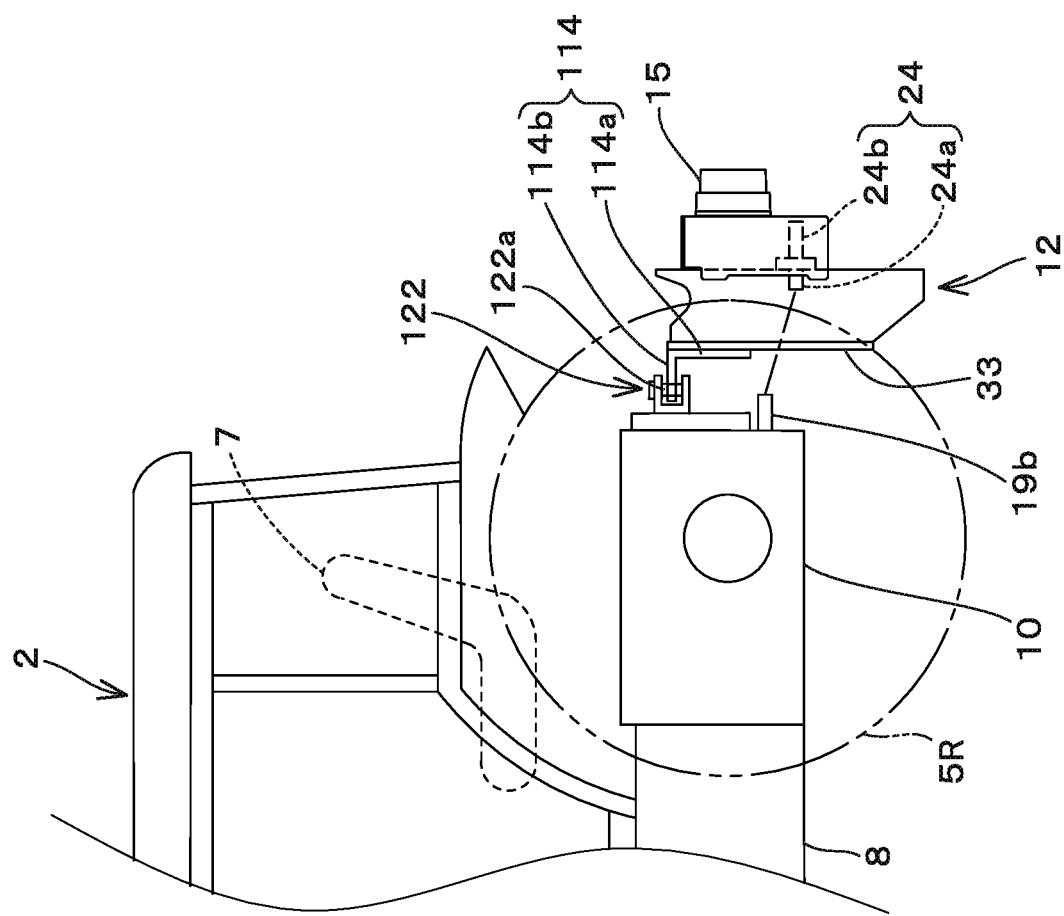
FIG. 38 is a side view illustrating a state where the power generator unit is attached to a hitch of a tractor with use of the adapter according to the embodiments.

In addition, as shown in FIG. 38, by attaching the adapter 114 to the generator unit 12, the generator unit 12 can be attached to the hitch 122 provided at the rear portion of the tractor 2. In the embodiment shown in FIG. 38, the adapter 114 of the first embodiment is attached to the generator unit 12, and the adapter 114 is connected to the hitch 122 provided at the rear portion of the tractor 2. The hitch 122 is a so-called high hitch provided above the PTO output shaft 19*b*. The adapter 114 is connected to the hitch 122 by inserting the support shaft 122*a* of the hitch 122 into a through hole formed in the lateral plate portion 114*b*. In this manner, the generator unit 12 is attached to the hitch 122 provided at the rear portion of the tractor 2. Thus, in this case, the adapter 114 becomes the mounting portion 33 that is detachably mounted to the tractor 2. In other words, the adapter 114 functions as the mounting portion 33. The structure of the hitch (high hitch) 122 is not limited to the illustrated structure.

In the generator unit 12 mounted on the hitch 122, the connector portion 24*a* of the input shaft 24 faces the tractor 2 side. In the rear portion of the tractor 2, a working device (scattering device, seeder device, etc.) provided with an electric actuator driven by electric power from the generator 15 of the generator unit 12 by a connecting device (not shown in the drawings) such as a three-point link mechanism.

The adapter 114 is attachable to at least one of the tractor 2 (hitch 122), the working device 3, and the towing member 110, and preferably attachable to at least two (for example, the tractor 2 and the working device 3, the tractor 2 and the towing device 2, the working device 3 and the towing member 110, and more preferably attachable to all (three). When the adapter 114 is attachable to all of the tractor 2 (hitch 122), the working device 3, and the towing member 110, the generator unit 12 is attached to the tractor 2 according to the type and specifications of the working device 3, it becomes possible to selectively attach the working device 3 and the towing member 110.

As described above, the generator unit 12 can be mounted on the tractor (traveling vehicle) 2, the working device 3, or the towing member 110. Thus, the generator 15 can take not only the form mounted on the tractor 2 but also the form mounted on the working device 3 and the towing member 110. When the generator 15 is attached to the tractor 2, the motor 23 is driven by the electric power supplied from the tractor 2 (the generator 15 attached to the tractor 2). When being attached to the member 110, it is driven by the electric power supplied from the generator 15 attached to the working device 3 or the towing member 110.

In addition, in the above embodiment, the generator 15 is driven by the power transmitted from the PTO shaft 19, but the generator 15 may be driven independently of the PTO shaft 19. In other words, the generator 15 is not limited to one that is driven by receiving power from the PTO shaft 19. For example, to an output shaft of the engine 11 provided in the traveling vehicle (tractor) 2, a power divider mechanism for branching the power from the is connected, one of the branched power is transmitted to the PTO shaft 19, and the other is transmitted to the generator 15. The power divider mechanism can be constituted of, for example, a gear mechanism in which a plurality of gears are combined. In addition, the generator 15 may be driven by fuel fluid such as light fluid or gasoline, or fuel gas such as natural gas.

<Effect>

According to the working device 3, the generator unit 12, and the working machine 1 of the above-described embodiment, the following effects can be achieved.

The working device 3 connected to the traveling vehicle 2 having the prime mover 11 and configured to perform an agricultural work, includes: the working portion 32 to perform an agricultural work; the electric motor (motor) 32 to be driven by electric power; the power transmission mechanism 50 to which power generated by the electric motor 23 is inputted, configured to transmit the power to the working portion 32; the regeneration resistor to consume a regenerative power generated in the electric motor 23; the switch portion 92 to switch, between a connecting state and a shut-off state, a state established between the electric motor 23 and the regeneration resistor 91; and the controller portion (the second controller portion) to control driving of the electric motor 23 and switching of the switch portion 92.

According to this configuration, the switch portion 92 can switch between the state (the connecting state) in which the regenerative power generated in the electric motor 23 is guided to the regeneration resistor 91 and a state (the shut-off state) in which the regenerative power is not guided to the regeneration resistor 91, so that the electric power is generated in the electric motor 23. Regenerative power can be guided to the regeneration resistor 91 as needed, and can be appropriately processed (consumed) in the regeneration resistor 91. In this manner, it is possible to prevent the generation of the regenerative power from adversely affecting the output of the working device 3 (the revolving number of the sprayer portion 32, and the like). In other words, even when the working portion 32 is driven under the driving condition (a revolving speed) in which regenerative power is generated, the working portion 32 can be driven at a desired output (a revolving speed).

In addition, the electric motor 23 is driven by electric power supplied from the traveling vehicle 2. Power generated by the electric motor 23 and power supplied from the prime mover 11 are inputted to the power transmission mechanism 50.

According to this configuration, in the working device 3 having the power transmission mechanism 50 that uses the power generated by driving the electric motor 23 and the power supplied from the prime mover 11 in combination, the regenerative power generated in the electric motor 23 can be appropriately consumed by the regeneration resistor 91.

In addition, the controller portion (the second controller portion 23) switches the switch portion 92 to be in the connecting state when the regenerative power is generated, and switches the switch portion 92 to be in the shut-off state when generation of the regenerative power stops.

According to this configuration, when the regenerative power is generated in the electric motor 23, the regenerative power can be guided to the regeneration resistor 91 and consumed, so that the generation of regenerative power is effectively prevented from adversely affecting the output of the working device 3 (the revolving number of the sprayer portion 32, and the like).

In addition, the electric motor 23 includes a plurality of electric motors (the first motor 231 and first motor 233), and the controller portion (the second controller portion) 93 switches the switch portion 92 to be in the connecting state when at least one of the electric motors generates regenerative power.

According to this configuration, when the regenerative power is generated in at least one of the plurality of electric motors, the regenerative power can be guided to the regeneration resistor 91 and consumed. In this manner, in the working device 3 having a plurality of electric motors, it is possible to effectively prevent the generation of regenerative power from adversely affecting the output of the working device 3 (the revolving number of the sprayer portion 32, and the like).

In addition, the electric motor 23 includes a plurality of electric motors (the first motor 231 and the second motor 233), and the controller portion (the second controller portion) 93 switches the switch portion 92 to be in the connecting state when all of the electric motors generate regenerative power.

According to this configuration, when the regenerative power is generated in all of the plurality of electric motors, the regenerative power can be guided to the regeneration resistor 91 and consumed. In this manner, in the working device 3 having a plurality of electric motors, it is possible to effectively prevent the generation of regenerative power from adversely affecting the output of the working device 3 (the revolving number of the sprayer portion 32, and the like).

In addition, the electric motor 23 includes a plurality of electric motors (the first motor 231 and the first motor 233), and the controller portion (the second controller portion) 93 switches the switch portion 92 to be in the connecting state when all of the electric motors generate regenerative power or when one of the electric motors (for example, the first motor 231) generates regenerative power and the others of the electric motors (for example, the second motor 232) generate powering power and the regenerative power generated by the one of the electric motors is larger than the powering power generated by each of the others of the electric motors.

According to this configuration, in the working device 3 having a plurality of electric motors, it is possible to more reliably prevent the generation of regenerative power from adversely affecting the output of the working device 3 (the revolving number of the sprayer portion 32, and the like).

In addition, the electric motor 23 includes a plurality of electric motors (the first motor 231 and the first motor 233), and the controller portion (the second controller portion) 93 switches the switch portion 92 to be in the connecting state in transmitting a signal that orders at least one of the electric motors to reversely revolve.

According to this configuration, in the working device 3 having a plurality of electric motors, it is possible to quickly and reliably prevent the generation of regenerative power from adversely affecting the output of the working device 3 (the revolving number of the sprayer portion 32, and the like).

In addition, the prime mover 11 is the engine 11, and the power transmission mechanism 50 has: the planetary gear mechanism (the first planetary gear mechanism) 52 having: the first inputting portion (the first planetary carrier) 62 to which power from the engine 11 is inputted through a PTO shaft 19; and the second inputting portion (the first sum gear) 60 to which power generated by the electric motor 23 is inputted; and the outputting portion (the output transmission shaft 64, the dividing transmission portion 65, the first power transmission portion 70, and the second power transmission portion 82) to output the power from the planetary gear mechanism 52 to the working portion (the sprayer portion) 32.

According to this configuration, in the working device 3 including the planetary gear mechanism 52 that outputs, to the working portion 32, the power inputted from the engine 11 through the PTO shaft 19 and the power generated by driving the electric motor 23, it is possible to prevent the regenerative power generated in the electric motor 23 from adversely affecting the output of the working device 3 (the revolving number of the sprayer portion 32, and the like).

In addition, the working device 3 is any one of a fertilizer sprayer device to spray fertilizer to an agricultural field, a chemicals sprayer device to spray chemicals to the agricultural field, a seeder device to sow seeds to the agricultural field, and a baler device to collect and bale harvested products.

According to this configuration, when the working device 3 is any one of the fertilizer sprayer device, the chemicals sprayer device, the seeder device, and the baler device, the regenerative power generated in the electric motor 23 can be appropriately processed by the regeneration resistor 91.

In addition, the working machine 1 mentioned above includes: the traveling vehicle 2 having the prime mover 11; and the working device 3 connected to the traveling vehicle 2 and configured to perform an agricultural work. The working device 3 includes: the working portion 32 to perform the agricultural work; the electric motor 23 to be driven by electric power; the power transmission mechanism 50 to which power generated by the electric motor 23 is inputted, configured to transmit the power to the working portion 32; the regeneration resistor 91 to consume a regenerative power generated in the electric motor 23; and the switch portion 92 to switch, between the connecting state and the shut-off state, a state established between the electric motor 23 and the regeneration resistor 91. The traveling vehicle 2 or the working device 3 has the controller portion (the second controller portion) 93 to control driving of the electric motor 23 and switching of the switch portion 92.

According to this configuration, the switch portion 92 is controlled by the controller portion 93 provided in the traveling vehicle 2 or the working device 3 to switch between a state where the regenerative power generated in the electric motor 23 is guided to the regeneration resistor 91 (the connecting state) and a state where the regenerative power is not guided to the regeneration resistor 91 (the shut-off state). Thus, in the working device 3 connected to the traveling vehicle 2, the regenerative power generated in the electric motor 23 can be guided to the regeneration resistor 91 as necessary, and can be appropriately processed (consumed) in the regeneration resistor 91. In this manner, it is possible to prevent the generation of regenerative power from adversely affecting the output of the working device 3 (the revolving number of the sprayer portion 32, and the like).

In addition, the working device 3 to be connected to the traveling vehicle 2 having the prime mover 11, the working device 3 being configured to perform an agricultural work, includes: the working portion 32 to rotate to perform an agricultural work; the electric motor 23 to be driven by electric power; the power transmission mechanism 50 to which power generated by the electric motor 23 is inputted, configured to transmit the power to the working portion 32; and the regeneration resistor 91 to consume a regenerative power generated in the electric motor 23, the regeneration resistor 91 being arranged at a position to be cooled by wind generated by rotation of the working portion 32.

With this configuration, the regenerative power generated in the electric motor 23 can be consumed by the regeneration resistor 91. Thus, it is possible to prevent the generation of the regenerative power from adversely affecting the output of the working device 3 (the revolving number of the sprayer portion 32 and the like). In addition, since the regeneration resistor 91 can be cooled by the wind generated by the rotation of the working portion 32, a dedicated device (a fan or the like) for cooling the regeneration resistor 91 is not required, and the provision of the dedicated device is possible to avoid making the working device 3 heavy and large.

In addition, the electric motor 23 is driven by electric power supplied from the traveling vehicle 2, and power generated by the electric motor 23 and power supplied from the prime mover 11 are inputted to the power transmission mechanism 50.

According to this configuration, in the working device 3 having the power transmission mechanism 50 that uses combination of the power generated by driving the electric motor 23 and the power supplied from the prime mover 11, the regeneration resistor 91 that consumes the regenerative power generated in the electric motor 23 can be cooled.

In addition, the regeneration resistor 91 is arranged at a position to be blown by wind generated by rotation of the working portion 32.

With this configuration, the regeneration resistor 91 can be cooled quickly and efficiently.

In addition, the working portion 32 has the rotor blade 40b to rotate about a center shaft, and the regeneration resistor 91 is arranged around the rotor blade 40b.

According to this configuration, the wind generated by the rotation of the rotor blade 40b easily hits the regeneration resistor 91, so that the regeneration resistor 91 can be effectively cooled.

In addition, the working device 3 includes the wind guide member 96 to guide wind generated by rotation of the working portion 32 toward the regeneration resistor 91.

With this configuration, the wind guide member 96 can efficiently supply, to the regeneration resistor 91, the wind generated by the rotation of the rotor blade 40*b*. Thus, the regeneration resistor 91 can be cooled more effectively.

In addition, the center shaft is arranged vertically extending, and the regeneration resistor 41 is arranged above the rotor blade 40*b*.

According to this configuration, when the spraying substance is sprayed by the rotor blades 40*b*, the spraying substance moves downward (falls) as separating from the rotor blades 40*b*, so that the spraying substance sprayed by the rotor blades 40*b* can be effectively prevented from hitting the regeneration resistor 91.

In addition, the working device 3 includes the frame 97 provided around the working portion 32, the frame 97 supporting the working portion 32. The regeneration resistor 91 is attached to the frame 97.

With this configuration, since the regeneration resistor 91 is supported by the frame 97, it is possible to prevent problems such that the regeneration resistor 91 falls down due to the wind. In addition, when the regeneration resistor 91 generates heat, the heat can be radiated through the frame 97.

The wind guide member 96 is attached to the frame 97.

According to this configuration, since the wind guide member 96 can be supported by the frame 97, it is not necessary to separately provide a member for supporting the wind guide member 96. In addition, since the position of the wind guide member 96 is stable, the wind generated by the rotation of the rotor blade 40*b* can be reliably guided to the regeneration resistor 91 by the wind guide member 96.

In addition, the working device includes the connector portion 98 to be connected to a rear portion of the traveling vehicle 2. The frame 97 has: the front frame 97*a* arranged on a side of the connector portion 98, the front frame extending in a width direction of the traveling vehicle 2; the rear frame 97*b* arranged on a side opposed to the connector portion 98, the rear frame 97*b* extending in the width direction of the traveling vehicle 2; and the side frame 97*c* having end portions connecting the front frame 97*a* and the rear frame 97*b* in the width direction. The wind guide member 96 is attached to the front frame 97*a*, and the regeneration resistor 91 is attached to the side frame 97*c*.

According to this configuration, since the regeneration resistor 91 is arranged behind and on the side of the wind guide member 96, it is suppressed that the wind guide effect is obstructed by the device (the spreader portion 32) arranged inside the traveling vehicle 2 and the frame 97, and further the wind generated by the rotation of the rotor blade 40*b* can be guided by the wind guide member 96 and applied to the regeneration resistor 91.

In addition, the wind guide member 96 has the inclining portion 103 extending toward the side frame 97*b* from between the front frame 97*a* and the rotor blade 40*b* and shifting backward as approaching the side frame 97*b*, and the regeneration resistor 91 is arranged on an extension line of the inclining portion 103 in plan view, the extension line extending in an inclining direction of the inclining portion 103.

According to this configuration, the wind generated by the rotation of the rotor blades 40*b* can be guided to the side frame side by the inclined portion 103 of the wind guide member 96, and ca be applied to the regeneration resistor 91, so that the regeneration resistor 91 can be efficiently cooled.

In addition, the working device 3 is a fertilizer sprayer device to spray fertilizer to an agricultural field or a seeder device to sow seeds to the agricultural field.

According to this configuration, in the fertilizer sprayer device for spraying fertilizer in the agricultural field or the seeder device for sowing seeds in the agricultural field, the regeneration resistor 91 can be effectively cooled by the wind generated by the rotation of the working portion 32.

In addition, the generator unit 12 to be attached to the traveling vehicle 2 that has the prime mover 11 and the PTO shaft 19 to transmit power from the prime mover 11, includes: the generator 15; the input shaft 24 having: the first connector portion 24*a* configured to be connected to the PTO shaft 19; and the second connector portion 24*b* configured to be connected to the working device 3 to be connected to the traveling vehicle 2; the transmission mechanism 25 to transmit, to the generator 15, power supplied from the PTO shaft 19, the power being inputted from the first connector portion 24*a* to the input shaft; and the attachment frame 26 having: the attachment portion 34 to which the generator 15, the input shaft 24, and the transmission mechanism 25 are attached; and the mounting portion 33 configured to be mounted to the traveling vehicle 2.

This configuration provides the generator unit 12 configured to be attached to the traveling vehicle 2 and to drive the working device 3 with use of the electric power from the generator 15 to be driven by the motive power from the PTO shaft 19 and of the motive power from the PTO shaft 19. In particular, by connecting the first connector portion 24*a* of the input shaft 24 to the PTO shaft 19, the power from the PTO shaft 19 can be transmitted to the generator 15 through the transmission mechanism 25. Thus, the working device 3 can be driven using the electric power from the generator 15. In addition, by connecting the working device 3 to the second connector portion 24*b* of the input shaft 24, the working device 3 can be driven by the power of the PTO shaft 19. This allows the generator to be retrofitted to a traveling vehicle that does not have the generator. In addition, since the generator 15, the input shaft 24, the transmission mechanism 25, and the attachment frame 26 are integrated (unitized) in the generator unit 12, the generator unit 12 can be easily and reliably mounted on the traveling vehicle 2 with a small number of installation steps.

In addition, the generator unit 12 includes the adapter 114 to be attached to the working device 3.

According to this configuration, the generator unit 12 can be attached to the working device 3. Thus, even when the generator unit 12 cannot be mounted on the traveling vehicle 2, the generator unit 12 can be mounted on the working device 3 to supply the power from the generator 15 to the working device 3.

In addition, the generator unit includes the adapter 114 to be attached to a towing member 110 configured to connect the working device 3 to a rear portion of the traveling vehicle 2.

According to this configuration, the generator unit 12 can be attached to the towing member 110. Thus, even when the generator unit 12 cannot be mounted on the traveling vehicle 2 or the working device 3, the generator unit 12 can be mounted on the towing member 110 to supply the power from the generator 15 to the working device 3.

In addition, the adapter 114 is configured to be attached to the hitch 122 that is provided to the rear portion of the traveling vehicle 2.

According to this configuration, the generator unit 12 can be mounted not only on the working device 3 and the towing member 110 but also on the hitch 122 provided on the rear portion of the traveling vehicle 2, so that the mounting position of the generator unit 12 can be selected and can be optimum location.

In addition, the mounting portion 33 is mounted to the transmission case 10 of the traveling vehicle 2.

According to this configuration, the generator unit 12 can be mounted on the transmission case 10 of the traveling vehicle 2 with the mounting portion 33. In this manner, when the traveling vehicle 2 includes a connector device (a link mechanism or the like) for connecting the working device 3, the generator unit 12 can be mounted on the traveling vehicle 2 without using the connector device. In other words, even when the generator unit 12 is attached to the traveling vehicle 2, the working device 3 can be connected to the traveling vehicle 2. Thus, electric power can be supplied from the generator unit 12 mounted on the traveling vehicle 2 to the working device 3 connected to the traveling vehicle 2.

In addition, the mounting portion has: the first mounting portion 331 to be mounted to one side of the traveling vehicle 2 in a width direction; and the second mounting portion 332 to be mounted to the other side of the traveling vehicle 2 in the width direction. The generator 15 is arranged between the first mounting portion 331 and the second mounting portion 332.

According to this configuration, the generator 15 is arranged between the first mounting portion 331 and the second mounting portion 332 (inside the ladder hitch), so that the generator 15 can be prevented from interfering with the connector device 6 such as a link mechanism provided at the rear portion of the traveling vehicle 2.

In addition, the generator unit 12 includes the connector (the first output connector) 37 to be connected to a cable (the power supply cable) 95A for supplying, to the working device 3, electric power to be outputted from the generator 15. The connector (the first connector) 37 is arranged between the first mounting portion 331 and the second mounting portion 332.

According to this configuration, the electric power outputted from the generator 15 can be supplied from the connector 37 of the generator unit 12 to the working device 3 through the cable 95A. In addition, the connector 37 is arranged between the first mounting portion 331 and the second mounting portion 332 (inside the ladder hitch), so that the connector 37 and the cable connected to the connector 37 can be prevented from interfering with the connector device 6 such as the three-point link mechanism provided at the rear portion of the traveling vehicle 2.

In addition, the generator unit 12 includes the controller portion (the first controller portion) 30 to control an output of the electric power to be outputted from the generator 15 to the connector 37.

According to this configuration, the controller portion 30 of the generator unit 12 controls the output of electric power to be supplied from the generator 15 to the connector 37, so that the supply of electric power to the working device 3 can be controlled.

In addition, the generator unit 12 includes the cover member 38 attached to the attachment frame 34, having: one side plate 38a covering one side of the generator 15 and being attached to the first mounting portion 331; the other side plate 38b covering the other side of the generator 15 and being attached to the second mounting portion 332; and the upper plate 38c covering above the generator 15 and connecting an upper portion of the one side plate 38a and an upper portion of the other side plate 38b.

According to this configuration, since the cover member 38 covers the periphery of the generator 15 from three directions (the left side, the right side, and the upper side), it can prevent the worker from unintentionally contacting the generator 15 and peripheral devices.

In addition, the generator 15 provides an output voltage of 60V or less.

According to this configuration, the insulation measures are not required. Moreover, the configuration is excellent in safety and can reduce power consumption. Furthermore, the generator 15 can be made smaller and lighter.

In addition, the generator 15 provides an output voltage of 48V or less.

By setting the output voltage of the generator 15 to 48V or less, the electrification technique for automobiles can be applied. In addition, electric power can be supplied to various types of working devices 3 used in the agricultural work, and thereby the working devices 3 can be driven.

In addition, the working device 3 is any one of a sprayer device to spray spraying substance to an agricultural field, a seeder device to sow seeds to the agricultural field, and a baler device to bale harvested crops.

According to this configuration, the generator unit 12 is attached to any one of the sprayer device, the seeder device, and the baler device, and any one of the sprayer device, the seeder device, and the baler device can be driven by the power supplied from the generator unit 12.

In addition, the sprayer device 3 is a fertilizer sprayer device or a chemicals sprayer device.

According to this configuration, the generator unit 12 is mounted on the fertilizer sprayer device (a spreader) or the chemicals sprayer device (a prayer), and the fertilizer sprayer device or the chemicals sprayer device is driven by the electric power supplied from the generator unit 12.

In addition, the working machine 1 includes: the generator unit 12; the traveling vehicle 2 to which the generator unit 12 is attached; and the working device 3 connected to the traveling vehicle 2 and configured to be driven by electric power to be outputted from the generator 15.

According to this configuration, it is possible to provide the working machine 1 including the generator unit 12 that provides the above-described excellent effect.

In addition, the working machine 1 includes: the traveling vehicle 2 having the prime mover 11; the generator 15 attached to the traveling vehicle 2 and configured to be driven by power to be outputted from the prime mover 11; the working device 3 connected to the traveling vehicle 2 and configured to receive electric power generated by the generator 15 and a signal outputted from the traveling vehicle 2; the power supply cable 95A to supply the electric power generated by the generator 15 to the working device 3; the signal transmission cable 95B to transmit the signal outputted from the traveling vehicle 2 to the working device 3; and the bundling member 109 bundling the power supply cable 95A and the signal transmission cable 95B.

According to this configuration, the power supply cable 95A and the signal transmission cable 95B that connect the traveling vehicle 2 and the working device 3 are bundled by the bundling member 109, so that the power supply cable 95A and the signal transmission cable 95B can be easily arranged. In addition, since the arrangement space for the cables can be made smaller than in the case where the power supply cables 95A and the signal transmission cables 95B are arranged separately, the cables 95A and 95B and the movable portions provided at the rear portion of the traveling vehicle 2 are movable. It is possible to avoid contact with the portions (the connector device 6 and the PTO shaft 19).

In this manner, the configuration improves the reliability of the connection by the cables 95A and 95B.

In addition, the working machine 1 includes the generator unit 12 having: the generator 15; the attachment portion 34 to which the generator 15 is attached; and the mounting portion 33 to be mounted to the traveling vehicle 2. The mounting portion 33 is detachably mounted to the traveling vehicle 2, and the power supply cable 95A connects the generator unit 12 and the working device 3.

According to this configuration, the generator 15 can be mounted on the traveling vehicle 2 as the generator unit 12 integrated with the attachment portion 34 and the mounting portion 33. In this manner, the generator 15 can be easily attached to and detached from the traveling vehicle 2. Moreover, electric power can be supplied to the working device 3 from the generator unit 12 mounted on the traveling vehicle 2 through the power supply cable 95A.

In addition, the generator unit 12 includes: the input shaft 24 having: the first connector portion 24a configured to be connected to the PTO shaft 19 that transmits power provided from the prime mover 11; and the second connector portion 24b configured to be connected to the working device 3; and the transmission mechanism 25 to transmit, to the generator 15, power supplied from the PTO shaft 19, the power being inputted from the first connector portion 24a to the input shaft 24.

According to this configuration, the first connector portion 24a of the input shaft 24 is connected to the PTO shaft 19, it is possible to transmit the power from the PTO shaft 19 to the generator 15 through the transmission mechanism 25. The power from the machine 15 can be used to drive the working device 3. In addition, the working device 3 is connected to the second connector portion 24b of the input shaft 24, the working device 3 can be driven by the power of the PTO shaft 19.

In addition, the working device 3 has: the first inputting connector 106 to which an inputting side of the power supply cable 95A is connected; and the second inputting connector 108 to which an inputting side of the signal transmission cable 95B is connected. The generator unit 12 has the first outputting connector 37 to which an outputting side of the power supply cable 95A is connected. The traveling vehicle 2 has the second outputting connector 107 to which an outputting side of the signal transmission cable 95B is connected. The power supply cable 95A is arranged from the first outputting connector 37 to the first inputting connector 106 under a state of being bundled with the signal transmission cable 95B by the bundling member 109. The signal transmission cable 95B is arranged from the second outputting connector 107 to the second inputting connector 108 under a state of being bundled with the power supply cable 95A by the bundling member 109.

According to this configuration, the power supply cable 95A can be arranged from the generator unit 12 to the working device 3 while being bundled with the signal transmission cable 95B. In addition, the signal transmission cable 95B can be arranged from the traveling vehicle 2 to the working device 3 under the state where the power supply cable 95A is bundled.

In addition, the second outputting connector 107 is arranged above the first outputting connector 37, and the power supply cable 95A is arranged extending upward from the first outputting connector 37 and passing toward the first inputting connector 106 trough a vicinity of the second outputting connector 107.

According to this configuration, the power supply cable 95A passes near the second output connector 107 to which the signal transmission cable 95B is connected, so that the power supply cable 95A and the signal transmission cable 95B can be arranged being close to each other over a long distance (a section). In this manner, the bundling member 109 can increase the number of portions (locations) where the power supply cable 95A and the signal transmission cable 95B can be bundled. As the result, it is easy to arrange the power supply cable 95A and the signal transmission cable 95B, and the arrangement space can be reduced.

In addition, the first outputting connector 37 is provided to an upper portion of the generator unit 12.

According to this configuration, since the distance between the first output connector 37 and the second output connector 107 is shortened, the portion where the power supply cable 95A and the signal transmission cable 95B are not bundled can be reduced. In this manner, it is possible to more easily achieve the easy installation of the power supply cable 95A and the signal transmission cable 95B and achieve the reduction of the installation space.

In addition, the first outputting connector 37 has the connector portion 37a to which the power supply cable 95A is connected, the connector portion 37a being arranged facing upward.

With this configuration, it is possible to arrange the power supply cable 95A easily connecting the power supply cable 95A from above to the connector portion 37a of the first output connector 37. In addition, it becomes easy to stretch upward the power supply cable 95A from the first output connector 37 to the vicinity of the second output connector 107.

In addition, the traveling vehicle 2 has the connector device 6 to which the working device 3 is connected, the connector device 6 being a three-point linkage mechanism that includes a top link 6B1, a lower link 6B2, a lift arm 6A, and a lift rod 6B3. The lower link 6B2, the lift arm 6A, and the lift rod 6B3 are provided to each of one side and the other side of the traveling vehicle 2 in the width direction, and the first outputting connector 37 is arranged between the top link 6B1 and the lower link 6B2R, the lift arm 6AR and the lift rod 6B3R provided to the other side in the width direction.

According to this configuration, the power supply cable 95A connected to the first output connector 37 can be stretched upward in the vehicle width direction through between the top link 6B1, the second lower link 6B2R, the second lift arm 6AR, and the second lift rod 6B3R. In this manner, the interference between the power supply cable 95A and the connector device 6 can be avoided.

In addition, the power supply cable 95A and the signal transmission cable 95B are arranged passing above the connector device 6 and extending toward the working device 3 under a state of being bundled by the bundling member 109.

According to this configuration, the power supply cable 95A and the signal transmission cable 95B can be arranged being prevented from interfering with the connector device 6 and members (the PTO shaft 19 and the like) provided below the connector device 6 (below the top link 6B1).

In addition, the working device 3 is any one of a fertilizer sprayer device to spray fertilizer to an agricultural field, a chemicals sprayer device to spray chemicals to the agricultural field, a seeder device to sow seeds to the agricultural field, and a baler device to collect and bale harvested products.

According to this configuration, when the working device 3 is any one of the fertilizer sprayer device, the chemicals sprayer device, the seeded device, and the baler device, it can prevent the cables 95A and 95B from being in contact with the movable portion (the connector device 6 and the PTO shaft 19) provided at the rear portion of the traveling vehicle 2.

In the above description, the embodiment of the present invention has been explained. However, all the features of the embodiment disclosed in this application should be considered just as examples, and the embodiment does not restrict the present invention accordingly. A scope of the present invention is shown not in the above-described embodiment but in claims, and is intended to include all modified examples within and equivalent to a scope of the claims.

What is claimed is:

1. A working device to be connected to a traveling vehicle having a prime mover, the working device being configured to perform agricultural work, comprising:
    a working portion to rotate to perform the agricultural work;
    an electric motor to be driven by electric power;
    a power transmission mechanism to which power generated by the electric motor is inputted, configured to transmit the power generated by the electric motor to the working portion; and
    a regeneration resistor to consume regenerative power generated in the electric motor, the regeneration resistor being arranged at a position to be cooled by wind generated by rotation of the working portion.

2. The working device according to claim 1,
    wherein the electric motor is driven by electric power supplied from the traveling vehicle, and
    wherein the power generated by the electric motor and power supplied from the prime mover are inputted to the power transmission mechanism.

3. The working device according to claim 1,
    wherein the regeneration resistor is arranged at a position to be blown by wind generated by rotation of the working portion.

4. The working device according to claim 1,
    wherein the working portion has
        a rotor blade to rotate about a center shaft, and
    wherein the regeneration resistor is arranged around the rotor blade.

5. The working device according to claim 4,
    wherein the center shaft is arranged vertically extending, and
    wherein the regeneration resistor is arranged above the rotor blade.

6. The working device according to claim 1, comprising a wind guide member to guide wind generated by rotation of the working portion toward the regeneration resistor.

7. The working device according to claim 1, comprising a frame provided around the working portion, the frame supporting the working portion,
    wherein the regeneration resistor is attached to the frame.

8. The working device according to claim 7,
    wherein a wind guide member is attached to the frame.

9. The working device according to claim 8, comprising a connector portion to be connected to a rear portion of the traveling vehicle,
    wherein the frame has:
        a front frame arranged on a side of the connector portion, the front frame extending in a width direction of the traveling vehicle;
        a rear frame arranged on a side opposed to the connector portion, the rear frame extending in the width direction of the traveling vehicle; and
        a side frame having end portions connecting the front frame and the rear frame in the width direction,
    wherein the wind guide member is attached to the front frame, and
    wherein the regeneration resistor is attached to the side frame.

10. The working device according to claim 9,
    wherein the wind guide member has an inclining portion extending toward the side frame from between the front frame and a rotor blade and shifting backward as approaching the side frame, and
    wherein the regeneration resistor is arranged on an extension line of the inclining portion in plan view, the extension line extending in an inclining direction of the inclining portion.

11. The working device according to claim 1,
    wherein the working device is a fertilizer sprayer device to spray fertilizer to an agricultural field or a seeder device to sow seeds to the agricultural field.

12. A working machine comprising:
    a traveling vehicle having a prime mover; and
    the working device according to claim 1, configured to be connected to the traveling vehicle and to perform the agricultural work.

* * * * *